US009390375B2

(12) United States Patent
Allgaier

(10) Patent No.: US 9,390,375 B2
(45) Date of Patent: *Jul. 12, 2016

(54) REUSE OF ON-DEMAND ENTERPRISE SYSTEM CUSTOMIZATION KNOWLEDGE UTILIZING COLLECTIVE EXPERIENCE

(71) Applicant: Matthias Allgaier, Bernstadt (DE)

(72) Inventor: Matthias Allgaier, Bernstadt (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,453

(22) Filed: Jan. 6, 2015

(65) Prior Publication Data

US 2015/0127583 A1    May 7, 2015

Related U.S. Application Data

(63) Continuation of application No. 13/462,693, filed on May 2, 2012, now Pat. No. 8,935,191.

(51) Int. Cl.
*G06N 5/04* (2006.01)
*G06N 99/00* (2010.01)

(52) U.S. Cl.
CPC ............... *G06N 5/04* (2013.01); *G06N 99/005* (2013.01)

(58) Field of Classification Search
CPC .......... G06N 5/04; G06N 5/02; G06N 99/00; G06N 99/005
USPC ...................... 706/46, 11; 707/769
See application file for complete search history.

(56) References Cited

U.S. PATENT DOCUMENTS

| 6,081,798 A | 6/2000 | Johnson et al. |
| 7,512,580 B2 | 3/2009 | Ronnewinkel |
| 7,565,338 B2 | 7/2009 | Beniaminy et al. |

(Continued)

FOREIGN PATENT DOCUMENTS

WO    0070481 A1    11/2000

OTHER PUBLICATIONS

Jena—a Semantic Web framework for JAVA, http://jena.sourceforge.net/ Printed May 26, 2011.

(Continued)

*Primary Examiner* — Stanley K Hill
*Assistant Examiner* — Dave Misir
(74) *Attorney, Agent, or Firm* — Fountainhead Law Group PC

(57) ABSTRACT

Systems and methods allow sharing and reuse of acquired customization knowledge of enterprise systems, utilizing collective customization experience. Particular embodiments employ Case-Based Reasoning (CBR) principles to manage customization experience in the context of both Software as a Service (SaaS) and Platform as a Service (PaaS) environments. Collective customization knowledge may be explicitly retrieved, adapted, shared, reused, and/or traded between tenants, partners, and optionally provider(s), of on-demand enterprise systems. A previous customization case stored within an experience base, may include one or more of the following: information allowing annotation of price information for trading the previous customization case (e.g. to another tenant); information restricting visibility of the previous customization case within the experience base; information defining a rating for the previous customization case within a community; information capturing a reuse frequency of the previous customization case; and/or information rendering anonymous at least a portion of the previous customization case.

13 Claims, 37 Drawing Sheets

(56) References Cited

U.S. PATENT DOCUMENTS

| | | |
|---|---|---|
| 2004/0019855 A1 | 1/2004 | Purvis |
| 2004/0221267 A1 | 11/2004 | Chase et al. |
| 2005/0257193 A1 | 11/2005 | Falk et al. |
| 2006/0248540 A1 | 11/2006 | Sterner et al. |
| 2007/0011105 A1* | 1/2007 | Benson .............. G05B 13/0275 706/1 |
| 2007/0033567 A1 | 2/2007 | Carlson et al. |
| 2007/0094217 A1 | 4/2007 | Ronnewinkel |
| 2007/0118551 A1 | 5/2007 | Akkiraju et al. |
| 2007/0245297 A1 | 10/2007 | Kuester et al. |
| 2008/0168420 A1 | 7/2008 | Sabbouh |
| 2008/0288965 A1 | 11/2008 | Grechanik et al. |
| 2009/0063224 A1 | 3/2009 | Gorthi et al. |
| 2009/0187881 A1 | 7/2009 | Feger et al. |
| 2009/0299513 A1 | 12/2009 | Suh et al. |
| 2010/0082696 A1 | 4/2010 | Cao et al. |
| 2011/0040766 A1 | 2/2011 | Robinson et al. |
| 2011/0099532 A1 | 4/2011 | Coldicott et al. |
| 2011/0208788 A1 | 8/2011 | Heller et al. |
| 2011/0296018 A1 | 12/2011 | Deng et al. |
| 2012/0102103 A1 | 4/2012 | Jacobson et al. |
| 2012/0185821 A1 | 7/2012 | Yaseen et al. |
| 2012/0210292 A1 | 8/2012 | Zhang et al. |
| 2012/0233170 A1 | 9/2012 | Musgrove et al. |
| 2012/0323618 A1 | 12/2012 | Allgaier et al. |
| 2012/0330699 A1 | 12/2012 | Allgaier |
| 2013/0262504 A1 | 10/2013 | Allgaier |
| 2013/0297544 A1 | 11/2013 | Allgaier |

OTHER PUBLICATIONS

Owl—http://www.w3.org/TR/owl2-overview/ W3C Recommendation, Oct. 2009.

SEKT Consortium, "PROTON Ontology," available at http://proton.semanticweb.org/, retrieved Jan. 15, 2007, http://www.disp.semanticweb.org. 2007.

Jim Prentzas and Ioannis Hatzilygeroudis, "Categorizing Approaches Combining Rule-Based and Case-Based Reasoning," Expert Systems 24(2), pp. 97-122, 2007.

Armin Stahl and Thomas R. Roth-Berghofer, "Rapid Prototyping of CBR, Applications with the Open Source Tool myCBR," Proceedings of the 9th European Conference on Case-Based Reasoning (ECCBR 2008)m oo, 615-629. 2008.

Matthias Allgaier, "Requirements for a Recommendation System Supporting Guided Service Integration Modelling in Extensible Enterprise Systems," In: W. Esswein, J. Juhrisch, M. Nuttgens, K. Turowski (eds): Proc. Modellierung, betrieblicher Informationsysteme (MOBIS'10) E=CEUR Online Proceedings, Germany, 2010.

Shixiong Xia, Zuhui Hu, Qiang Niu, "An Approach of Semantic Similarity Measure between Ontology Concepts Based on Multi Expression Programming," Proceedings of Sixth Web Information Systems and Applications Conference, pp. 184-188, 2009.

Weske, M. Business Process Management: Concepts, Languages, Architectures. Springer, 2007.

Tung, Yuan-Hsin et al., "A Rule-Based CBR Approach for Expert Finding and Problem Diagnosis", Expert Systems with Applications 37.3 (2010): pp. 2427-2438.

Wang, Tinglin, Tao Hu, and Shensheng Zhang, "Ontology-based Reconfigurable Case-Based Reasoning System for Knowledge Integration," Systems, Man and Cybernetics, 2003. IEEE International Conference on vol. 5 IEEE, 2003.

Abecker, Andreas and Stefan Decker, "Organizational Memory: Knowledge Acquisition, Integration, and Retrieval Issues," XPS-99: Knowledge-Based systems. Survey and Future Directions. Springer Berlin Heidelberg, 1999. pp. 113-124.

Elena Neaga and Jennifer A. Harding, "An Enterprise Modeling and Integration Framework Based on Knowledge Discovery and Data Mining," International Journal of Production Research 43.6 (2005), pp. 1089-1108.

Watson, I., "Case-Based Reasoning: A Review," Published in The Knowledge Engineering Review, vol. 9, No. 4, 1994.

De Mantaras R., et al., "Retrieval, Reuse, Revision, and Retention in Casebased Reasoning," 2005.

M. Allgaier, "Semantic-Based Case Retrieval of Service Integration Models in Extensible Enterprise Systems Based on a Business Domain Ontology," CAiSE 2011 Workshops, LNBIP 83, pp. 414-424, 2011.

Alexandre Hanft et al., "Integration of Drools into an OSGI-based BPM-Platform for CBR," Workshop on Process-Oriented Case-Based Reasoning, Sep. 30, 2011 (whole document).

Babka O et al., "Case-based Reasoning and Decision Support System," Intelligent Processing System, ICIPS '97. Oct. 1997, pp. 1532-1536.

Antonio Sanchez-Ruiz et al., "Adaptation through Planning in Knowledge Intensive CBR," Sep. 1, 2008, Advances in Case-Based Reasoning, pp. 503-517.

International Search Report (from a corresponding foreign application), EP 12004414.4.

European Search Report (from a corresponding foreign application) 13001010.1, mailed Mar. 24, 2014.

Agnar Aamodt and Enric Plaza, "Case-Based Reasoning: Foundational Issues, Methodological Variations, and System Approaches," A1 Communications, IOS Press, vol. 7(1), pp. 39-59, 1994.

Juan A. Recto-Garcia, Belen Diaz-Agudo, Pedro Gonzalez-Calero, Antonio Sanchez-Ruiz-Granados, "Ontology based CBR with jCOLBIBRI," in Applications and Innovations in Intelligent Systems XIV. Proceedings of A1-2006, the Twenty-sixth SGAI International Conference on Innovative Techniques and Applications of Artificial Intelligence, Springer, 2006.

Therani Madhusudan, J. Leon Zhao, and Byron Marshall, "A Case-Based Reasoning Framework for Workflow Model Management," Data & Knowledge Engineering 50, pp. 87-115, 2004.

Padraig Cunningham, "CBR: Strengths and Weaknesses," In: Proc 11th International Conference on Industrial and Engineering Applications of Artificial Intelligence and Expert Systems, Eds. A.P. del Pobil, J. Miral & M. Ali, Lecture Notes in Artificial Intelligence 1416, vol. 2, pp. 517-523, Spring Verlag. 1993.

Matthias Allgaier, Markus Heller, and Martin Weidner, "Towards a Model-based Service Integration Framework for Extensible Enterprise Systems," in: Schumann, M.; Kolbe, L.M.; Brietner, M.H.; Frerichs, A. (Eds): Multikonferenz Wirtschftsinformatik, Goettingen 2010, pp. 1523-1534.

Barbara Weber, Werner Wild, and Ruth Breu, "CBRFlow: Enabling Adaptive Workflow Management Through Conversational Case-Based Reasoning," in: Funk, P.; Gonzalez Calero, P.A. (Eds) ECCBR 2004. LNCS (LNAI), vol. 3155, pp. 434-448. Springer, Heidelberg. 2004.

Ian Watson and Srinath Perera, "Case-Based Design: a Review and Analysis of Building Design Applications," Journal of Artificial Intelligence for engineering Design, Analysis and Manufacturing AIEDAM, vol. 11, No. 1, pp. 59-87, Cambridge University Press, NY. 1997.

Mirjam Minor, Ralph Bergmann, Sebastian Goerg, and Kristin Walter, "Towards Case-Based Adaptation of Workflows," In Stefania Montani, and Isabelle Bichindaritz (Eds(, ICCBR 2010, LNAI 6176, pp. 421-435, Springer-Verlag, 2010.

Jaeho Kim, Woojong Suh, and Heeseok Lee, "Document-Based Workflow Modeling: A Case-Based Reasoning Approach," Expert Systems with Applications 23 pp. 77-93, 2002.

Markus Heller and Matthias Allgaier, "Model-Based Service Integration for Extensible Enterprise Systems with Adaptation Patterns," 5th International Conference on E-Business (ICE-B 2010), Jul. 2010.

May Lou Maher and Andres Gomez de Silva Garza, "Case-Based Reasoning in Design," IEEE Expert: Intelligent Systems and Their Applications, Vo. 12, N. 2, pp. 34-41, Mar. 1997.

Martin Shepperd, "Case-Based Reasoning and Software Engineering," Managing Software Engineering Knowledge, 2003.

David B. Leake, "CBR in Context: The Present and Future," In Leake D. (Ed.) Case-Based Reasoning: Experiences, Lessons, and Future Directions. AAAI Press/MIT Press, 1996.

(56) References Cited

OTHER PUBLICATIONS

Stefania Montani, "Prototype-based Management of Business Process Exception Cases," Applied Intelligence, Springer Science & Business Media, LLC 2009. Published Feb. 2009.
Ian Watson, "Applying case-based reasoning: techniques for enterprise systems." Morgan Kaufmann Publishers Inc., San Francisco, CA. 1998. pp. 1-38.
"Bain, W. (1986): ""A Case-Based Reasoning System for Subjective Assessment"". In: Kehler, T. (ed.) AAAI 86, AAAI: Morgan Kaufmann Publishers, Massachusetts, USA: 523-527."
"Bergmann, R. and Wilke, W. (1996): ""On the Role of Abstraction in Case-Based Reasoning"". In: Smith, I. F. C. andFaltings, B. (eds.): EWCBR, Springer, 1168, conf/ewcbr/BergmannW96: 28-43."
"Carbonell J. G. (1983): ""Derivational Analogy and Its Role in Problem Solving. In: Genesereth"", M. R. (ed.) AAAI 83,Washington, D.C., USA, AAAI: Morgan Kaufmann Publishers, Massachusetts, USA: 64-69."
"Forgy, C. (1982): ""Rete: A Fast Algorithm for the Many Pattern/Many Object Pattern Match Problem"". In: ArtificialIntelligence, (19) 1: 17-37."
"Hallerbach, A., Bauer, T. and Reichert, M. (2008): ""Managing Process Variants in the Process Life Cycle"". In:Cordeiro, J. and Filipe, J. (eds.): ICEIS (3-2), conf/iceis/HalierbachBR08: 154-161."
Hammond, K. (1989): "Case Based Planning: Viewing Planning as a Memory Task". Academic Press, San Diego, CA.
"Hanney, K., Keane, M. T., Smyth, B. and Cunningham, P. (1995): ""Systems, Tasks and Adaptation Knowledge:Revealing Some Revealing Dependencies"". In: Veloso, M. M. and Aamodt, A. (eds.): ICCBR, Springer, 1010, confliccbr/HanneyKSC95: 461-470."
Maher, M. L. and Garza, A. G. d. S. (1997): "Case-Based Reasoning in Design". In: IEEE Expert: Intelligent Systems and Their Applications, (12) 2: 34-41.
Mitra, R. and Basak, J. (2005): "Methods of case adaptation: A survey". In: Int. J. Intell. Syst., (20) 6: 627-645.
"Munoz-Avila, H. and Cox, M. T. (2008): ""Case-Based Plan Adaptation: An Analysis and Review"". In: IEEE IntelligentSystems, (23) 4: 75-81 ."
"Smyth, B. and Keane, M. T. (1996): ""Using adaptation knowledge to retrieve and adapt design cases."" In: KnowlegdeBased Systems, (9) 2: 127-135."
"Weber, B., Reichert, M. and Rinderle-Ma, S. (2008): ""Change patterns and change support features—Enhancing flexibility in process-aware information systems"". In: Data Knowl. Eng., (66) 3: 438-466."
"Wilke, W. and Bergmann, R. (1998): ""Techniques and Knowledge Used for Adaptation During Case-BasedProblem Solving."" In: Pobil, A. P. D., Mira, J. and Ali, M. (eds.): IEA/AIE (vol. 2), Springer, 1416, conflieaaielWilkeB98: 497-506."
S.A. Mertz, C. Eschinger, T. Eid, C. Pang, and L.F. Wurster, "Forecast: Software as a Service, Worldwide, 2010-2015," 1H11 Update Gartner, Inc. 2011.
H. Wu and L. Cao, "Community Collaboration for ERP Implementation," In: IEEE Software, (26) 6: 48-55. 2009.
Y. Dittrich, S. Vaucouleur, and S. Giff, "ERP Customization as Software Engineering: Knowledge Sharing and Cooperation." In: IEEE Software, (26) 6: 41-47. 2009.

Alan R. Hevner, Salvatore T. March Jinsoo Park, and Sudha Ram, "Design Science in Information Systems Research," MIS Quarterly vol. 28, No. 1, pp. 75-105. Mar. 2004.
Lars Brehm, Armin Heinzl and M. Lynne Markus, "Tailoring ERP Systems: A Spectrum of Choices and their Implications," In Proceedings of 34th Hawaii International Conference on System Sciences (HICSS'01), IEEE. 2001.
Ralph Bergmann and Armin Stahl, "Similarity Measures for Object-Oriented Case Representations," in B. Smith and P. Cunningham, editors, Procs. of the 4th European Workshop on Advances in Case-Based Reasoning (EWCBR '98) vol. 1488 of LNCS, pp. 25-36, Springer-Verlag. 1998.
Ralph Bergmann, "On the Use of Taxonomies for Representing Case Features and Local Similarity Measures," In: Proceedings of the 6th German Workshop on Case-Based Reasoning (GWCBR'98). 1998.
Juan A. Recio-Garcia, Belen Diaz-Agudo, Pedro Gonzales-Calero, Antonio Sanchez-Ruiz-Granados, "Ontology based CBR with jCOLIBRI," In: Applications and Innovations in Intelligent Systems XIV. Proceedings of AI-2006, the Twenty-sixth SGAI International Conference on Innovative Techniques and Applications of Artificial Intelligence, Springer, 206.
P. Bertolazzi, C. Krusich, M. Missikoff, "An Approach to the Definition of a Core Enterprise Ontology: CEO," OES-SEO 2001, International Workshop on Open Enterprise Solutions: Systems, Experiences, and Organizations, Rome, Sep. 14-15, 2001.
Mark S. Fox, "The TOVE Project: Towards a Common-Sense Model of the Enterprise," Industrial and engineering Applications of Artificial Intelligence and Expert Systems, Belli, F. and Radermacher, F.J. (Eds), Lecture Notes in Artificial Intelligence #604, Berlin: Springer-Verlag. 1992.
Mark S. Fox and Michael Gruninger, "Ontologies for Enterprise Integration," Proceedings of the 2nd Conference on Cooperative Information Systems, Toronto, Ontario. 1994.
Guido L. Geerts and William E. McCarthy, "The Ontological Foundation of REA Enterprise Information Systems," working paper, Michigan State University. Nov. 1999, Mar. 2000, Aug. 2000.
Martin Hepp, Frank Leymann, Chris Bussler, John Domingue, Alexander Wahler and Dieter Fensel, "Semantic Business Process Management: Using Semantic Web Services for Business Process Management," Proceedings of the IEEE International Conference on e-Business Engineering (ICEBE), 535-540. 2005.
Mike Uschold, Martin King, Stuart Moralee and Yannis Zorgios, "The Enterprise Ontology," the Knowledge Engineer Review 13(1). 1998.
Matthias Born, Agata Filipowska, Monika Caczmarek, Ivan Markovic Monika Starzecka, and Adam Walczak, "Business Functions Ontology and its Application in Semantic Business Process Modelling," Proceedings of the 19th Australansian Conference on Information Systems, 2008.
Jaap Gordijn "E3-value in a Nutshell," Technical Report, HEC University Lausanne, 2002.
SAP Business Maps, www.sap.com/solutions/businessmaps/index.epx. Printed May 26, 2011.
SAP Solution Composer, www.sap.com/solutions/businessmaps/composer/index.epx. Printed May 26, 2011.
Marc Ehrig, Peter Haase, Mark Hefke, and Nenad Stojanovic, "Similarity for Ontologies—A Comprehensive Framework," ECIS 2005 Proceedings. 2005.

* cited by examiner

REUSE OF ON-DEMAND ENTERPRISE SYSTEM CUSTOMIZATION KNOWLEDGE UTILIZING COLLECTIVE EXPERIENCE

BACKGROUND

Particular embodiments generally relate to enterprise systems.

Despite the advances in Service-Oriented Architectures (SOA), the integration of complementary services into standard enterprise systems requires deep expert knowledge. Typically the integration of services, provided by partners or independent software vendors, is carried out in time- and cost intensive integration projects.

In most cases, extension or adaptation of a core enterprise system itself is required. In order to extend or adapt standard enterprise systems a very high level of business domain knowledge as well as technical expert knowledge are required. Therefore services are typically integrated by highly specialized expert consultants (system or service integrators).

System integrators typically start from scratch while integrating services into standard enterprise systems. Given a new integration problem system integrators implicitly and manually search for similar problems they solved in the past, e.g. by searching in code fragments or documentations of already solved integration solutions. This implies a high degree of manual work and therefore leads to high integration costs.

SUMMARY

Systems and methods allow sharing and reuse of acquired customization knowledge of enterprise systems, utilizing collective customization experience. Particular embodiments employ Case-Based Reasoning (CBR) principles to manage customization experience in the context of both Software as a Service (SaaS) and Platform as a Service (PaaS) environments. Collective customization knowledge may be explicitly retrieved, adapted, shared, reused, and/or traded between tenants, partners, and optionally provider(s), of on-demand enterprise systems. A previous customization case stored within an experience base, may include one or more of the following: information allowing annotation of price information for trading the previous customization case (e.g. to another tenant); information restricting visibility of the previous customization case within the experience base; information defining a rating for the previous customization case within a community; information capturing a reuse frequency of the previous customization case; and/or information rendering anonymous at least a portion of the previous customization case.

An embodiment of a method comprises, providing an experience base comprising a stored customization case previously used by a first entity to customize an enterprise system, wherein the stored customization case includes a customization problem and a customization solution. A query is received from a second entity, the query comprising an unsolved enterprise customization case, the unsolved enterprise customization case having a new customization problem and not having a customization solution. A case-based reasoning engine is caused to reference the experience base and generate a similarity measure between the new customization problem and the stored customization case. The similarity measure is displayed to the second entity prior to adapting the customization solution for the unsolved customization case.

An embodiment of a non-transitory computer readable storage medium embodies a computer program for performing a method, said method comprising providing an experience base comprising a stored customization case previously used by a first entity to customize an enterprise system, wherein the stored customization case includes a customization problem and a customization solution. A query is received from a second entity, the query comprising an unsolved enterprise customization case, the unsolved enterprise customization case having a new customization problem and not having a customization solution. A case-based reasoning engine is caused to reference the experience base and generate a similarity measure between the new customization problem and the stored customization case. The similarity measure is displayed to the second entity prior to adapting the customization solution for the unsolved customization case.

An embodiment of a computer system comprises one or more computer processors and a non-transitory computer readable storage medium. The non-transitory computer readable storage medium comprising instructions for controlling the one or more computer processors to be operable to access an experience base comprising a stored customization case previously used by a first entity to customize an enterprise system, wherein the stored customization case includes a customization problem and a customization solution. The non-transitory computer readable storage medium further comprises instructions for receiving from a second entity, a query comprising an unsolved enterprise customization case, the unsolved enterprise customization case having a new customization problem and not having a customization solution. The non-transitory computer readable storage medium further comprises comprising instructions for causing a case-based reasoning engine to reference the experience base and generate a similarity measure between the new customization problem and the stored customization case. The non-transitory computer readable storage medium comprising instructions for displaying the similarity measure to the second entity prior to adapting the customization solution for the unsolved customization case.

According to certain embodiments a case-based reasoning engine comprises an add-on to a Platform-as-a-Service (PaaS) component of the enterprise system.

In some embodiments the first entity and/or the second entity are system integrators.

In particular embodiments the first entity and/or the second entity are tenants of the enterprise system.

According to some embodiments the stored customization case includes information allowing annotation of price information for trading.

Particular embodiments may further comprise storing the new customization problem and an adapted customization solution, as a new customization case.

In certain embodiments the stored customization case includes information configured to: restrict visibility of the stored customization case within the experience base; define a rating for the stored customization case within a community; capture a reuse frequency of the stored customization case; and/or render anonymous at least a portion of the stored customization case.

The following detailed description and accompanying drawings provide a better understanding of the nature and advantages of certain embodiments.

DETAILED DESCRIPTION

Described herein are techniques for sharing customization knowledge. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

System Overview

Figure 1:
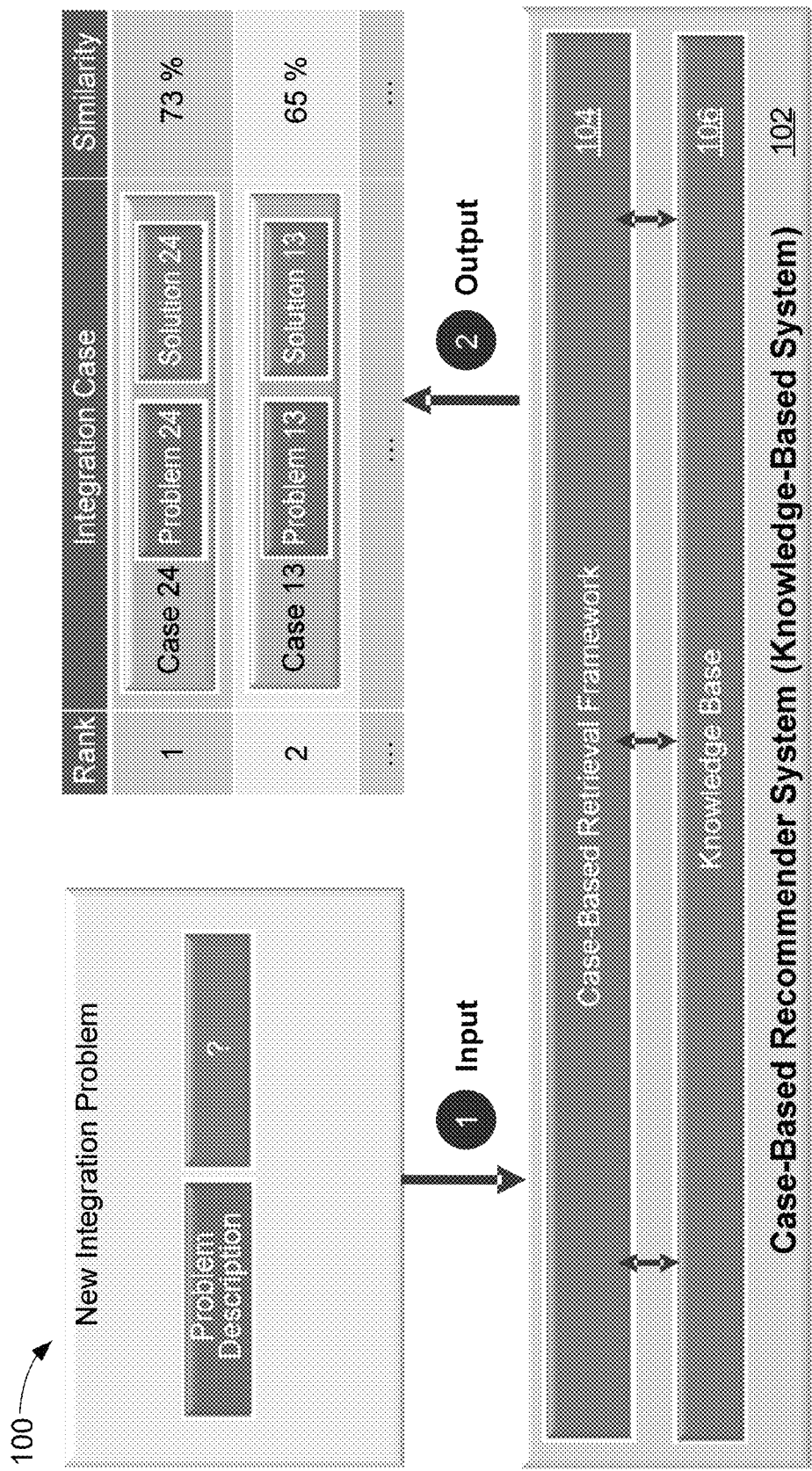
FIG. 1 depicts a system for providing definition and retrieval of integration cases according to one embodiment.

FIG. 1 depicts a system 100 for providing definition and retrieval of integration cases according to one embodiment. A case-based recommender system 102, which includes a case-based retrieval framework 104 and a knowledge base 106. Case-based retrieval framework 104 provides a platform with a knowledge base of already solved integration cases that can be leveraged for adapting a present problem. An integration case (also referred to herein as a customization case) is a description of a previous adaptation of the enterprise system that was performed. Case-based retrieval framework 104 retrieves integration cases that are similar to the present problem to allow a service integrator to adapt a problem solution of the already solved integration case as a solution for the present problem. The adaptation of the problem solution allows re-use of previous knowledge to adapt the enterprise system.

In one example, the service integrator inputs a new integration problem that includes a problem description into case-based retrieval framework 104. The integration problem may be considered an integration case also. However, the term integration problem is used for discussion purposes and is an integration cases that does not include a solution. Case-based retrieval framework 104 searches knowledge base 106 to determine integration cases that have been previously solved. Case-based retrieval framework 104 outputs the integration cases based on the similarity to the new integration problem. The service integrator may then use the integration cases, which include a problem description and problem solution to determine the solution for the new integration problem.

In one embodiment, case-based retrieval framework 104 is used when an extension to a standard enterprise system is being performed. Such a standard enterprise system is also referred to herein a packaged enterprise software. A standard enterprise system may be a standard software system, such as an enterprise resource planning (ERP), customer relationship management (CRM), supply chain management (SCM), or supplier relationship management (SRM) system. The standard enterprise system may be sent to a variety of companies. Each company may want to adapt or extend the standard enterprise system. For example, certain customizations may be performed, such as by adding new service integrator interface (UI) elements to core UI components, adding new process steps to core process models or even extending business objects with additional fields.

In one embodiment, the system integrator may want to integrate a complementary service into the standard enterprise system. The integration problem may be described based on different categories that define the problem, such as the categories of an integration goal, an integration context, and integration requirements. Based on the problem description, case-based retrieval framework 104 searches knowledge base 106 for similar integration cases that have already been solved in the past using a case retrieval algorithm. A list of existing integration cases is generated and output to the system integrator. The list contains integration cases that are ranked according to their computed similarity to the integration problem currently.

Once selected, an integration case may be adapted to the integration problem that is trying to be solved. Embodiments of the present invention relate to a framework for performing this adaptation.

Case-based Reasoning Cycle

Figure 2:
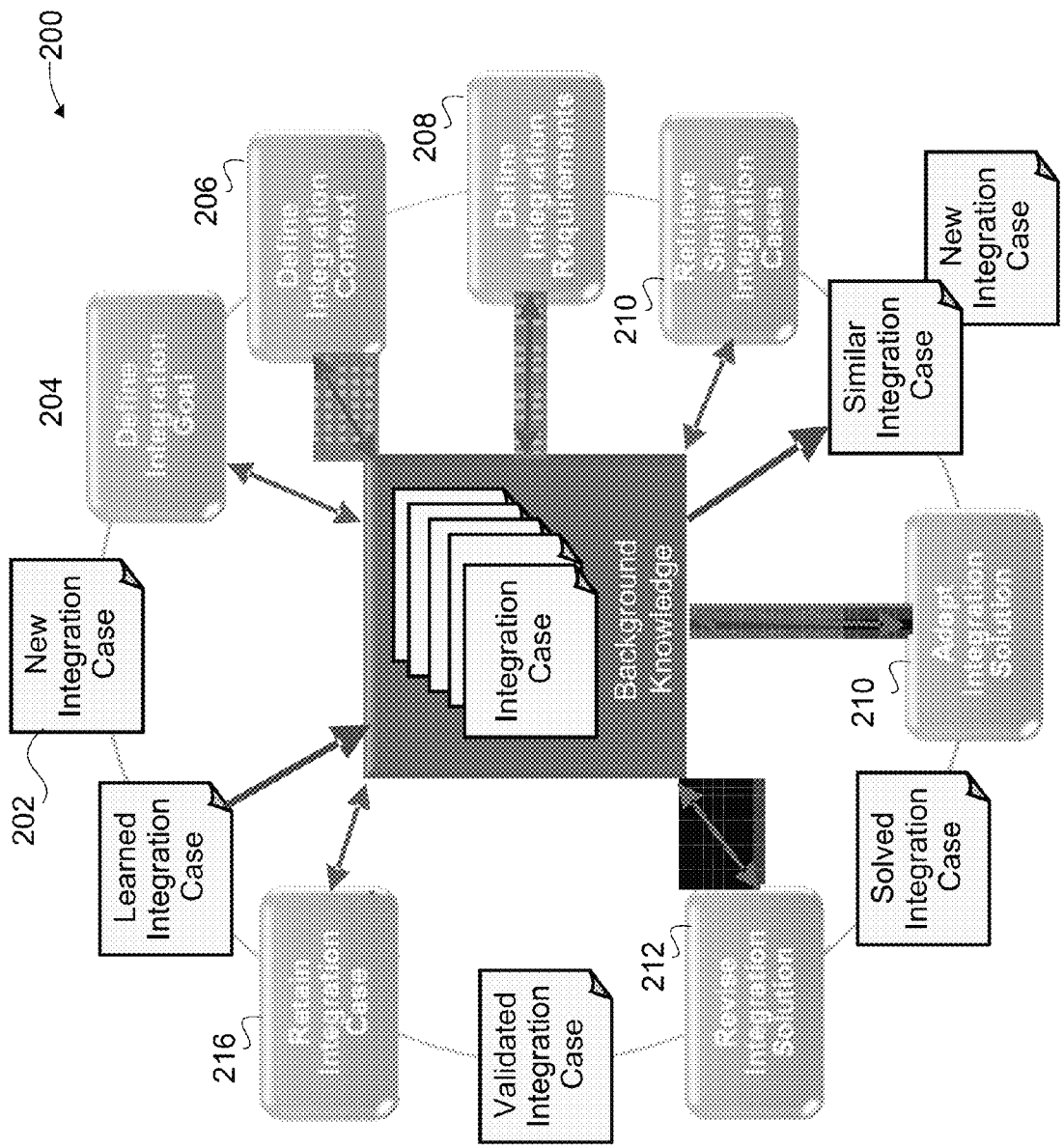
FIG. 2 depicts a case-based reasoning cycle for service integration according to one embodiment.

Particular embodiments use case-based reasoning for determining the integration cases. FIG. 2 depicts a case-based reasoning cycle 200 for service integration according to one embodiment. Particular embodiments focus on an adapt integration solution phase. However, the entire cycle will be described.

At 202, a new integration case is initiated. At 204, an integration goal phase is performed. The integration goal defines the general goal that should be reached by the integration solution. For example, the goal may indicate what kind of target system should be extended, what kind of customizing/flexibility use case should be implemented, or what kind of integration flavor should be implemented (e.g., a service integrator interface or process extension). As will be described below, the integration goal may be defined using a wizard-based questionnaire.

At 206, a define integration context phase is performed. The integration context defines the functional area within the enterprise system where the service should be integrated. For example, the functional area may be core UI or process components that need to be extended to integrate the service. The context may be a service context and/or a target system context. The service context is associated with the provider of the service and describes the context of a service that may be integrated. For example, the service may be provided by an outside provider and/or the enterprise. The service context may define what service should be integrated or what are the business semantics of the service.

The target system context is a consumer context, that is, the context associated with the customized enterprise system. The target system context determines which functional area of the enterprise system the service should be integrated (business semantics) or what components in the enterprise system should be extended (e.g., UI and/or process components). The integration context may be defined using a wizard-based questionnaire as will be described below.

At 208, a define integration requirements phase is performed. The integration requirements may be grouped into different categories that may describe requirements for the integration solution. For example, the categories may be UI extension requirements, process extension requirements, business logic extension requirements, technical integration requirements, and non-functional integration requirements. These integration requirements may be defined using the wizard-based questionnaire and will be described in more detail below.

At 210, a retrieve similar integration cases phase is performed. In this phase, existing integration cases that have problem descriptions that are considered most similar to the problem description of the new integration problem are determined and output. The similarity is computed using a range of different similarity measures. The different types of similarity measures may depend on different attributes defined in the new integration problem. Customization of weights for the different similarity measures may be provided and are described below.

At 212, an adapt integration solution phase is performed. A similar integration case that is output may be selected and re-used as a template to be adapted with respect to the new integration problem. In one embodiment, a problem solution part of a similar case may be extracted and adapted to the new application context of the new integration problem to be solved. The integration solution may be modeled using adaptation patterns that may link patterns to extension points of service elements, add patterns, delete patterns, and replace patterns. The adaptation integration solution phase is described in more detail below in connection with FIG. 5.

At 214, a revised integration solution phase is performed. In this phase, the adapted or solved new integration case is validated as to whether it meets the integration requirements. The criteria may include the correctness of the solution and quality of the solution.

At 216, a retain integration case phase is performed. After the solved new integration problem has been validated, an integration case with the problem description and the solution is stored in knowledge base 106. This case may be used in future cases to solve other integration problems. For example, case-based retrieval framework 104 may learn by the learning of a new experience (new integration case), learning of similarity knowledge (e.g. weights), or learning of adaptation knowledge.

Integration Case Description

Figure 3:
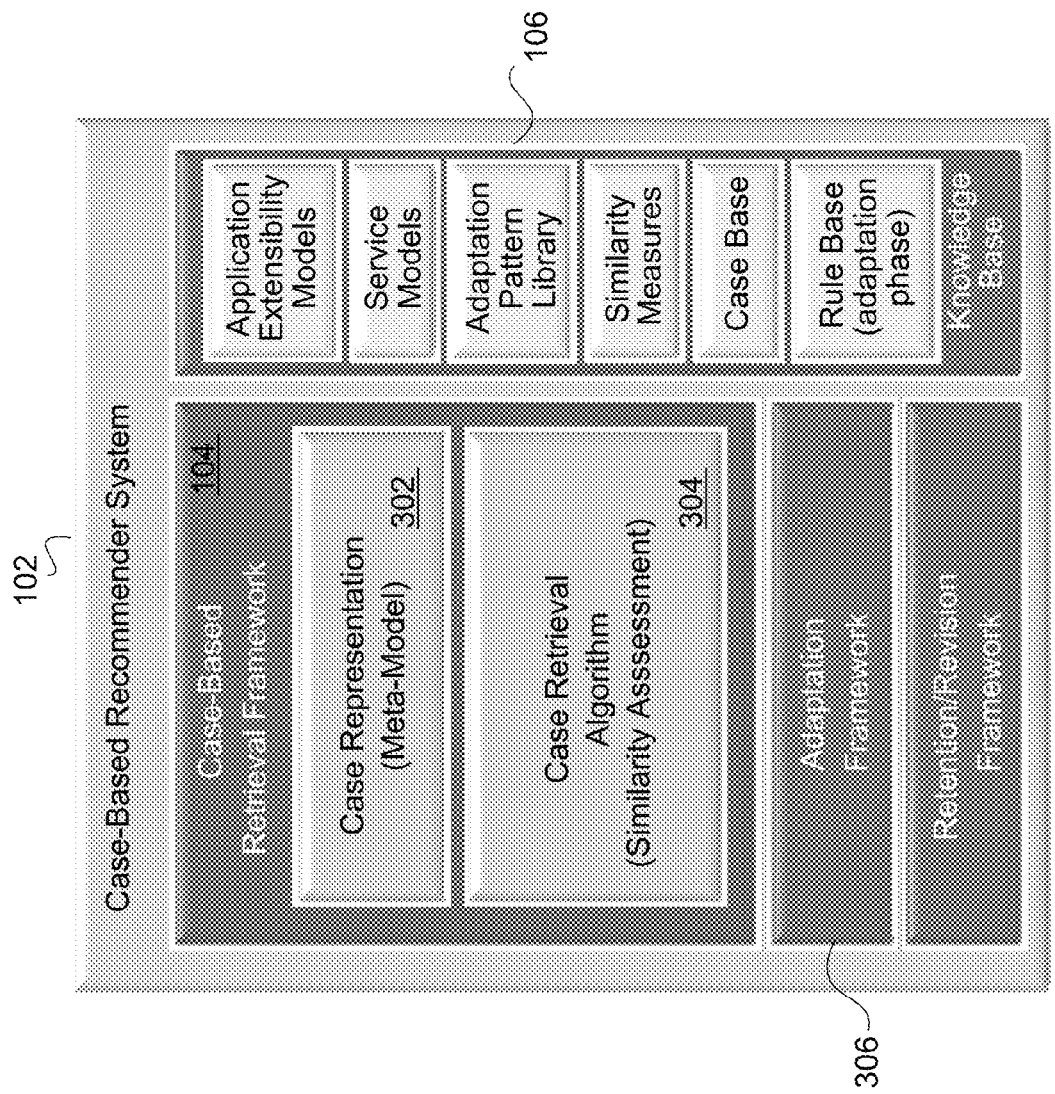
FIG. 3 shows a more detailed example of case-based recommender system utilizing adaptation according to an embodiment.

FIG. 3 shows a more detailed example of case-based recommender system 102 according to one embodiment. Case-based retrieval framework 104 includes a case representation meta-model 302 and a case retrieval algorithm 304. Knowledge base 106 also includes different information gleaned from previous integration cases, such as application extensibility models, service models, an adaptation pattern library, similarity measures, a case-base, and a rule base. As discussed extensively below, an adaptation framework 306 is used to adapt the similar integration cases.

Figure 5:
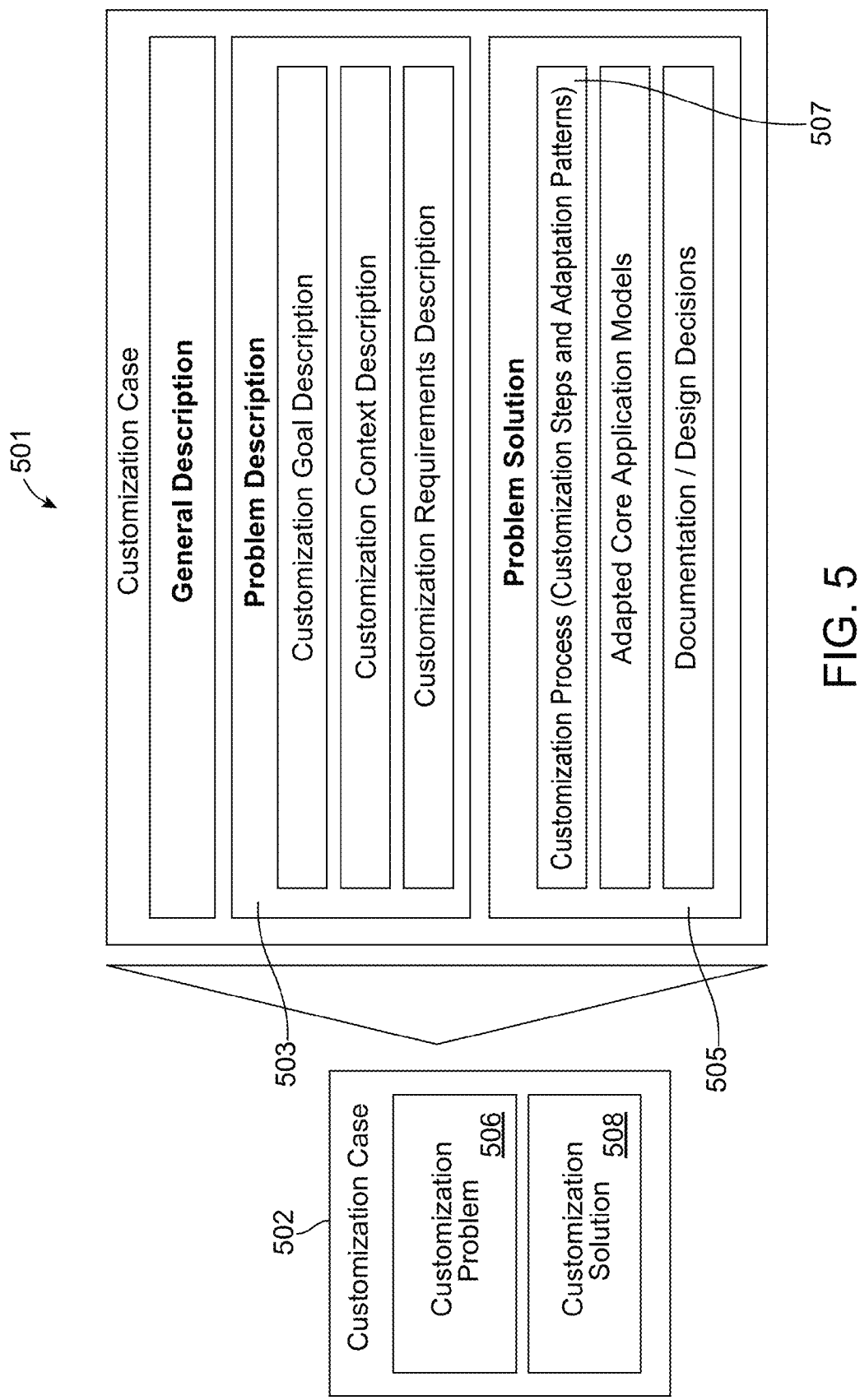
FIG. 5 shows a Meta-Model corresponding to a customization case utilizing adaptation according to a particular embodiment.

Case representation meta-model 302 provides metadata that describes categories for a customization case. For example, FIG. 5 shows different categories included in a customization case 502 according to one embodiment. Broadly, customization case 502 includes a customization problem 506 and a customization solution 508.

Customization problem 506 is a description of the problem for the customization case. For example, a description of the problem may be what extension needs to be performed on the standard enterprise system. Customization problem 506 covers information to decide if this case is applicable for a new customization problem (query case). In one embodiment, the content includes the goal to be achieved by the customization solution, the context of the problem situation, and requirements/constraints for the customization solution.

Customization solution 508 is the solution for the problem. The solution for the problem may be how to extend, enhance, and/or modify the standard enterprise system. Customization solution 508 includes information that describes a solution to the integration problem sufficiently. For example, the information includes the solution itself (e.g., integration models, substantiated adaptation patterns, extended core models, other documentation), possible alternative solutions, feedback/solution evaluation, and justification/explanations.

At 501, the specific categories for integration case 502 are shown. The meta-model includes a problem description 503 (corresponding to customization problem 506) and a problem solution 505 (corresponding to integration solution 508).

Problem description 503 includes different attributes that can be defined for the problem. Although the attributes included in problem description 503 are described, case-based retrieval framework 100 is designed in such a way that it is possible to flexibly add further attributes and similarity measures. The attributes outlined are just examples. The integration goal description includes attributes that may define the enterprise system that should be extended, define the customizing or flexibility use case that should be implemented, or define the principle integration flavor of the service in the target consumption environment of the enterprise system.

Different attributes are described in Table 1 in Appendix A. The attributes of Appendix A are only examples, however, and the case description itself is extensible in the sense that further attributes can be added. The adaptation procedure discussed in detail below may utilize one or more of these attributes to compute the differences between the query and retrieved customization case.

The integration context description describes the service that should be integrated into the enterprise system and defines the business semantics of the service to be integrated. Also, in an enterprise system context, the business semantics of the target components in the enterprise system that should be extended by the new service, the target UI components of the enterprise system that should be extended/adapted, and the target process components of the enterprise system that should be extended/adapted may be defined. Different attributes for the integration context specification are described in Table 2 of Appendix A.

The integration requirements specification includes different categories of UI extension requirements, process extension requirements, business logic extension requirements, technical integration requirements, and non-functional requirements. UI extension requirements define how an existing UI component of the standard enterprise system should be extended in order to integrate the complementary service (delivered by a third party provider, e.g. ISV).

UI extension requirements are the requirements that define what is needed to extend the UI. UI extension requirements that define a textual description of the integration requirements, how the service should be triggered within a UI component, whether the UI component needs to be extended with additional UI controls, and whether the UI component needs to be extended with additional UI controls to gather information that is required to call the service or show/display result values of the service implication. Table 3 of Appendix A shows different attributes for the UI extension requirements specification.

Process extension requirements define how an existing process component of the standard enterprise system should be extended in order to integrate the complementary service (delivered by a third party provider, e.g. ISV). Process extension requirements may define the initiator of a process extension scenario, a position with respect to a process where the extension process should be plugged in, whether data should flow from a core process to an extension process, whether data should flow from the extension process to the core process, the communication mode between the core process and the extension process, whether multiple core processes are involved in the integration scenario, and whether multiple extension processes are involved in the integration scenario may be defined. Table 4 of Appendix A describes different attributes for process extension requirements.

Business logic extension requirements define how the existing business or application logic of the standard enterprise system should be extended in order to integrate the complementary service (delivered by a third party provider, e.g. ISV). Business logic extension requirements may define different attributes that may be associated with the business logic of an application. For example, the different attributes may define whether data returned from a service should be persistent in the enterprise system, whether the integration logic has to read data from the enterprise system, whether the integration logic has to write data into the enterprise system, whether the integration logic needs to access additional business logic on the enterprise system, whether an interactive service integrator task is required in the integration logic, whether a human service integrator task is required in the integration logic, whether a customizing parameter has to be set/adjusted in the enterprise system, and whether a new customizing parameter has to be added to the enterprise system. Table 5 of Appendix A describes attributes in the business logic extension requirements.

External service integration requirements describe requirements that are used to define how to integrate external services. The attributes define whether standard business-to-business (B2B) protocols should be used for the communication with the external service and which technical communication protocols should be used for the communication with the external service. Table 6 of Appendix A shows different attributes for the external service integration requirements.

Non-functional integration requirements define non-functional constraints that the extension logic defined by the service integrator should fulfill. Non-functional integration requirements define whether the integration logic needs to authenticate in the communication with the external service, whether the communication is performance-critical and if caching mechanisms are required, whether the communication with the external service should be logged, whether the messages sent to the service or received from the service should be encrypted, whether the messages sent to the service or received from the service should be digitally signed, and whether some specific transaction handling is required. Table 7 of Appendix A shows different attributes for non-functional integration requirements.

A previous integration/customization case stored within an experience base for possible reuse, may further include one or more of the following pieces of information: information allowing annotation of price information for trading the previous customization case (e.g. to another tenant); information restricting visibility of the previous customization case within the experience base; information defining a rating for the previous customization case within a community; information capturing a reuse frequency of the previous customization case; and/or information rendering anonymous at least a portion of the previous customization case.

Case Retrieval

Figure 20:
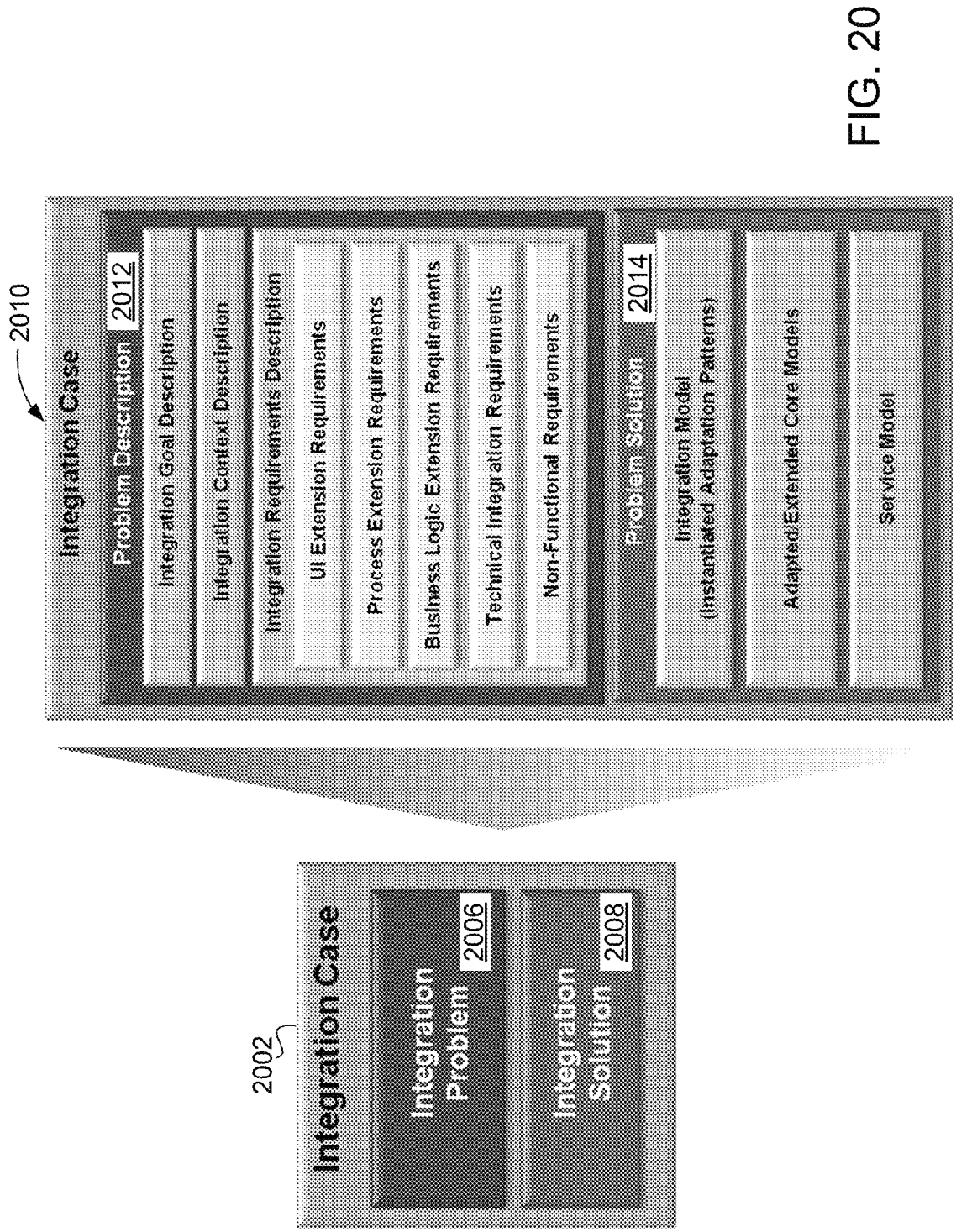
FIG. 20 shows different categories included in an integration case according to one embodiment.

Case representation meta-model 302 provides metadata that describes categories for an integration case. For example, FIG. 20 shows different categories included in an integration case 2002 according to one embodiment. Broadly, integration case 2002 includes an integration problem 2006 and an integration solution 2008.

Integration problem 2006 is a description of the problem for the integration case. For example, a description of the problem may be what extension needs to be performed on the standard enterprise system. Integration problem 2006 covers all the information needed to decide if this case is applicable for a new integration problem (query case). In one embodiment, the content includes the goal to be achieved by the integration solution, the context of the problem situation, and requirements/constraints for the integration solution.

Integration solution 2008 is the solution for the problem. The solution for the problem may be how to extend the standard enterprise system. Integration solution 2008 includes information that describes a solution to the integration problem sufficiently. For example, the information includes the solution itself (e.g., integration models, substantiated adaptation patterns, extended core models, other documentation), possible alternative solutions, feedback/solution evaluation, and justification/explanations.

At 2010, the specific categories for integration case 2002 are shown. The meta-model includes a problem description 2012 (corresponding to integration problem 2006) and a problem solution 2014 (corresponding to integration solution 2008).

Problem description 2012 includes different attributes that can be defined for the problem. Although the attributes included in problem description 2012 are described, case-based retrieval framework 100 is designed in such a way that it is possible to flexibly add further attributes and similarity measures. The attributes outlined are just examples. The integration goal description includes attributes that may define the enterprise system that should be extended, define the customizing or flexibility use case that should be implemented, or define the principle integration flavor of the service in the target consumption environment of the enterprise system. Different attributes are described in Table 1 in Appendix A.

The integration context description describes the service that should be integrated into the enterprise system and defines the business semantics of the service to be integrated. Also, in an enterprise system context, the business semantics of the target components in the enterprise system that should be extended by the new service, the target UI components of the enterprise system that should be extended/adapted, and the target process components of the enterprise system that should be extended/adapted may be defined. Different attributes for the integration context specification are described in Table 2 of Appendix A.

The integration requirements specification includes different categories of UI extension requirements, process extension requirements, business logic extension requirements, technical integration requirements, and non-functional requirements.

UI extension requirements define how an existing UI component of the standard enterprise system should be extended in order to integrate the complementary service (delivered by a third party provider, e.g. ISV).

UI extension requirements are the requirements that define what is needed to extend the UI. UI extension requirements that define a textual description of the integration requirements, how the service should be triggered within a UI component, whether the UI component needs to be extended with additional UI controls, and whether the UI component needs to be extended with additional UI controls to gather information that is required to call the service or show/display result values of the service implication. Table 3 of Appendix A shows different attributes for the UI extension requirements specification.

Process extension requirements define how an existing process component of the standard enterprise system should be extended in order to integrate the complementary service (delivered by a third party provider, e.g. ISV). Process extension requirements may define the initiator of a process extension scenario, a position with respect to a process where the extension process should be plugged in, whether data should flow from a core process to an extension process, whether data should flow from the extension process to the core process, the communication mode between the core process and the extension process, whether multiple core processes are involved in the integration scenario, and whether multiple extension processes are involved in the integration scenario may be defined. Table 4 of Appendix A describes different attributes for process extension requirements.

Business logic extension requirements define how the existing business or application logic of the standard enterprise system should be extended in order to integrate the complementary service (delivered by a third party provider, e.g. ISV).

Business logic extension requirements may define different attributes that may be associated with the business logic of an application. For example, the different attributes may define whether data returned from a service should be persistent in the enterprise system, whether the integration logic has to read data from the enterprise system, whether the integration logic has to write data into the enterprise system, whether the integration logic needs to access additional business logic on the enterprise system, whether an interactive service integrator task is required in the integration logic, whether a human service integrator task is required in the integration logic, whether a customizing parameter has to be set/adjusted in the enterprise system, and whether a new customizing parameter has to be added to the enterprise system. Table 5 of Appendix A describes attributes in the business logic extension requirements.

External service integration requirements describe requirements that are used to define how to integrate external services. The attributes define whether standard business-to-business (B2B) protocols should be used for the communication with the external service and which technical communication protocols should be used for the communication with the external service. Table 6 of Appendix A shows different attributes for the external service integration requirements.

Non-functional integration requirements define non-functional constraints that the extension logic defined by the service integrator should fulfill. Non-functional integration requirements define whether the integration logic needs to authenticate in the communication with the external service, whether the communication is performance-critical and if caching mechanisms are required, whether the communication with the external service should be logged, whether the messages sent to the service or received from the service should be encrypted, whether the messages sent to the service or received from the service should be digitally signed, and whether some specific transaction handling is required. Table 7 of Appendix A shows different attributes for non-functional integration requirements.

The first three phases of defining the integration goal, defining the integration context, and defining the integration requirements have now been described. The following will describe the retrieve similar integration cases phase. In one example, a case retrieval algorithm uses a similarity assessment based on a local-global principle. The local-global principle computes local similarity measures for attributes and then computes a global similarity measure using the local similarity measures. This process will be described in more detail below.

Figure 16:
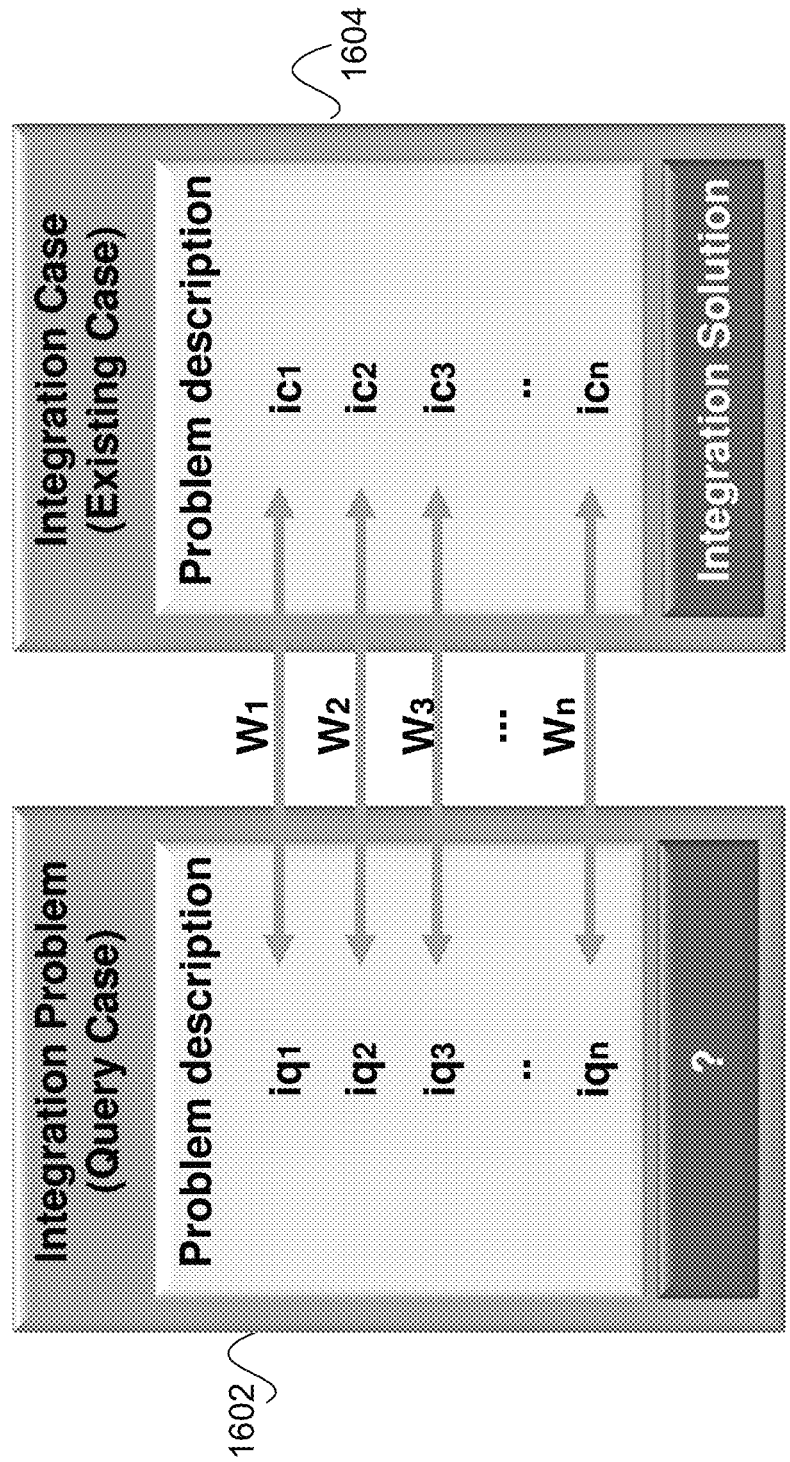
FIG. 16 shows an example of a similarity assessment according to one embodiment.

The similarity assessment computes the similarity between a new integration problem (e.g., query case) and an integration case (e.g., existing case) from knowledge base 106. FIG. 16 shows an example of a similarity assessment according to one embodiment. An integration problem 1602 is input into case-based retrieval framework 104. The similarity assessment compares a number of integration cases with the integration problem. For discussion purposes, the integration case is shown as an integration case 1604 for the comparison.

Integration problem 1602 includes a problem description but no integration solution. Integration case 1604 includes a problem description and also an integration solution. The integration problem for the query case includes a number of attributes iq1 . . . iqn that describe the problem. Also, for the existing case, a number of attributes ic1-icn describe the problem for integration case 1604. A similarity measure W1 . . . Wn between similar attributes of the problem description is calculated.

Each attribute may be assigned an attribute type. In one embodiment, each attribute of the integration problem is compared to the respective attribute of the integration case retrieved from the knowledge base. The similarity function depends on the attribute type. For each attribute type it might be possible to configure multiple similarity functions. Attributes of different types may also be compared in other embodiments. A single attribute may be compared or a group of attributes may be compared together. For each attribute, a separate similarity function may be used. However, the same similarity function may be used multiple times in comparing different attributes types. First, a local similarity measure is performed on the respective attribute type. A global similarity measure may then be determined by combining the local similarity measures using an amalgamation function (e.g., a weighted average of the local similarity measures).

The following will describe the global similarity measure and then different examples for local similarity measures for the attributes of the problem description. The global similarity measure measures global similarity for the integration problem and an integration case. In one embodiment, the global similarity measure weights and aggregates the different local similarity measure results. Other global similarity measures may also be used. In one example, the global similarity measure may be defined by weighting local similarity measures for the attributes as defined by:

$$\text{sim}(iq, ic) = \frac{\sum_{i=1}^{n} w_i * \text{sim}_i(iq_i, ic_i)}{\sum_{i=1}^{n} w_i}$$

Explanations

| | |
|---|---|
| iq | Query case |
| ic | Integration case |
| $iq_i$ | Attribute i of query case |
| $ic_i$ | Attribute i of integration case |
| $\text{sim}_i(iq_i, ic_i)$ | Local similarity measure for case attribute i |
| $w_i$ | Weight of similarity measure for case attribute i |
| N | Number of case attributes |

The following will describe the various local similarity functions. The sample attributes that are described above will be used; however, other attributes may also be appreciated and other local similarity measures may be used.

Figure 17A:
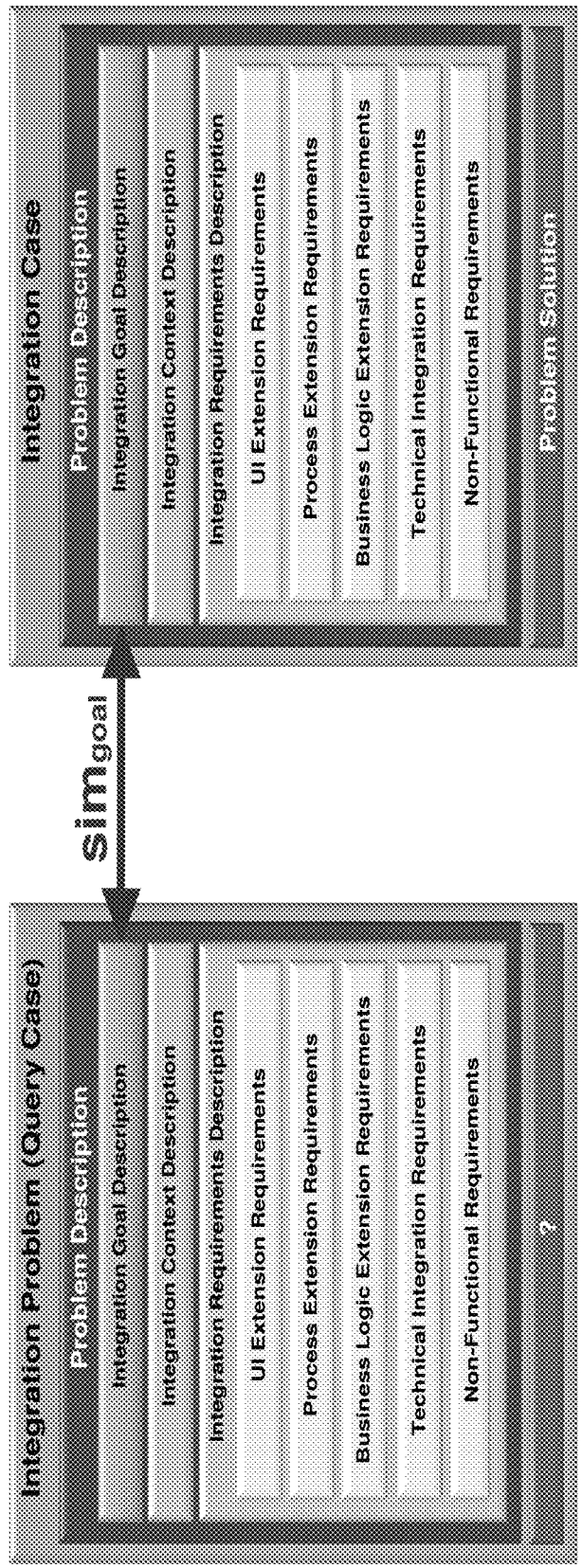
FIG. 17a shows an example of integration goal similarity measure according to one embodiment.

FIG. 17a shows an example of integration goal similarity measure according to one embodiment. The similarity measure $\text{sim}_{goal}$ is used to compare the attributes for the integration goal description in the integration problem and the integration case. The integration goal similarity measure may be the weighted average of the local similarity measures for the attributes "TargetBusinessSystemType", "UsageScenario", and "IntegrationFlavor". These attributes are described in Table 1 of Appendix A. Attributes described in Appendix A herein are examples and other attributes may be contemplated. The following equation may be used to determine the integration goal similarity measure:

$$\text{Sim}_{goal}(iq_{goal}, ic_{goal}) = \frac{w_{sys} * \text{sim}_{sys}(iq_{sys}, ic_{sys}) + w_{uc} * \text{sim}_{uc}(iq_{uc}, ic_{uc}) + w_{flavour} * \text{sim}(iq_{flavour}, ic_{flavour})}{w_{sys} + w_{uc} + w_{flavour}}$$

Explanations

| | |
|---|---|
| $iq_{goal}$ | Goal specification part of the query case |
| $ic_{goal}$ | Goal specification part of the integration case |
| $\text{sim}_{sys}(iq_{sys}, ic_{sys})$ | Local similarity measure for the case attribute 'TargetBusinessSystemType' |
| $w_{sys}$ | Weight of similarity measure for the case attribute 'TargetBusinessSystemType' |
| $\text{sim}_{uc}(iq_{uc}, ic_{uc})$ | Local similarity measure for the case attribute 'UsageScenario' |
| $w_{uc}$ | Weight of similarity measure for the case attribute 'UsageScenario' |
| $\text{sim}(iq_{flavour}, ic_{flavour})$ | Local similarity measure for the case attribute 'IntegrationFlavor' |
| $w_{flavour}$ | Weight of similarity measure for the case attribute 'IntegrationFlavor' |

The above measure computes the local similarity measures for the attributes above, weights them, and aggregates them.

Figure 17B:
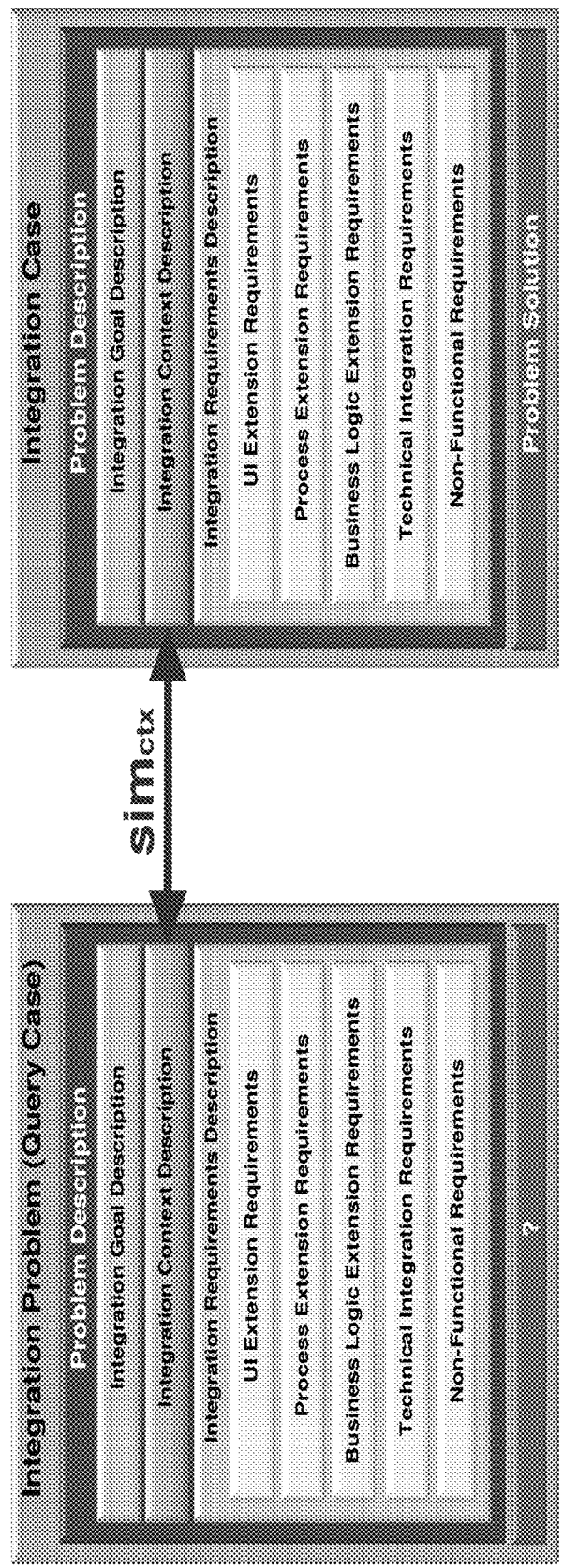
FIG. 17b shows an integration context similarity measure according to one embodiment.

FIG. 17b shows an integration context similarity measure according to one embodiment. The integration context similarity measure $\text{sim}_{ctx}$ measures similarity for the attribute integration context description. The similarity measure $\text{sim}_{ctx}$ may be defined as the weighted average of the local similarity measures for the external service to be integrated and the core application components of the target system that have/had to be adapted. For example, the local attributes shown in Table 2 of Appendix A may be used. An equation for the integration context similarity may be:

$$\text{sim}_{ctx}(iq_{ctx}, ic_{ctx}) = \frac{w_{service} * \text{sim}_{service}(iq_{service}, ic_{service}) + w_{core_{comp}} * \text{sim}_{core_{comp}}(iq_{core_{comp}}, ic_{core_{comp}})}{w_{service} + w_{core_{comp}}}$$

Explanations

| | |
|---|---|
| $iq_{ctx}$ | Context specification part of the query case |
| $ic_{ctx}$ | Context specification part of the integration case |
| $\text{sim}_{service}(iq_{service}, ic_{service})$ | Local similarity measure for the service to be integrated |
| $w_{service}$ | Weight of the similarity measure for the service to be integrated |
| $\text{sim}_{core_{comp}}(iq_{core_{comp}}, ic_{core_{comp}})$ | Local similarity measure for the core application components that are extended/adapted |
| $w_{core_{comp}}$ | Weight of the similarity measure for the core application components to be extended/adapted |

The integration context similarity measure includes a service similarity measure and a core application component similarity measure. The service similarity measure $\text{sim}_{service}$ may be further defined as the weighted average of the local similarity measures for the business semantics and syntactical/technical characteristics of the services to be compared:

$$\text{sim}_{service}(\text{iq}_{service}, \text{ic}_{service}) = \frac{w_{s_{sem}} * \text{sim}_{s_{sem}}(\text{iq}_{s_{sem}}, \text{ic}_{s_{sem}}) + \text{sim}_{s_{syn}}(\text{iq}_{s_{syn}}, \text{ic}_{s_{syn}})}{w_{s_{sem}} + w_{s_{syn}}}$$

Explanations

| | |
|---|---|
| $\text{iq}_{service}$ | Query case attribute of the service to be integrated |
| $\text{ic}_{service}$ | Integration case attribute of the service to be integrated |
| $\text{sim}_{s_{sem}}$ ($\text{iq}_{s_{sem}}$, $\text{ic}_{s_{sem}}$) | Local similarity measure that compares the business semantics of the services to be integrated |
| $w_{s_{sem}}$ | Weight of the similarity measure for the business semantics of the services |
| $\text{sim}_{s_{syn}}$ ($\text{iq}_{s_{syn}}$, $\text{ic}_{s_{syn}}$) | Local similarity measure that compares the syntactical/technical characteristics of the services to be integrated |
| $w_{s_{syn}}$ | Weight of the similarity measure for syntactical/technical characteristics of the services |

A core application component measure $\text{sim}_{core\_comp}$ may be further defined as the weighted average of the local similarity measures for the business semantics and the syntactical/technical characteristics of the core application components to be compared:

$$\text{sim}_{core_{comp}}(\text{iq}_{core_{comp}}, \text{ic}_{core_{comp}}) = \frac{w_{cc_{sem}} * \text{sim}_{cc_{sem}}(\text{iq}_{cc_{sem}}, \text{ic}_{cc_{sem}}) + w_{cc_{extcap}} * \text{sim}_{cc_{extcap}}(\text{iq}_{cc_{extcap}}, \text{ic}_{cc_{extcap}})}{w_{cc_{sem}} + w_{cc_{extcap}}}$$

Explanations

| | |
|---|---|
| $\text{iq}_{core_{comp}}$ | Query case attribute of the core applications component(s) that need to be extended/adapted |
| $\text{ic}_{core_{comp}}$ | Integration case attribute of the core applications component(s) that have been extended/adapted |
| $\text{sim}_{cc_{sem}}$ ($\text{iq}_{cc_{sem}}$, $\text{ic}_{cc_{sem}}$) | Local similarity measure that compares the business semantics of the core application component(s) |
| $w_{cc_{sem}}$ | Weight of the similarity measure for the business semantics of the core application components |
| $\text{sim}_{sc_{extcap}}$ ($\text{iq}_{cc_{extcap}}$, $\text{ic}_{cc_{extcap}}$) | Local similarity measure that compares the technical extension capabilities of the core application component(s) |
| $w_{cc_{extcap}}$ | Weight of the similarity measure for the technical extension capabilities of the core application component(s) |

The core application component extensibility capability measure $\text{sim}_{cc\_ext\_cap}$ in the core application component measure may be further defined as the weighted average of local similarity measures for the UI extension capabilities and process extension capabilities:

$$\text{sim}_{cc_{extcap}}(\text{iq}_{cc_{extcap}}, \text{ic}_{cc_{extcap}}) = \frac{w_{cc\_ui\_ext} * \text{sim}_{cc\_ui\_ext}(\text{iq}_{cc\_ui\_ext}, \text{ic}_{cc\_ui\_ext}) + w_{cc\_pro\_ext} * \text{sim}_{cc\_pro\_ext}(\text{iq}_{cc\_pro\_ext}, \text{ic}_{cc\_ui\_ext})}{w_{cc\_ui\_ext} + w_{cc\_pro\_ext}}$$

Explanations

| | |
|---|---|
| $\text{iq}_{cc_{extcap}}$ | Query case attribute that defines the technical extension capabilities of the core application component(s) |
| $\text{ic}_{cc_{extcap}}$ | Integration case attribute that defines the technical extension capabilities of the core application component(s) |
| $\text{sim}_{cc_{ui_{ext}}}$ ($\text{iq}_{cc_{ui_{ext}}}$, $\text{ic}_{cc_{ui_{ext}}}$) | Local similarity measure that compares the UI extension capabilities of the core application component(s) |
| $w_{cc_{ui_{ext}}}$ | Weight of the similarity measure for the UI extension capabilities of the core application component(s) |
| $\text{sim}_{cc_{pro_{ext}}}$ ($\text{iq}_{cc_{pro_{ext}}}$, $\text{ic}_{cc_{pro_{ext}}}$) | Local similarity measure that compares the process extension capabilities of the core application component(s) |
| $w_{cc_{pro_{ext}}}$ | Weight of the similarity measure for the process extension capabilities of the core application component(s) |

Figure 17C:
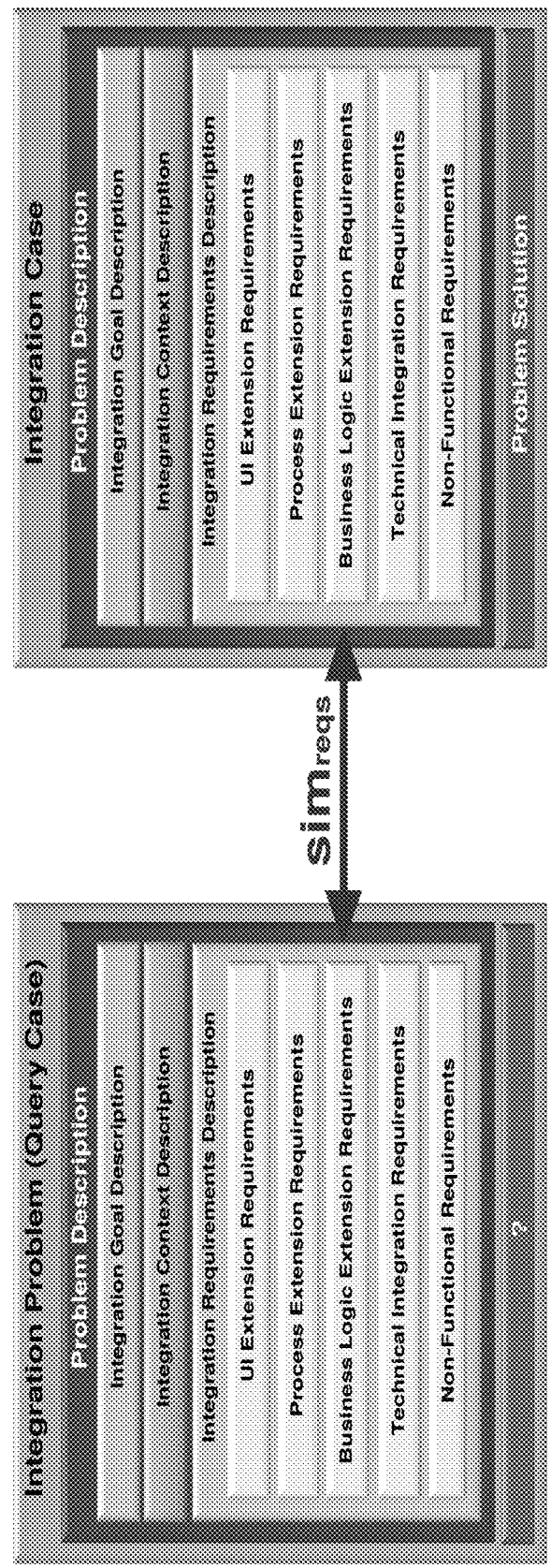
FIG. 17c shows an example of integration requirements similarity measure according to one embodiment.

FIG. 17c shows an example of integration requirements similarity measure according to one embodiment. The integration requirements similarity measure $\text{sim}_{reqs}$ may be defined as the weighted average of local similarity measures for the UI extension requirements, the process extension requirements, the business logic extension requirements, the technical integration requirements, and the non-functional requirements attributes:

$$\text{sim}_{reqs}(\text{iq}_{reqs}, \text{ic}_{reqs}) = \frac{w_{ui} * \text{sim}_{ui}(\text{iq}_{ui}, \text{ic}_{ui}) + w_p * \text{sim}_p(\text{iq}_p, \text{ic}_p) + w_{bis} * \text{sim}_{bis}(\text{iq}_{bis}, \text{ic}_{bis}) + w_{ti} * \text{sim}_{ti}(\text{iq}_{ti}, \text{ic}_{ti}) + w_{nf} * \text{sim}_{nfr}(\text{iq}_{nfr}, \text{ic}_{nfr})}{w_{ui} + w_p + w_{bis} + w_{ti} + w_{nfr}}$$

Explanations

| | |
|---|---|
| $\text{iq}_{reqs}$ | Requirements specification part of the query case |
| $\text{ic}_{reqs}$ | Requirements specification part of the integration case |
| $\text{sim}_{ui}$($\text{iq}_{ui}$, $\text{ic}_{ui}$) | Local similarity measure that compares the UI extension requirements of the cases |
| $w_{ui}$ | Weight of the similarity measure for UI extension requirement |
| $\text{sim}_p$($\text{iq}_p$, $\text{ic}_p$) | Local similarity measure that compares the process extension requirements of the cases |
| $w_p$ | Weight of the similarity measure for process extension requirements |
| $\text{sim}_{bin}$($\text{iq}_{bin}$, $\text{ic}_{bin}$) | Local similarity measure that compares the business logic extension requirements of the cases |
| $w_{bin}$ | Weight of the similarity measure for the business logic extension requirements |
| $\text{sim}_{ti}$($\text{iq}_{ti}$, $\text{ic}_{ti}$) | Local similarity measure that compares the technical integration requirements of the cases |
| $w_{ti}$ | Weight of the similarity measure for the technical integration requirements |
| $\text{sim}_{nfr}$($\text{iq}_{nfr}$, $\text{ic}_{nfr}$) | Local similarity measure that compares the non-functional integration requirements of the cases |
| $w_{nfr}$ | Weight of the similarity measure for non-functional integration requirements |

The UI extension requirements measure may be defined as the weighted average of the local similarity measures of the attributes within the UI extension requirements sub-category as shown in Table 3 of Appendix A. The UI extension requirements measure may be defined as:

$$\text{sim}_{ui}(iq_{ui}, ic_{ui}) = \frac{\sum_{i=1}^{n} w_i * \text{sim}_i(iq_{ui_i}, ic_{ui_i})}{\sum_{i=1}^{n} w_i}.$$

The process extension requirements measure may be defined as a weighted average of the local similarity measures of the attributes within the process extension requirements sub-category shown in Table 4 of Appendix A. The process extension requirements measure may be defined by:

$$\text{sim}_p(iq_p, ic_p) = \frac{\sum_{i=1}^{j} w_{p_i} * \text{sim}_i(iq_{p_i}, ic_{p_i})}{\sum_{i=1}^{j} w_{p_i}}.$$

The business logic extension requirements measure may be defined as the weighted average of the local similarity measures of the attributes within the business logic extension requirements sub-category shown in Table 5 of Appendix A. The business logic extension requirements measure may be defined as:

$$\text{sim}_{ble}(iq_{ble}, ic_{ble}) = \frac{\sum_{i=1}^{k} w_{ble_i} * \text{sim}_i(iq_{ble_i}, ic_{ble_i})}{\sum_{i=1}^{k} w_{ble_i}}.$$

The technical integration requirements measure may be a weighted average of the local similarity measures of the attributes within the technical integration requirements sub-category of Table 6 of Appendix A. This technical integration requirements measure may be defined as:

$$\text{sim}_{ti}(iq_{ti}, ic_{ti}) = \frac{\sum_{i=1}^{r} w_{ti_i} * \text{sim}_i(iq_{ti_i}, ic_{ti_i})}{\sum_{i=1}^{r} w_{ti_i}}.$$

The non-functional requirements measure may be defined as a weighted average of the local similarity measures of the attributes within the non-functional requirements sub-category shown in Table 7 of Appendix A. The non-functional requirements measure may be defined as:

$$\text{sim}_{nfr}(iq_{nfr}, ic_{nfr}) = \frac{\sum_{i=1}^{p} w_{nfr_i} * \text{sim}_i(iq_{nfr_i}, ic_{nfr_i})}{\sum_{i=1}^{p} w_{nfr_i}}.$$

Figure 17D:
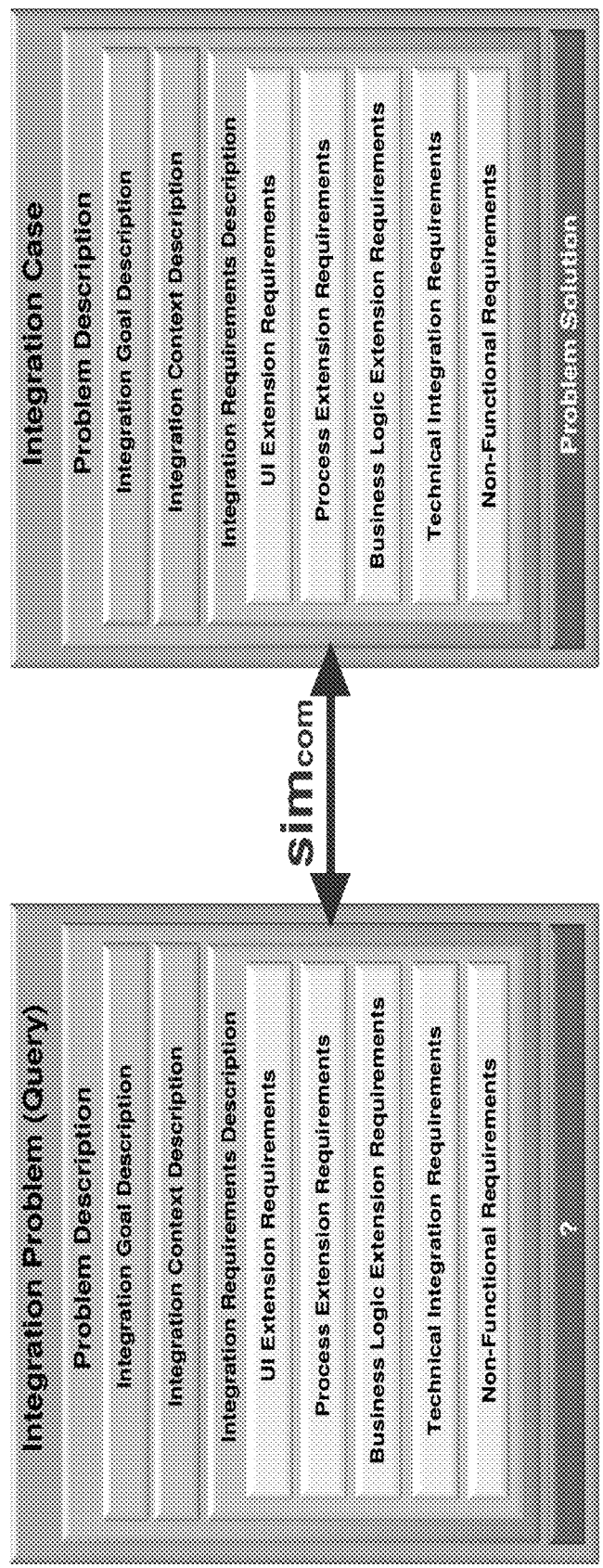
FIG. 17d depicts the global integration case similarity measure according to one embodiment.

FIG. 17d depicts the global integration case similarity measure according to one embodiment. The global integration case similarity measure $\text{sim}_{com}$ may be defined as the weighted average of the local similarity measures for the integration goal, the integration context, and the integration requirements categories:

$$\text{sim}_{com}(iq, ic) = \frac{w_{goal} * \text{sim}_{goal}(iq_{goal}, ic_{goal}) + w_{ctx} * \text{sim}_{ctx}(iq_{ctx}, ic_{ctx}) + w_{reqs} * \text{sim}(iq_{reqs}, ic_{reqs})}{w_{goal} + w_{ctx} + w_{reqs}}.$$

The global integration case similarity measure weights the local similarity measures for the three categories in the problem description to determine the global similarity measure. This measure may be used to determine if the integration case is similar to the integration problem. The above calculations may be performed for many different integration cases. The most similar integration cases may then be determined and provided to the service integrator.

A previous integration/customization case stored within an experience base for possible reuse, may further include one or more of the following pieces of information: information allowing annotation of price information for trading the previous customization case (e.g. to another tenant); information restricting visibility of the previous customization case within the experience base; information defining a rating for the previous customization case within a community; information capturing a reuse frequency of the previous customization case; and/or information rendering anonymous at least a portion of the previous customization case.

Method Flow

Figure 18:
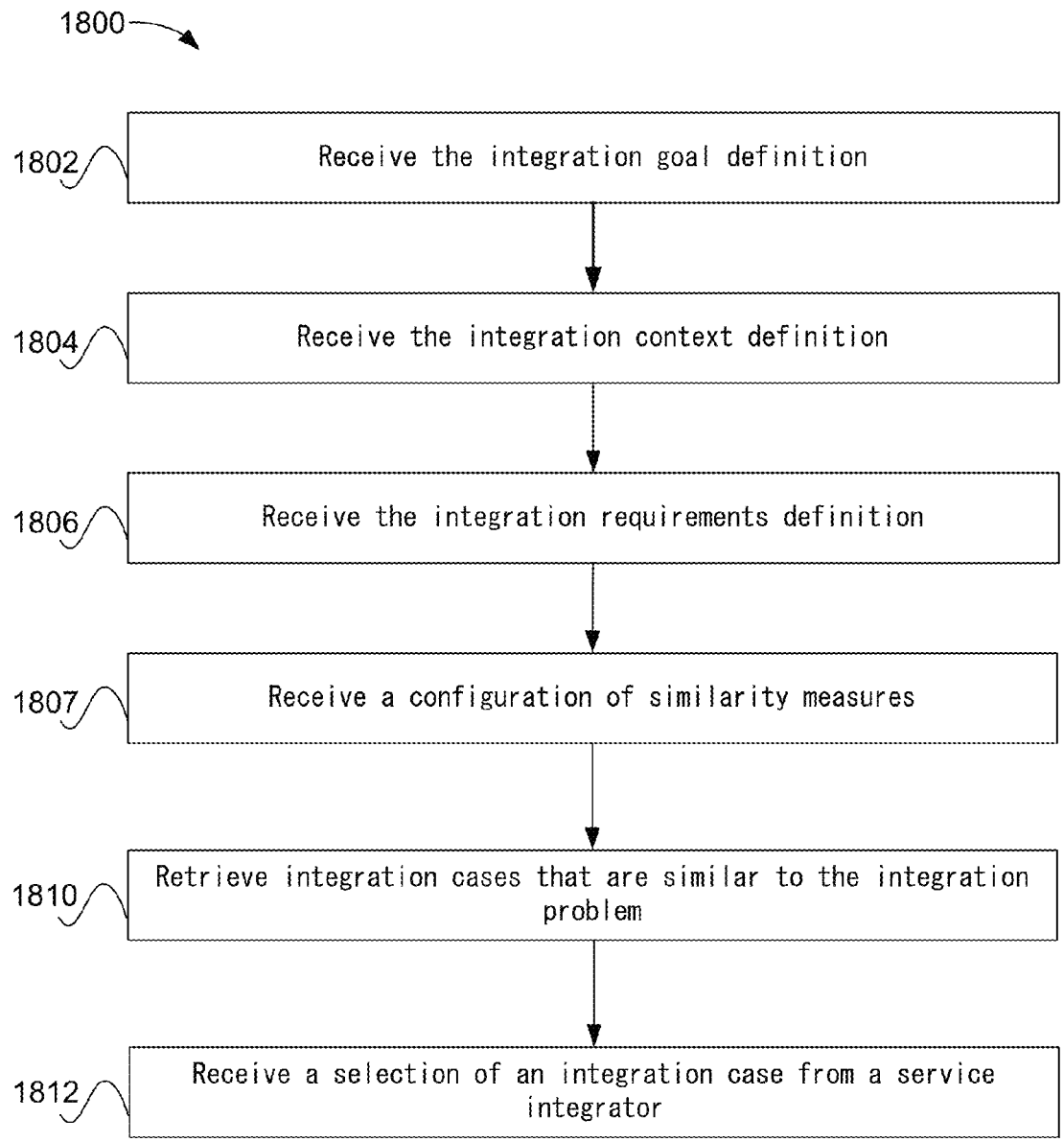
FIG. 18 depicts a simplified flowchart for performing case-based retrieval according to one embodiment.
Figure 19A:
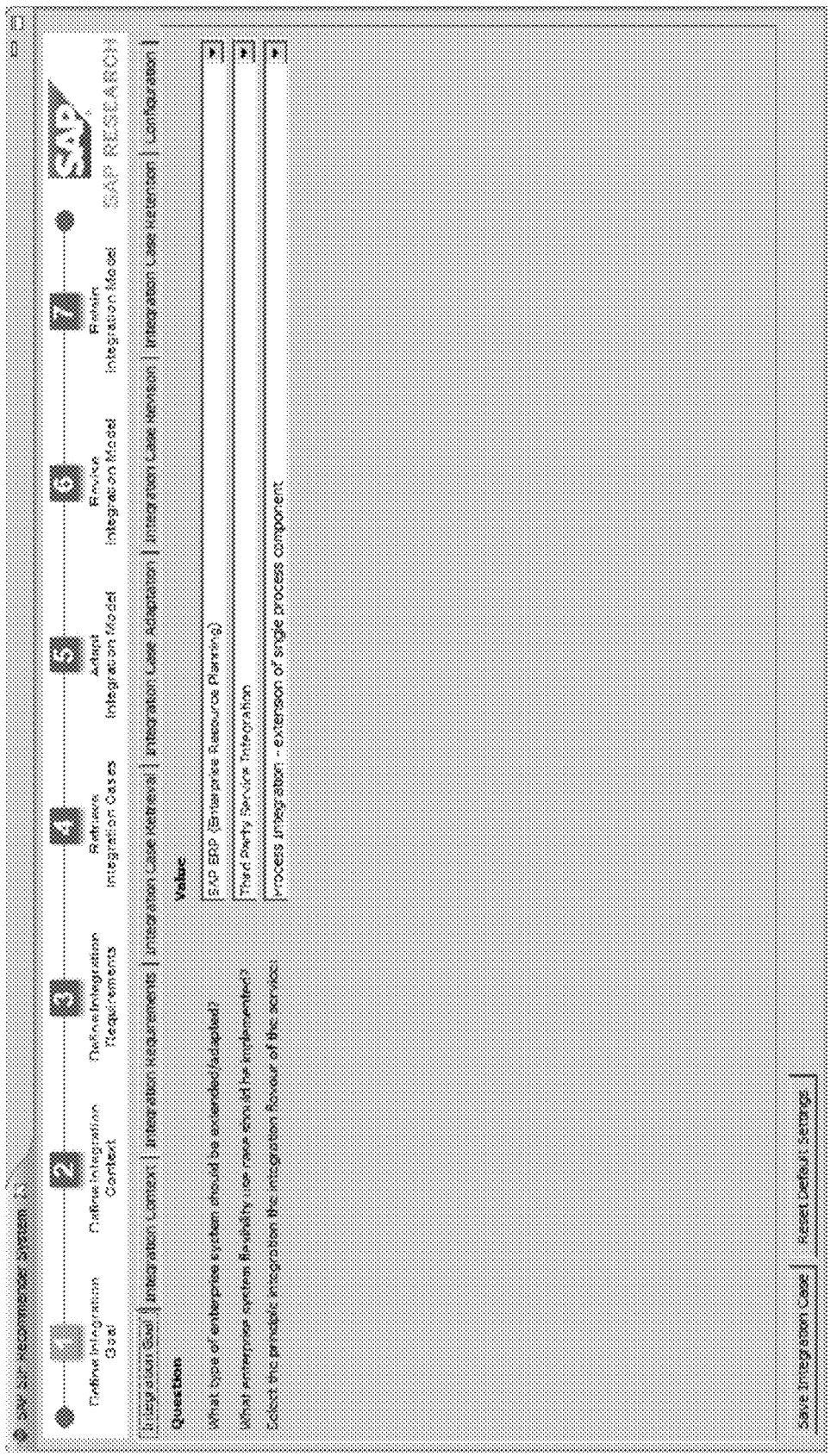
FIG. 19a shows an interface used by the service integrator to define the integration goal attributes according to one embodiment.

FIG. 18 depicts a simplified flowchart 1800 for performing case-based retrieval according to one embodiment. The following uses a wizard-based questionnaire to define the integration problem. The service integrator can answer questions regarding the problem and be provided with similar integration cases. At 1802, an integration goal definition is received. FIG. 19a shows an interface used by the service integrator to define the integration goal attributes according to one embodiment. Questions to define the attributes of the type of enterprise system that should be extended, the flexibility of use case that should be implemented, and the principle integration of the integration flavor are shown. A drop down menu of predefined options may be provided to the service integrator to define the attributes.

Figure 19B:
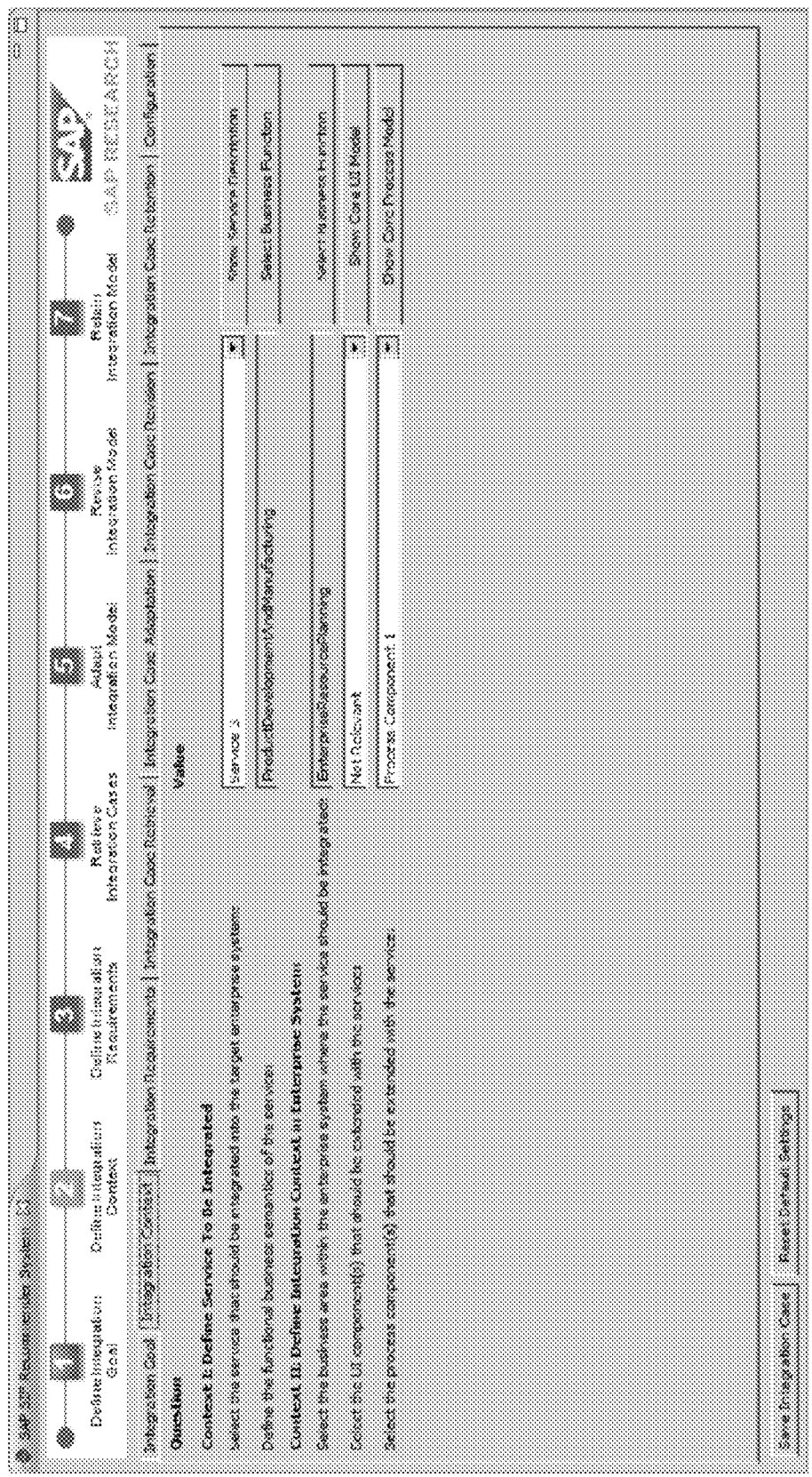
FIG. 19b shows an interface used by the service integrator to input the integration context definition according to one embodiment.

Referring back to FIG. 18, at 1804, the integration context definition is received. FIG. 19b shows an interface used by service integrator to input the integration context definition according to one embodiment. Questions to define the attributes for the service, the functional business semantics, the business area, the UI components, and the process components are shown. The answers to the questions define values of the attributes.

Figure 19C:
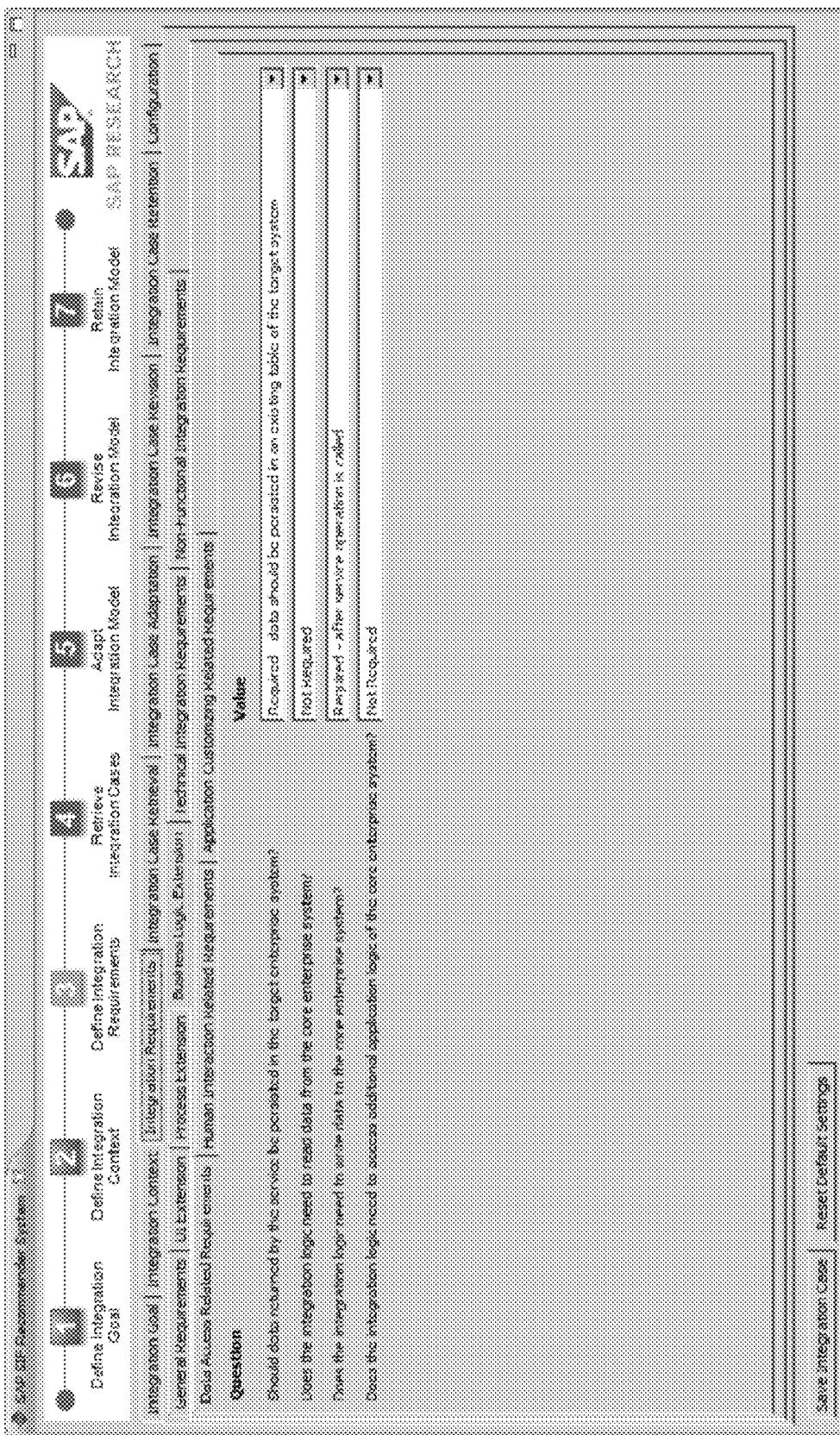
FIGS. 19c and 19d depict interfaces that allow the service integrator to input information for the integration requirements attributes according to one embodiment.
Figure 19D:
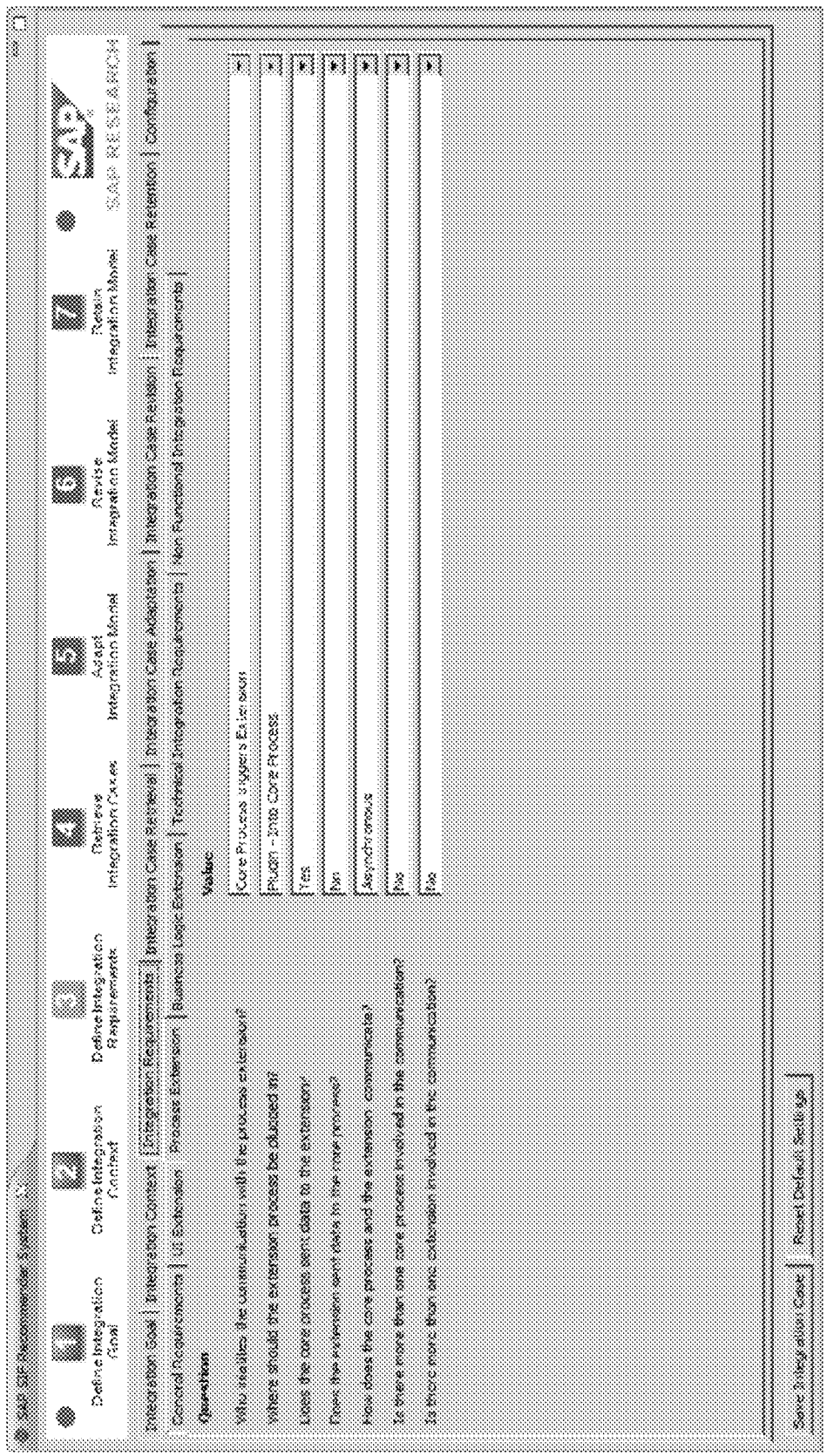

Referring back to FIG. 18, at 1806, the integration requirements definition is received. FIGS. 19c and 19d depict interfaces that allow a service integrator to input information for the integration requirements attributes according to one embodiment. Questions to define data access attributes for persisting data, reading data, writing data, and accessing additional logic are shown in FIG. 19c. In FIG. 19d, questions to define attributes for process extension requirements are shown in FIG. 19d. Although not shown, other questions to define attributes for business logic extensions, technical integration requirements, and non-functional integration requirements may be provided.

Figure 19E:
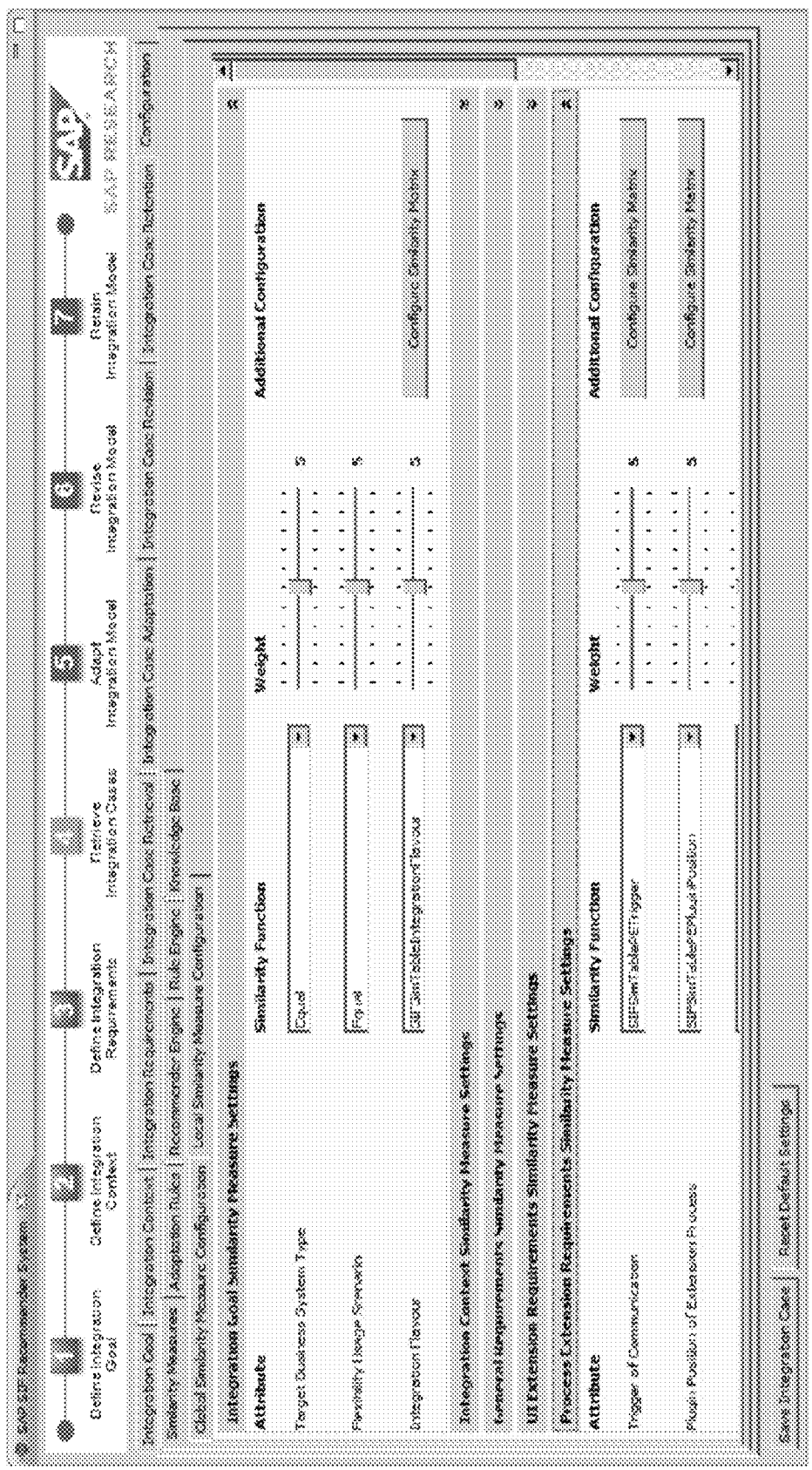
FIG. 19e shows an interface that allows the service integrator to input similarity measures to be used with different attributes according to one embodiment.

Referring back to FIG. 18, at 1808, in an optional step, a configuration of similarity measures may be received. This configures which similarity measures may be used for different attributes. FIG. 19e shows an interface that allows a service integrator to input similarity measures to be used with different attributes according to one embodiment. For example, similarity measures for integration goals, integration contexts, and integration requirements may be input. A similarity measure may be selected at 1902. Also, a weight for that similarity measure may be input at 1904. The weight indicates the weighting that is provided to that similarity measure.

Figure 19F:
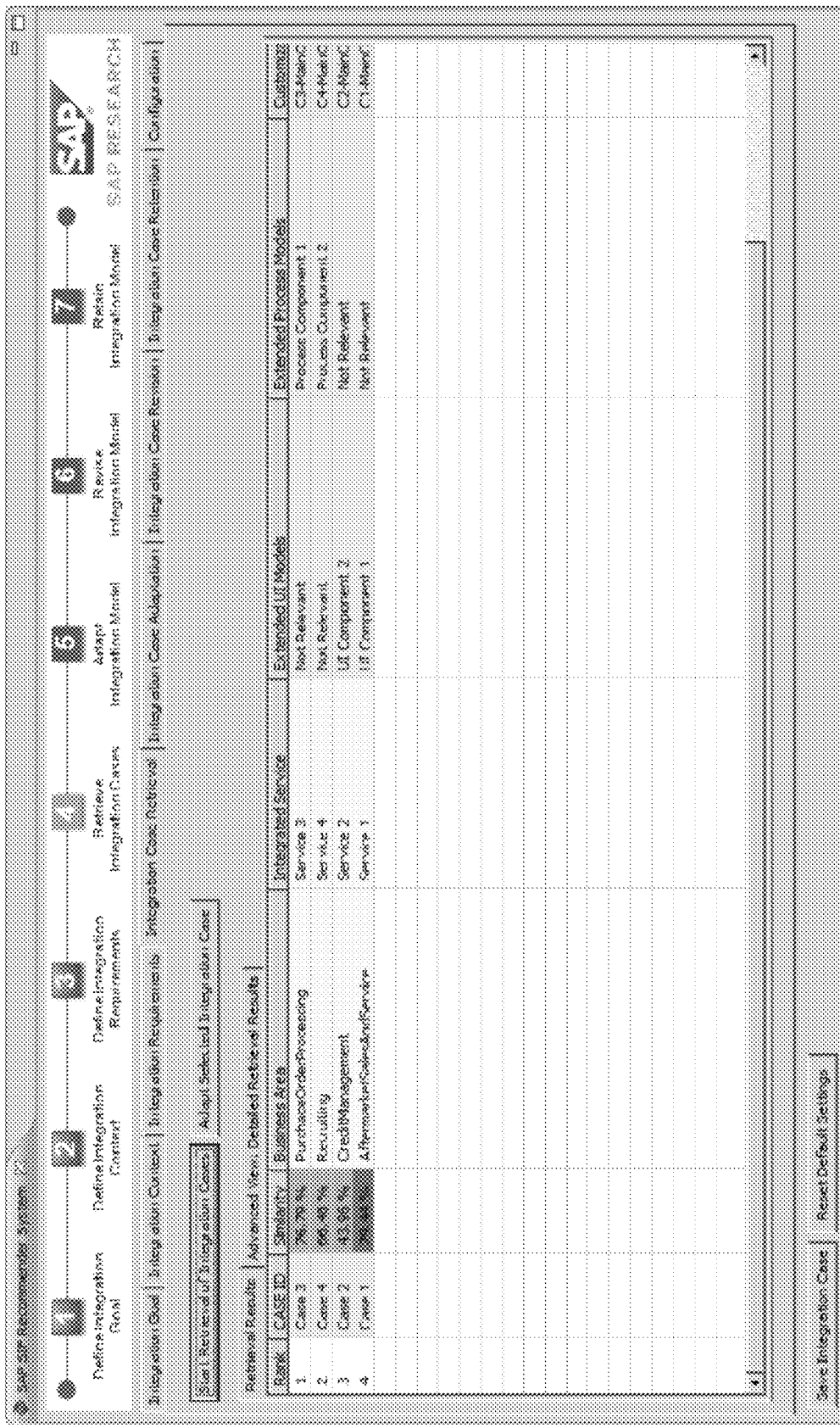
FIG. 19f shows an example of retrieved results according to one embodiment.

Referring back to FIG. 18, at 1810, integration cases that are similar to the integration problem are retrieved. For example, a certain number of integration cases that are deemed to be the most similar (e.g., have a similarity above a threshold) may be retrieved. FIG. 19f shows an example of retrieved results according to one embodiment. As shown, four different integration cases have been retrieved and ranked based on their similarity. The results show the similarity rating, business area, service, UI model, and process model.

At 1812, a selection of an integration case is received from a service integrator. The problem solution of the integration case may then be adapted for the integration problem.

Figure 19G:
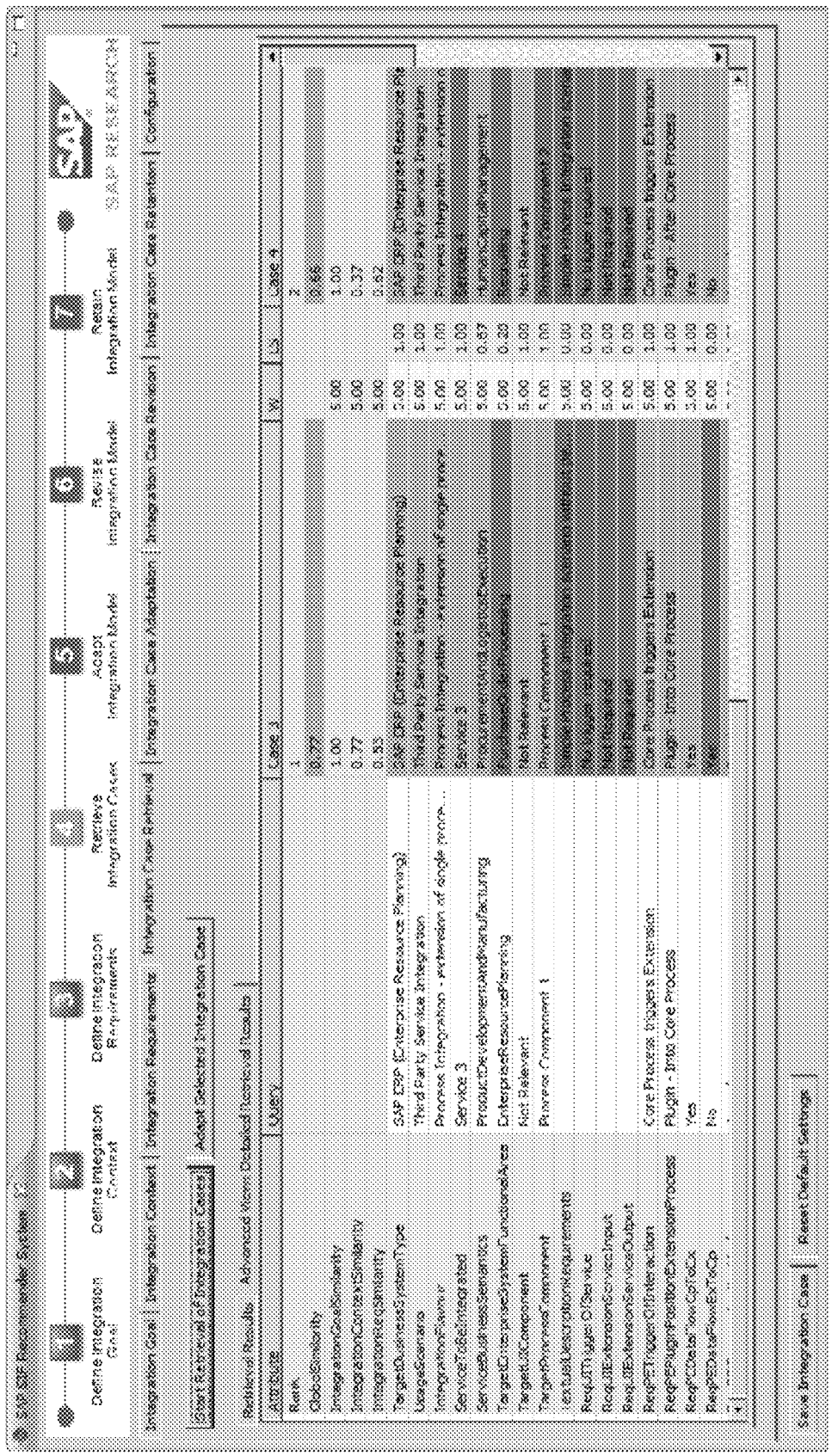
FIG. 19g shows an example of an interface according to one embodiment.

A service integrator may also want to know more details about the retrieved integration cases. In this case, the service integrator may select an integration case and be provided with more details as shown in FIG. 19g.

Adaptation

Particular embodiments may promote the integration of complementary services into standard enterprise systems utilizing a case-based reasoning approach. In particular, the present disclosure proposes systems and methods for a case-based adaptation framework allowing adaptation of an existing customizing solution (from a previous case) to a new, unsolved integration, adaptation, or extension problem.

As mentioned above, Case-Based Reasoning seeks to remember previous similar situations (cases), and then reuse information and knowledge about the stored cases in addressing new problems. One hurdle faced in the Case-Based-Reasoning Cycle, is the adaptation of an existing solution within a new problem context. This aspect is referenced hereafter as adaptation, and is designated in FIG. 2 by the reference number 212.

According to particular embodiments, a customization case adaptation may be realized by a case adaptation engine. Specifically, during case retrieval the system integrator may have selected a customization case for reuse. That customization case is now to be adapted to the new application context.

In the overall CBR cycle, case adaptation may involve domain-dependent adaptation knowledge in combination with appropriate adaption methods. Customization case adaptation may be used as the customization problem definition of the query customization case, may not completely match with the customization problem of the retrieved customization case.

Particular embodiments may rely upon a transformation adaptation approach in which the problem solution of a retrieved case is transformed into a new problem solution of the query case, typically by the application of adaptation rules. According to certain embodiments, a transformational adaptation method may be embedded into an interactive, semi-automatic customization procedure that provides recommendations on possible adaptation steps to the system integrator.

According to particular embodiments, content of a customization case can be formalized as a Meta-Model having a problem description and a problem solution, with specific focus on the formalization of the solution part by the introduction of an adaptable customization process or solution plan.

Accordingly, the FIG. 5 previously discussed shows a Meta-Model corresponding to a customization case utilizing adaptation according to a particular embodiment. The Meta-Model includes a problem description 503 (corresponding to customization problem) and a problem solution 505 (corresponding to a customization solution).

As shown in FIG. 5, a customization process 507 is used as solution plan within the case problem solution part 505. A customization process covers customization tasks or steps processed to implement a customization solution (i.e. cookbook). The customization tasks cover typical, recurring adaptation patterns across multiple system layers. The customization process can be reused in a new application context. The customization process thus covers the steps that a system integrator performs to adapt or extend a standard enterprise system to implement a certain adaptation or extension requirement.

The following describes a customization process as a solution plan of an integration case. According to a basic adaptation procedure, during the adaptation phase the solution plan of the retrieved case can first be adapted to the meet the new integration requirements. The adapted customization process/solution plan can then be executed (replayed) in the new application/target context. The basic adaptation procedure is described in detail below starting with FIG. 8.

Figure 5A:
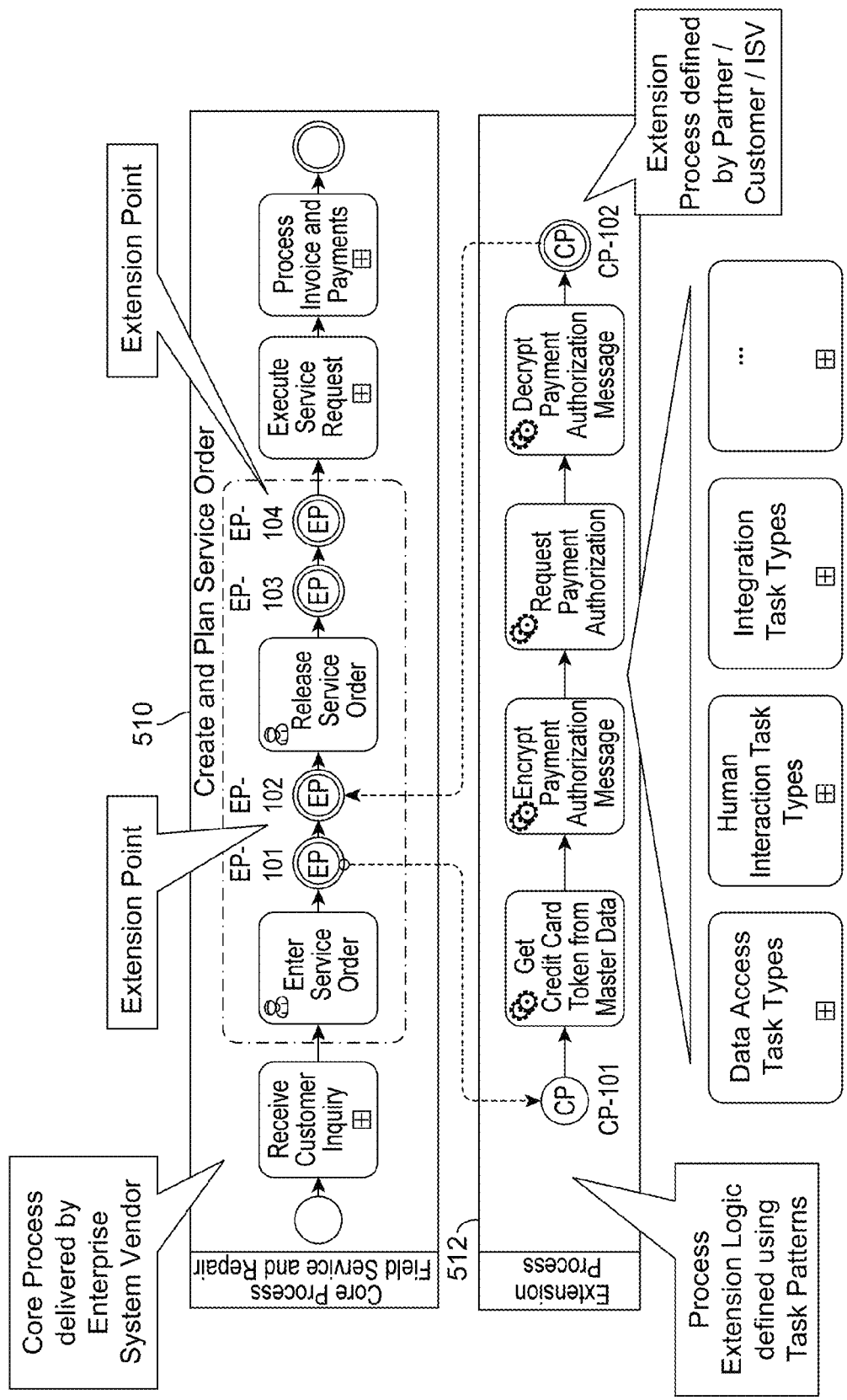
FIGS. 5A-B illustrate use of an adaptation framework according to an embodiment, in a customization case wherein a core process is being adapted for extension.
Figure 5B:
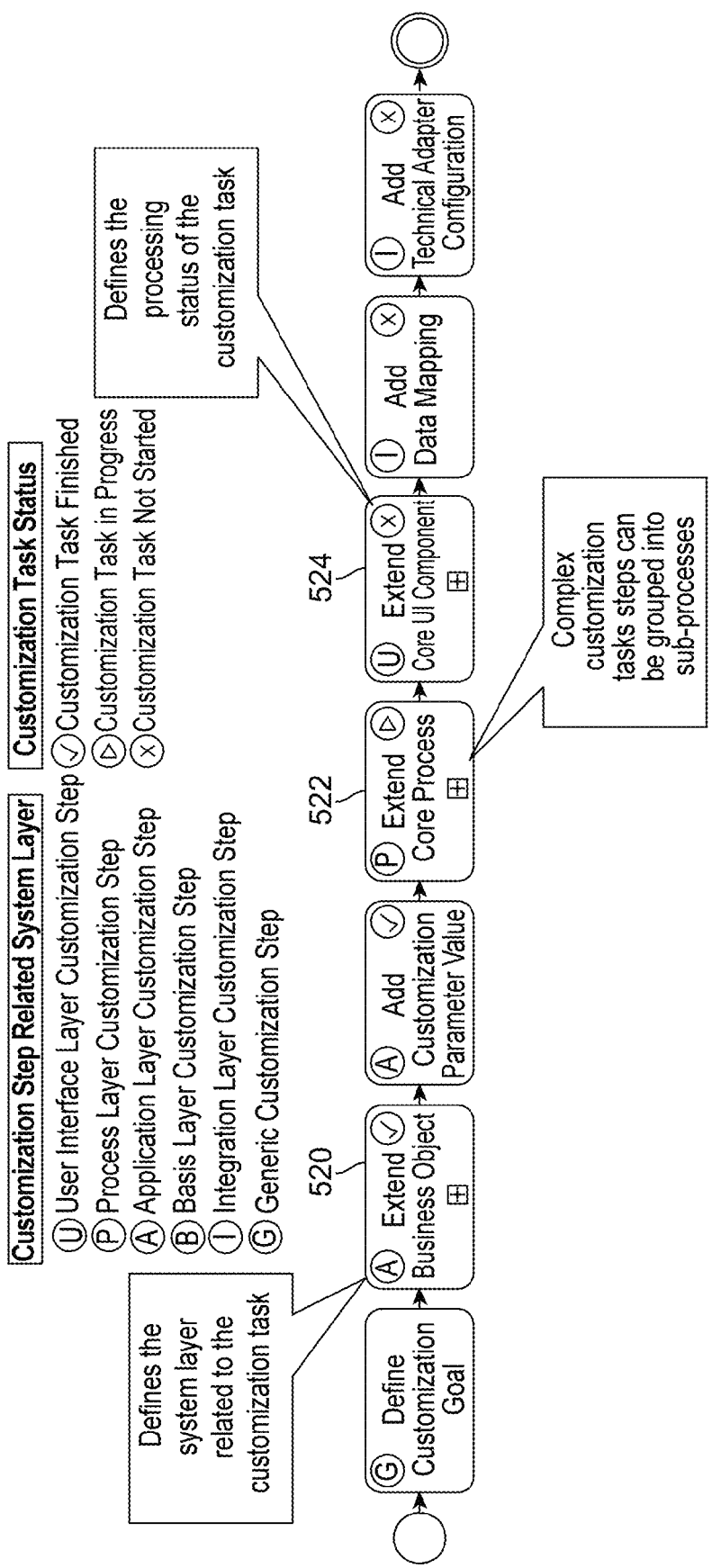

FIGS. 5A-B illustrate the use of an adaptation framework according to an embodiment, in a customization case wherein a core process is being adapted for extension. In particular, FIG. 5A illustrates a core process 510 comprising field service and repair, delivered by an enterprise system vendor. This core process includes one or more extension points allowing integration with another process.

FIG. 5A also illustrates the extension process 512 which allows a payment transaction for the field service repair. This extension process is defined by a partner/customer/ISV, rather than by the enterprise system vendor. The extension process includes various task types, such as data access, human interaction, and integration task types.

FIG. 5B shows the customization process. An application layer customization step 520 extending a business object, defines the system layer related to the customization task. A process layer customization step 522 extending a core process, allows complex customization tasks steps to be grouped into sub-processes. A user interface layer customization step 524 extending a core user interface component, defines the processing status of the customization task.

Use of a customization process/solution plan for the integration case problem part according to certain embodiments, may offer one or more benefits. For example, such an approach may match the way in which system integrators work. It can allow integrators to build on existing software or organizational process models that cover change procedures (e.g. ITIL/COBIT/ISO Governance Frameworks).

Moreover, this approach may support the documentation of an adaptation/extension solution. It can allow integration of automated steps as well as manual steps, allow inclusion of different roles in an integration process, and/or allow the integration of different tools and editors.

In addition, this approach offers extendibility for the future, as it is able to integrate new patterns. The approach may be platform independent, allowing transfer to different platforms. Finally, the approach can readily be recorded in Enterprise Systems.

The development process of customization solutions in general is a design-intensive process characterized by an intensive human expert involvement. Customization solutions can differ in their complexity from simple to complex customization solutions. Furthermore, customization solutions can highly differ in granularity from fine-grained adaptation solutions to complete Add-On solutions complementing core enterprise system functionality.

Figure 8:
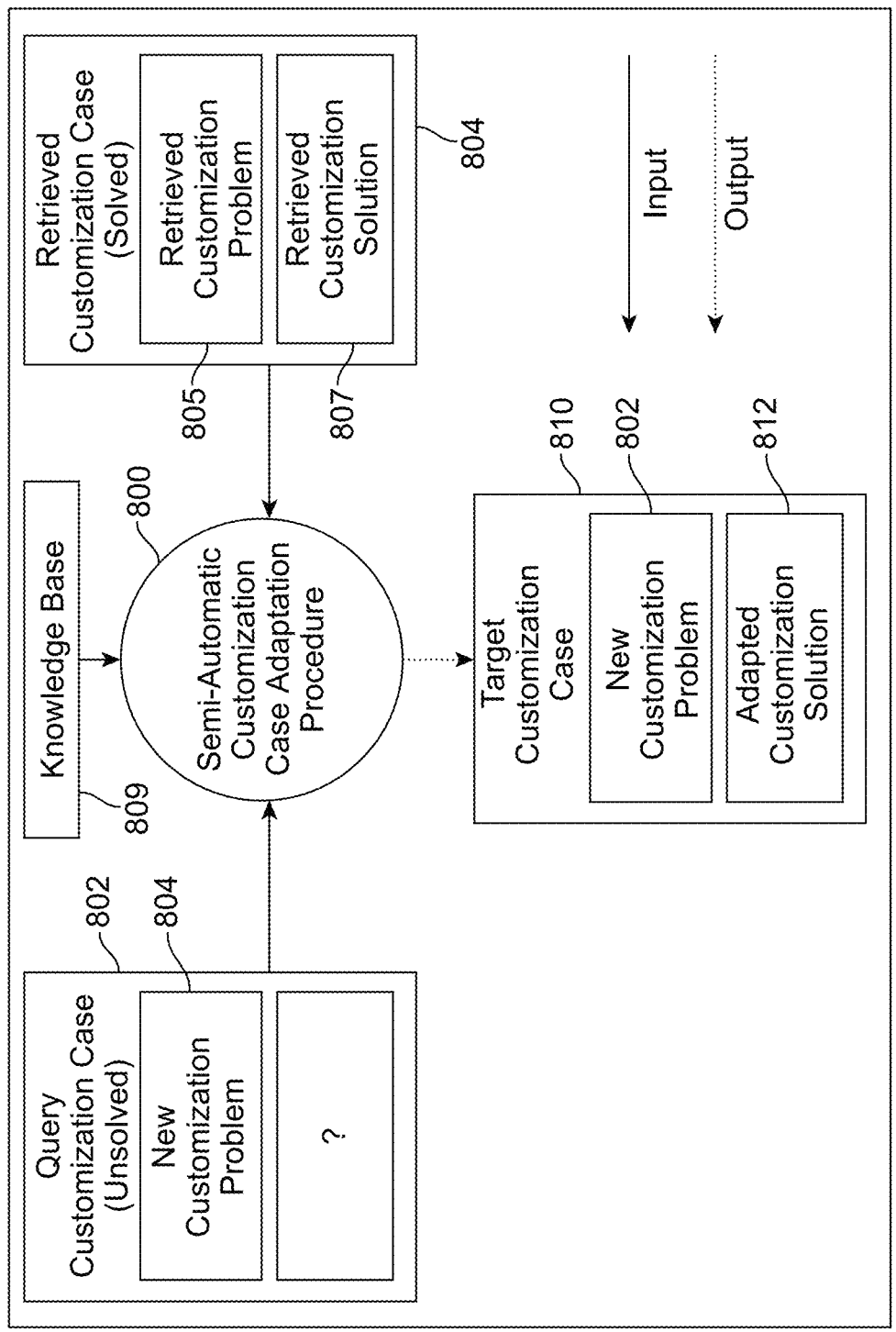
FIG. 8 is a simplified view showing an overview on an embodiment of the customization case adaptation procedure.

FIG. 8 is a simplified view showing an overview on an embodiment of the customization case adaptation procedure 800. This customization case adaptation procedure may be based on a mixture of transformational and derivational adaption methods.

On the left-hand side the query customization case (QCC) 802 is shown. This case represents the new customization problem 804 to be solved by the system integrator, that has been defined during the first phase of the customization experience management cycle. It has not yet received a customization solution part.

On the right hand side of FIG. 8 the retrieved customization case (RCC) 804 is shown. The RCC includes both a retrieved customization problem 805 and a retrieved customization solution 807. The RCC has been selected by the system integrator for reuse at the end of the customization case retrieval phase.

Both the QCC and RCC are inputs to the semi-automatic customization case adaptation procedure 800. The adaptation procedure 800 references a knowledge base 809 to generate a target customization case (TCC) 810 as output. The target customization case includes both the new customization problem 802, and an adapted customization solution 812.

The customization case adaptation procedure was developed based upon three design decisions. First, transformational adaptation served as a foundation.

In particular, the inherent complexity of customization solutions itself results in complexity of reusing past customization solutions in a new application context. There may not exist sufficient complete, general domain knowledge available in the context of customization of enterprise systems due to its very design-intensive nature. Accordingly, a transformational adaptation approach may combine substitutional as well as structural adaptation methods. Using such transformational adaptation it is possible to change the structure of the retrieved customization solution (e.g. by modifying, inserting, deleting or replacing elements of the customization solution).

A second design decision utilized human expert controlled case adaptation. A principle of the approach is the dedicated involvement of the system integrator as the human expert within the case adaptation process, by providing recommendations on how to adapt the retrieved customization case to the new problem context. This approach concentrated on a semi-automatic adaptation approach allowing the system integrator control during this phase.

In order to provide recommendations for the system integrator on how to adapt the retrieved case, the customization adaptation algorithm relies on adaptation rules. Each adaptation rule represents certain domain knowledge about how a retrieved customization case must be changed if its problem part differs in a specific characteristic from the query customization case. By applying adaptation rules within the customization case adaptation phase, the CAPE Framework is enhanced from a pure Case-Based Reasoning system into a hybrid intelligent system.

A third design decision involved including aspects from derivational adaptation approaches. Each customization solution includes a customization process comprising customization tasks (e.g. core model adaptation tasks) that have been conducted on the various system layers of a packaged enterprise system to solve the related customization problem. As such, the customization process can be seen as the solution plan, on how the customization problem has been solved.

A principle of the proposed customization case adaptation algorithm is to first adapt the customization process of the retrieved customization case which is afterwards semi-automatically executed in the new problem context of the target customization case. In a core part of the customization case adaptation algorithm, the solution plan (customization process) of the retrieved customization case is adapted based on the differences of the customization problem parts of the query customization case and the retrieved customization case.

This approach is related to a derivational adaptation method of replaying a past reasoning trace (in our case the customization case) in the new problem context (in our case the target customization case). However, in contrast to classical derivational adaptation methods, a from-scratch problem solver (e.g. a planning component) is not employed to generate the parts of the solution that do not fit.

Rather, the customization process of the retrieved customization case (=source solution plan) is semi-automatically transformed to the customization process that fits to the goal, context and requirements of the target customization case (=target solution plan). This transformation is based on the differences between the problem descriptions of both cases and is implemented with the help of adaptation rules. This approach comprises plan adaptation.

In view of the three design decisions, the customization case adaptation procedure is primarily transformation-based. However it combines this method with aspects from a derivational adaptation strategy through the applied concept of plan adaptation.

Figure 10:
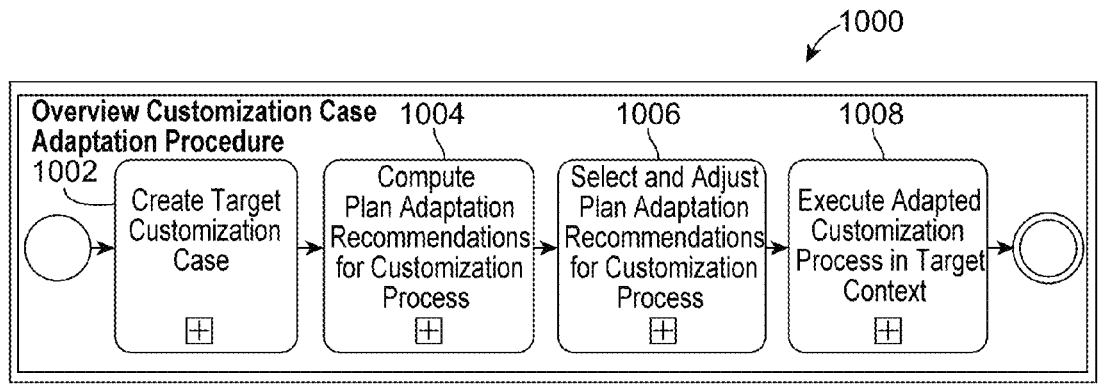
FIG. 10 shows a simplified process flow of an embodiment of a customization case adaptation procedure.

FIG. 10 shows an embodiment of a customization case adaptation procedure as a process model. The customization case adaptation procedure 1000 is divided into four major phases 1002, 1004, 1006, and 1008 that are shown as collapsed sub-processes in FIG. 10. FIGS. 10A-F (discussed further below) depict these sub-processes according to particular embodiments.

In a first phase (Phase I) 1002, the target customization case is created. During the customization case retrieval phase, the system integrator has selected one customization case for reuse (=retrieved customization case). The target customization case is created as an initial copy of the retrieved customization case. Details of this phase of the customization case procedure are described in connection with FIG. 10A.

In a second phase (Phase II) 1004, plan adaptation recommendations for the customization process are computed. Specifically, the customization process (solution plan) of the target customization case is extracted. Based on differences between the customization problem definitions of the query and retrieved customization case, a list of plan adaptation recommendations is generated. These recommendations suggest how the customization process of the target customization can be adapted. Details of this phase of the customization case procedure are described in connection with FIGS. 10B-D.

In a third phase (Phase III), plan adaptation recommendations for the customization process are selected and adjusted. In particular, the system integrator can accept, reject, and/or manually complete parameterization of suggested plan adaptation recommendations for the customization process. Selected changes are applied to the target customization process (and to its sub processes if appropriate). Details of this third phase of the customization case procedure are described in connection with FIG. 10E.

In a fourth phase (Phase IV), the customization process is executed in a target context. Specifically, as a result of the previous steps the customization process of the target customization case has been adapted to the target customization case problem context, and can now be executed in this context by semi-automatically processing customization tasks. Details of this phase of the customization case procedure are described in connection with FIG. 10F.

Figure 6:
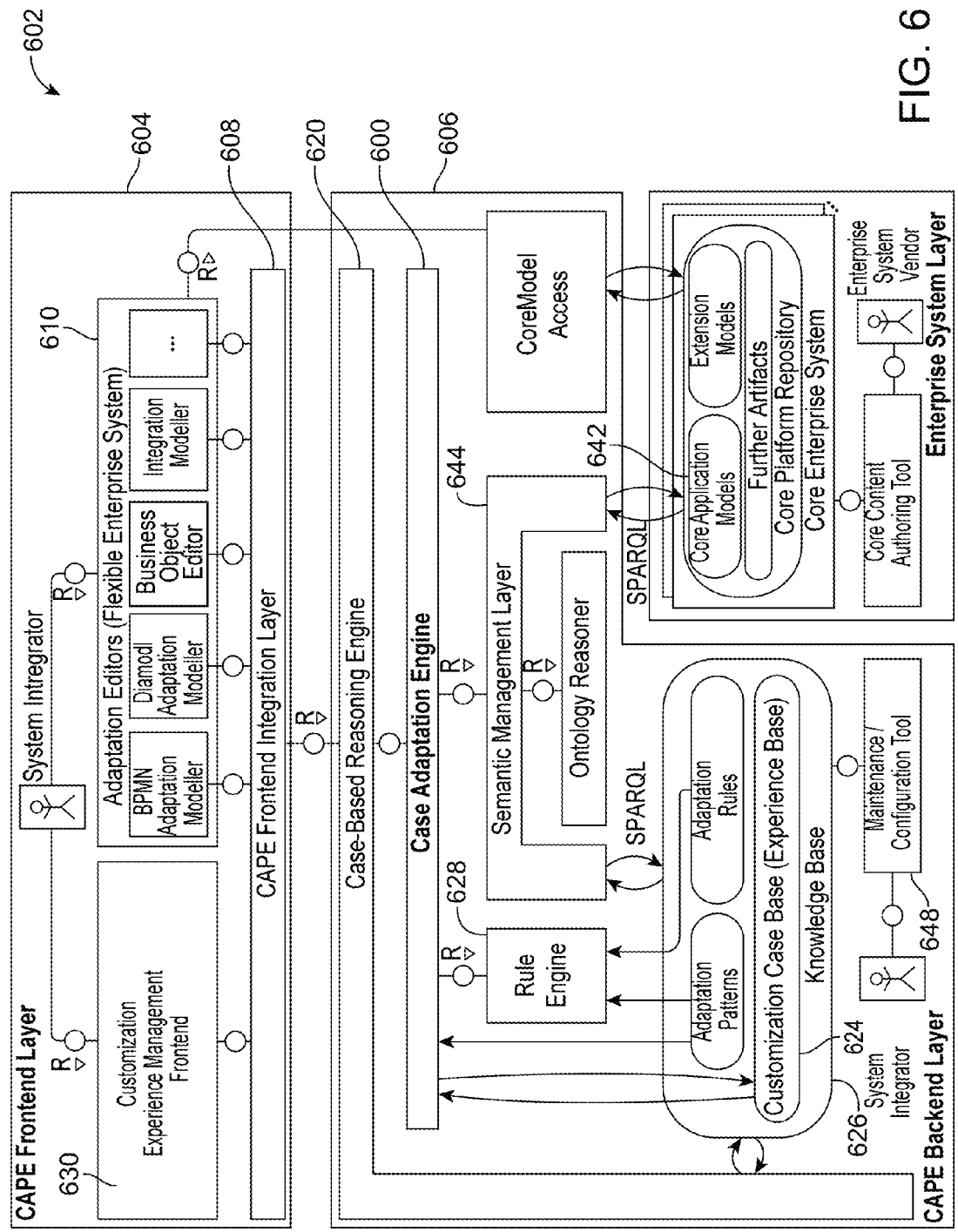
FIG. 6 is a simplified diagram showing the overall architecture of one embodiment of the CAPE Framework, and the case adaptation engine present therein.

The customization case adaptation procedure is technically implemented by a case adaptation engine of the CAPE Framework, that is discussed in detail below in connection with FIG. 6. The following FIGS. 10A-F accordingly utilize a notation to describe the procedure in a manner allowing differentiation between automated steps performed by the case adaptation engine (modeled as service task types), and interactive steps performed by the system integrator (modeled as manual task types). In addition, the symbols Q and R are also included to indicate whether a certain step of the procedure is supported by the CAPE rule engine or the SPARQL Query API that is part of the semantic management layer shown and discussed further below in connection with FIG. 6.

Figure 10A:
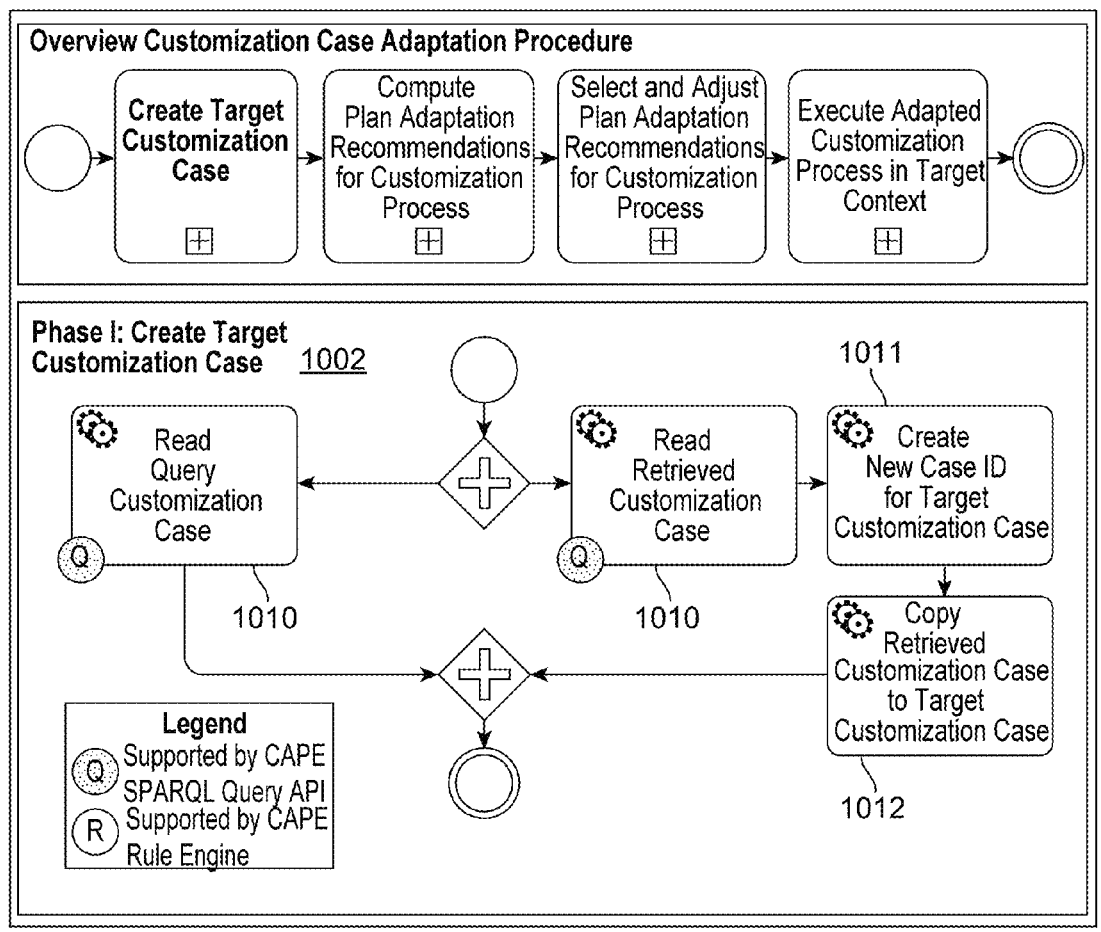
FIG. 10A shows a simplified process flow of a first phase of the embodiment of the case adaptation procedure of FIG. 10.

FIG. 10A is a process flow showing details of the first phase of FIG. 10. Creation of the target customization case in this phase is triggered as soon as the system integrator has selected a retrieved customization case for reuse.

First, in step 1010 the query customization case and the retrieved customization case are both loaded and read by the case adaptation engine. Both steps are supported by the CAPE SPARQL Query API. Afterwards, in step 1011a new case identifier is generated and in step 1012 the target customization case is created as an initial copy of the retrieved customization case.

The case adaptation engine may create a deep copy for each software artifact that has been developed within the retrieved customization case. Adaptation operations in the further phases of the algorithm can then be applied to the software artifacts of the target customization case.

Figure 10B:
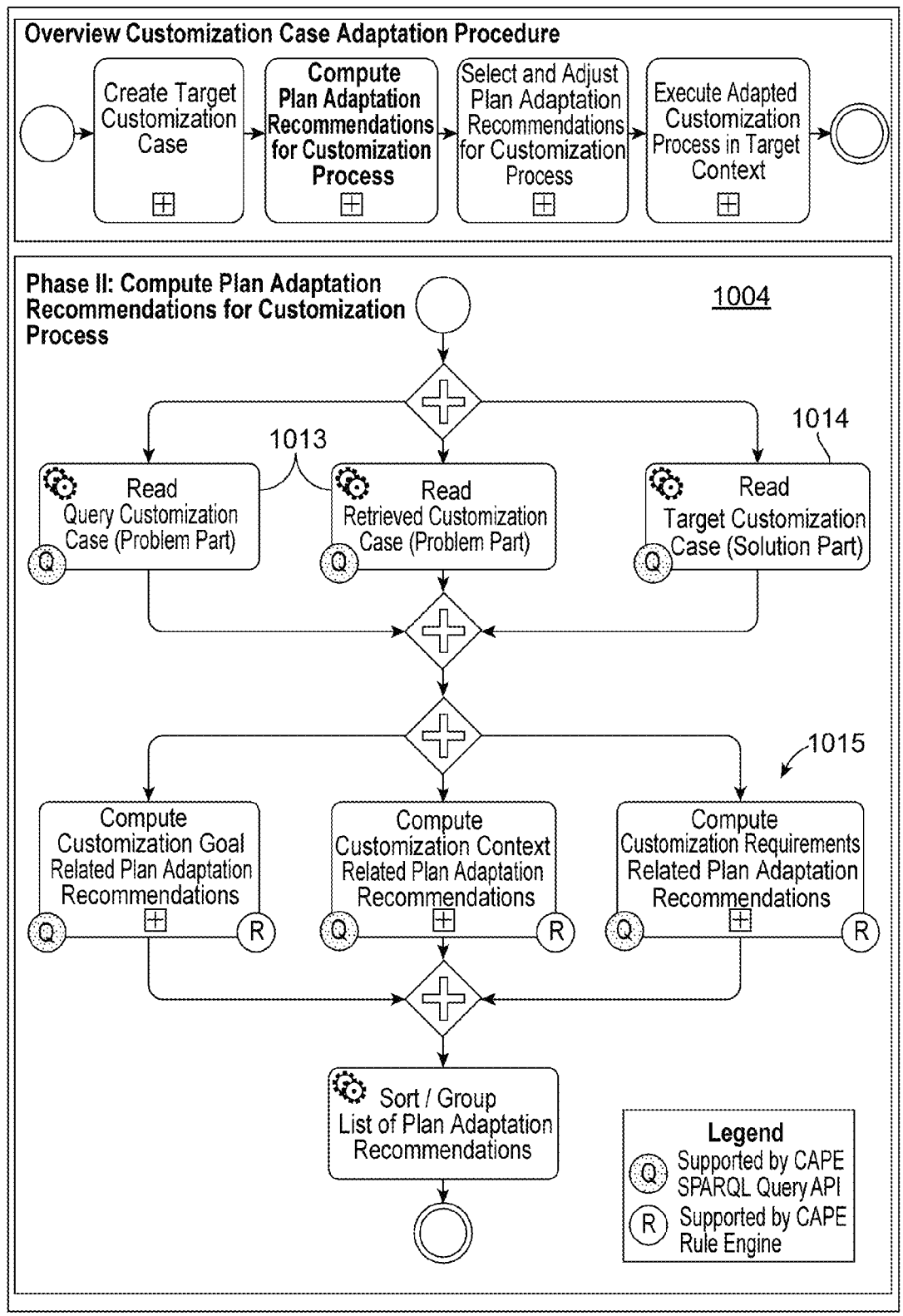
FIGS. 10B-D show simplified process flows of a second phase of the embodiment of the case adaptation procedure of FIG. 10.

FIG. 10B is a process flow showing details of the second phase of FIG. 10 wherein plan adaptation recommendations are computed. In the previous phase, the target customization case has been created as a deep copy of the retrieved customization case. As part of this second phase of the adaptation algorithm, plan adaptation recommendations are computed regarding how the target customization should be adapted.

First, in step 1013 the customization problem parts of the query customization case as well as from the retrieved customization case, are loaded. In addition, in step 1014 the customization solution part of the target customization case is read by the case adaptation engine. All three steps are supported by the CAPE SPARQL Query API.

The adaptation algorithm adapts the customization process (solution plan) of the target customization case. For this purpose, differences in the customization problem descriptions of the query customization case and the retrieved customization case are analyzed.

The problem description of a customization case is divided into three parts: customization goal, customization context, and customization requirements. The query customization case might differ in each of these parts from the retrieved customization case, and each difference might involve an adaptation of target case customization process (e.g. by modifying, inserting or deleting a customization task of the customization process—plan adaptation).

Therefore, the customization case adaptation procedure shown in FIG. 10B includes three parallel steps 1015 that compute (1) the customization goal related plan adaptation recommendations, (2) the customization context related plan adaptation recommendations, and (3) the customization requirements related plan adaptation recommendations. All three steps are supported by the CAPE SPARQL Query API and the CAPE rule engine.

Figure 10C:
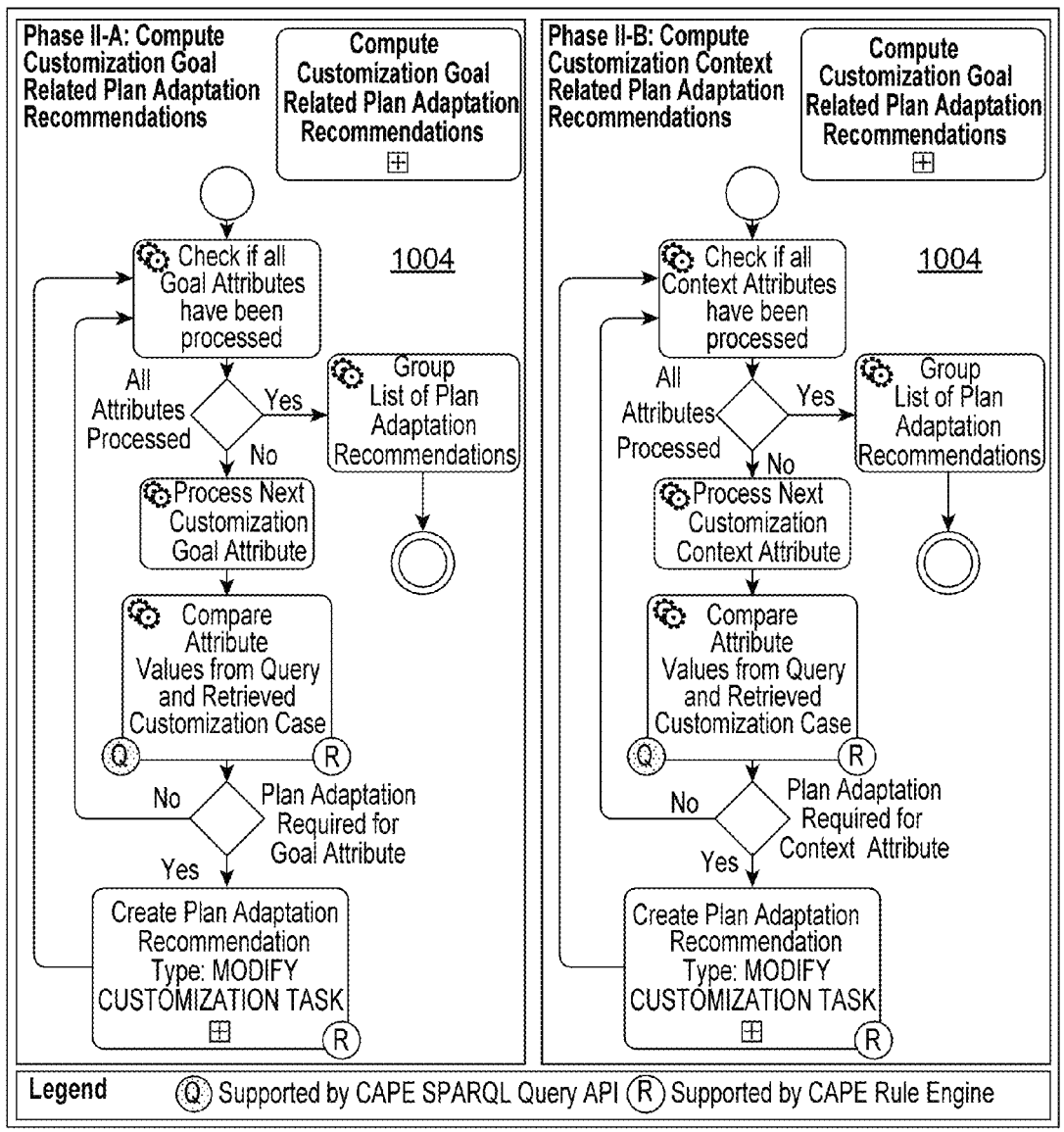

Computation of the plan adaptation recommendations is now described in three separate sub-processes. FIG. 10C shows the details for the computation of (1) the customization goal related plan adaptation recommendations, and (2) of the customization context related plan adaptation recommendations. For the computation of customization goal related plan adaptation recommendations (left-hand side of FIG. 10C) the case adaptation engine loops over each attribute of the customization goal description. For each goal attribute, the values of the query customization case and the retrieved customization case are compared. If both attribute values are not equal, a plan adaptation recommendation is generated to modify the relevant customization task in the target case customization process. If related attributes of the goal description have been processed, generated plan adaptation recommendations are grouped. Comparison of attributes and their related plan adaptation recommendations are implemented using plan adaptation patterns and adaptation rules.

For the computation of customization context related plan adaptation recommendations (right-hand side of FIG. 10C) the case adaptation engine loops over each attribute of the customization context description, based on the same principle as described for the customization goal attributes: for each context attribute the values of the query customization case and the retrieved customization case are compared. If both attribute values are not equal, a plan adaptation recommendation is generated in order to modify the relevant customization task in the target case customization process. Finally, generated plan adaptation recommendations are grouped together. The comparison of attributes and their related plan adaptation recommendations are implemented using plan adaptation patterns and adaptation rules.

Figure 10D:
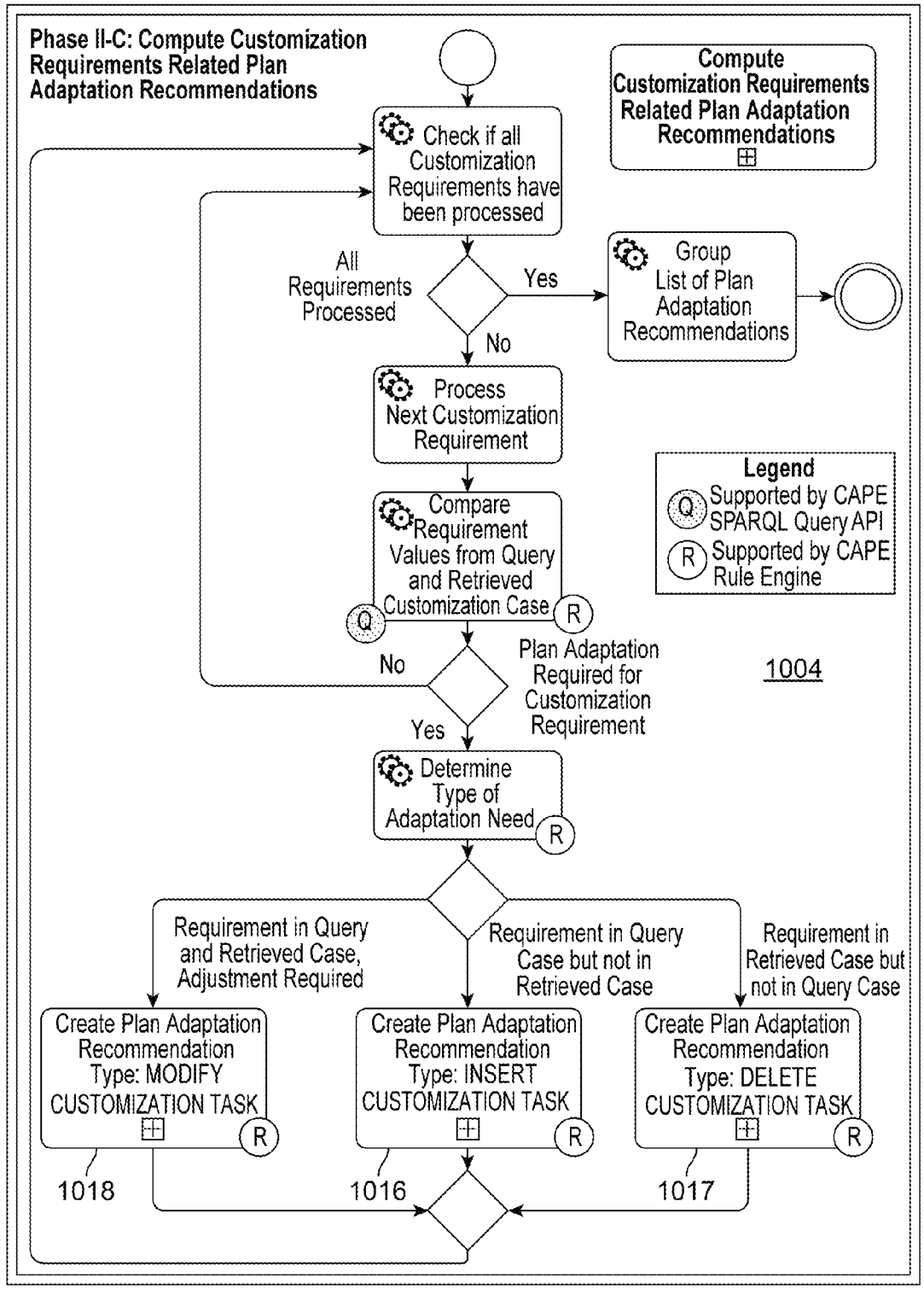
Figure 10E:
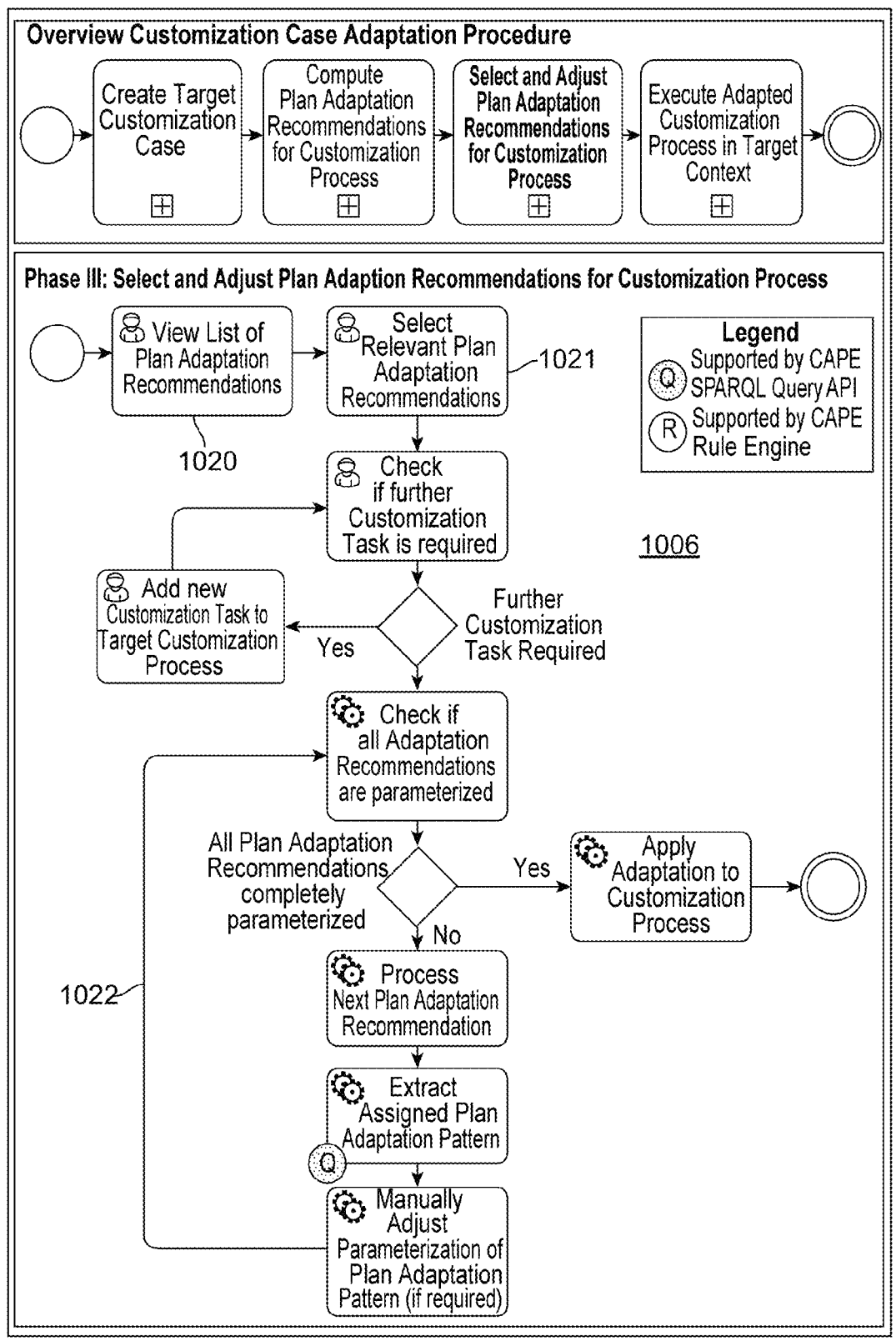
FIG. 10E shows a simplified process flow of a third phase of the embodiment of the case adaptation procedure of FIG. 10.

FIG. 10D shows that the customization requirements related plan adaptation recommendations are computed, using plan adaptation patterns and adaptation rules. The case adaptation engine loops over all attributes of the customization requirements description. Thus customization requirements on the various system layers of an enterprise system are processed. For each requirement attribute, the values of the query customization case and the retrieved customization case are compared.

Analysis of the attribute values of the query customization case and the retrieved customization case can have four different outcomes. In one possible outcome, both requirements have exactly the same value and therefore no adaptation action is required.

According to a second possible outcome, there is a recommendation 1016 to insert a customization task. The query customization case has a customization requirement that was not required in the retrieved customization case. Therefore, the case adaptation engine generates a plan adaptation recommendation to insert a new customization task into the customization process of the target customization case in order to handle this difference.

In a third possible outcome, there is a recommendation 1017 to delete customization task. The retrieved customization case has a customization requirement that is not required in the query customization case that needs to be solved. Therefore, the case adaptation engine generates a plan adaptation recommendation to delete the customization task that is related to the requirement from the customization process of the target customization case in order to handle this difference.

In a fourth possible outcome, there is a recommendation 1018 to modify customization task. Both the query customization case and the retrieved customization case have a common customization requirement. However, they differ in the specific characteristic of the requirement. Therefore, the case adaptation engine generates a plan adaptation recommendation to modify the parameterization of the related customization task in the customization process of the target customization case in order to handle this difference.

Analysis of case attribute values as well as the derivation of appropriate plan adaptation recommendations, is implemented using adaptation rules.

Returning to FIG. 10B, the computed plan adaptation recommendations are grouped together. The recommendations may optionally be sorted as shown in the last step of FIG. 10B.

The first two phases just described of the customization case adaptation procedure are processed by the case adaptation engine without interaction with the system integrator. Note, at the end of phase two in the procedure, the case adaptation engine has only computed plan adaptation recommendations. However, the target customization case has not yet been physically changed.

In phase three, the system integrator may now become actively involved in selecting and adjusting the plan adaptation recommendations. This is shown in detail in FIG. 10E.

First, the system integrator can view 1020 the list of plan adaptation recommendations. As described in the previous sections, one design principle is to provide assistance to the system integrator, but leaving him or her in full control over the adaptation process. Therefore, the system integrator can select 1021 the relevant plan recommendations out of the set that has been suggested by the case adaptation engine in the Phase II.

The system integrator can also manually add further customization tasks to the target customization process that have not been suggested by the case adaptation engine. This allows the system integrator to explicitly control the adaptation process and use his expert design knowledge during reuse of the retrieved customization knowledge in the new problem context.

A plan adaptation recommendation may be parameterized or manually adjusted by the system integrator in order to obtain decisions from the human expert. As shown in the loop 1022 in the lower part in FIG. 10E, the algorithm iterates on proposed plan adaptation recommendations that need to be manually completed.

Each plan adaptation recommendation is related to a plan adaptation pattern that actually defines the change operation related to a customization task (e.g. insert, delete or modify). The parameterization of a plan adaptation recommendation is therefore related to its encapsulated plan adaptation pattern.

Finally, if plan adaptation recommendations have been parameterized, the related change operations are applied to the customization process of the target customization case. As a result of this Phase III, the customization process of the target customization case has been adapted to the new problem situation of the target case context. Thus the solution plan of the retrieved customization case has been physically adapted.

As described previously, the customization process of the target customization case has been semi-automatically adapted in order to reflect the customization goal, customization context and customization requirements from the target customization case. The customization process is now ready to be executed in the target case context in order to actually perform the adaptation of the core enterprise system.

Figure 10F:
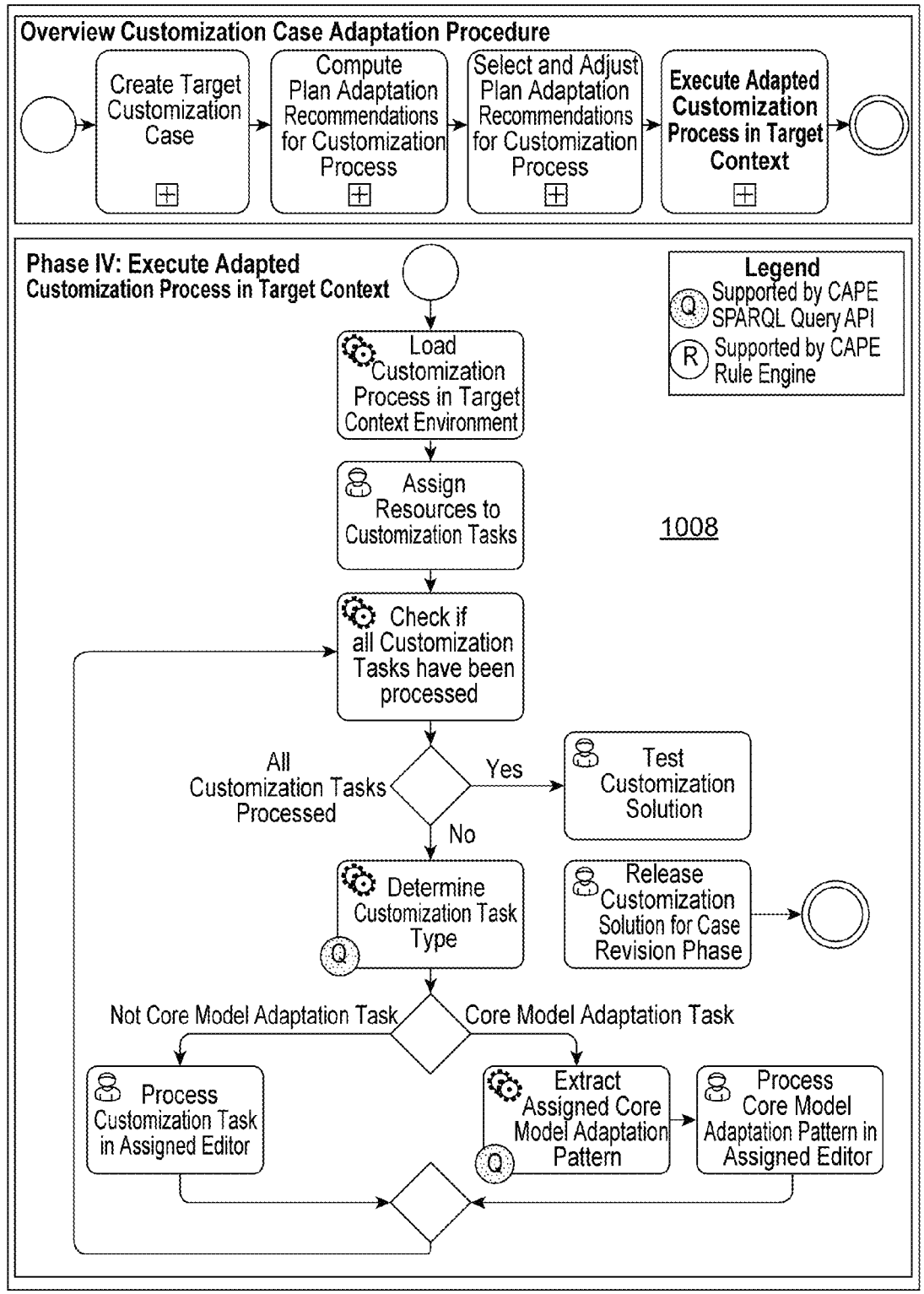
FIG. 10F shows a simplified process flow of a fourth phase of the embodiment of the case adaptation procedure of FIG. 10.

FIG. 10F shows this last phase in the customization case adaptation algorithm, wherein the customization process is executed in a target context. First, the case adaptation engine loads the customization process in the target context environment. The customization process comprises multiple customization tasks to be conducted to solve the customization problem.

In the next step, human resources (e.g. specific experts) can be assigned to the different customization tasks. In this respect, the customization process can also be used as a foundation for project management aspects within the customization project. The customization tasks can then be performed by the assigned experts in the appropriate adaptation editors of the underlying enterprise system.

At this point in the customization case adaptation procedure, the CAPE Framework interfaces with the various, platform-specific development tools that together comprise the development infrastructure of the underlying packaged enterprise system. In the case of a core model adaptation task (specific customization task), the procedure therefore extracts the core model adaptation pattern that is related to the customization task. The relevant adaptation editor of the core enterprise system is then opened and the respective customization task can be performed by the assigned expert.

If customization tasks have been successfully implemented, the customization solution can be tested and finally released for the customization revision then occurring within the customization experience management cycle.

Within the CAPE Framework, the customization case adaptation procedure is implemented by the case adaptation engine. FIG. 6 is a simplified view of the overall architecture of an embodiment of the CAPE Framework 602, including the case adaptation engine 600 present therein.

The case adaptation process is triggered by the system integrator by selecting a retrieved customization case for reuse after the case retrieval. This step is implemented by the CAPE Experience Management Frontend component 604 that is integrated with the CAPE Backend Layer 606 through the CAPE Frontend Integration Layer 608.

Through the CAPE Frontend Integration Layer, the CAPE Experience Management Frontend is integrated with adaptation editors 610 for the core enterprise system.

The CAPE Experience Management Frontend includes specific sub-components providing various user interfaces for the case adaptation related tasks. For example FIG. 7A (further discussed below) shows a user interface that allows selection of the profile of the entity that will interact with the system.

Figure 7A:
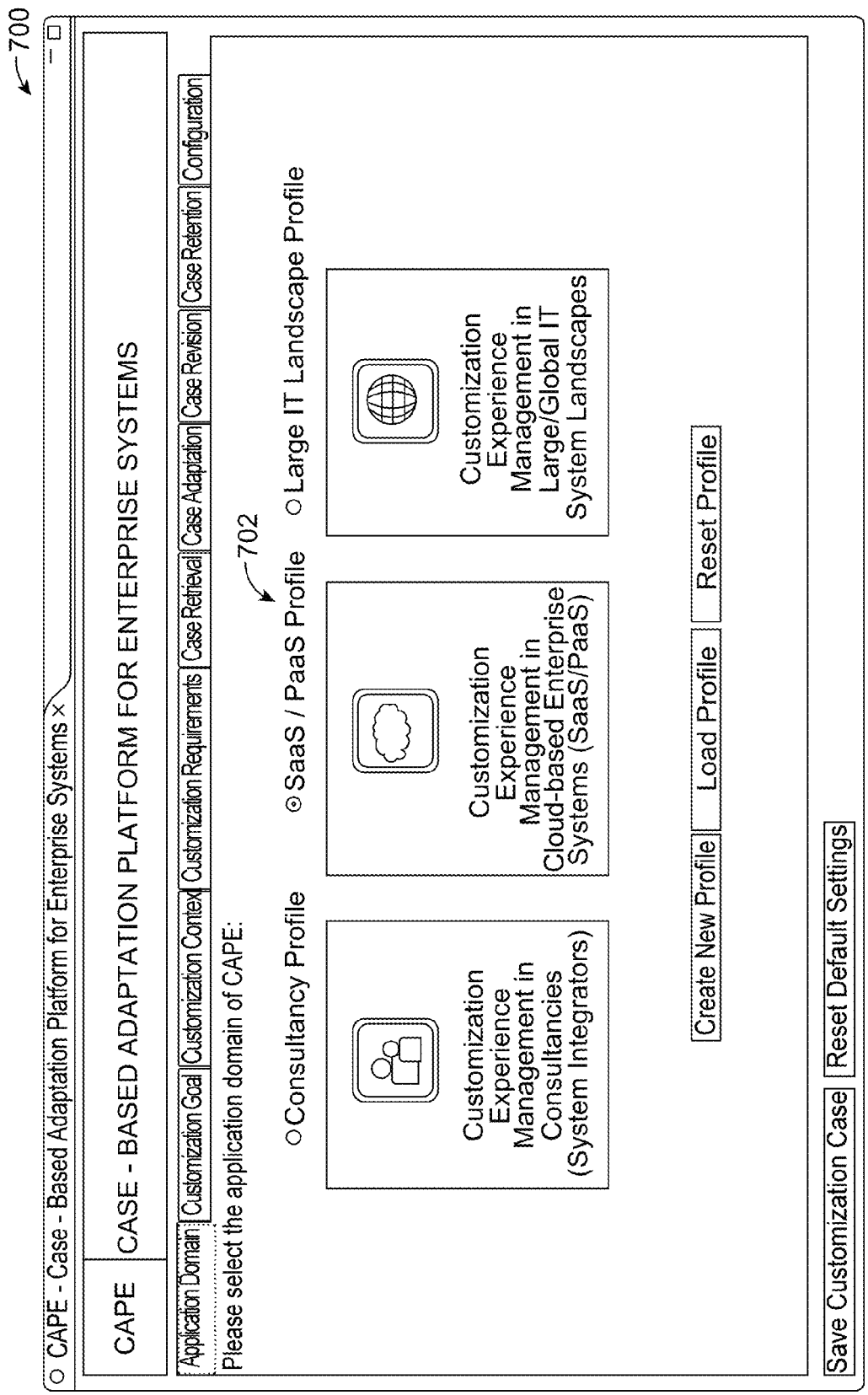
FIGS. 7A-B are screen shots showing sharing of customization knowledge according to an embodiment.
Figure 7B:
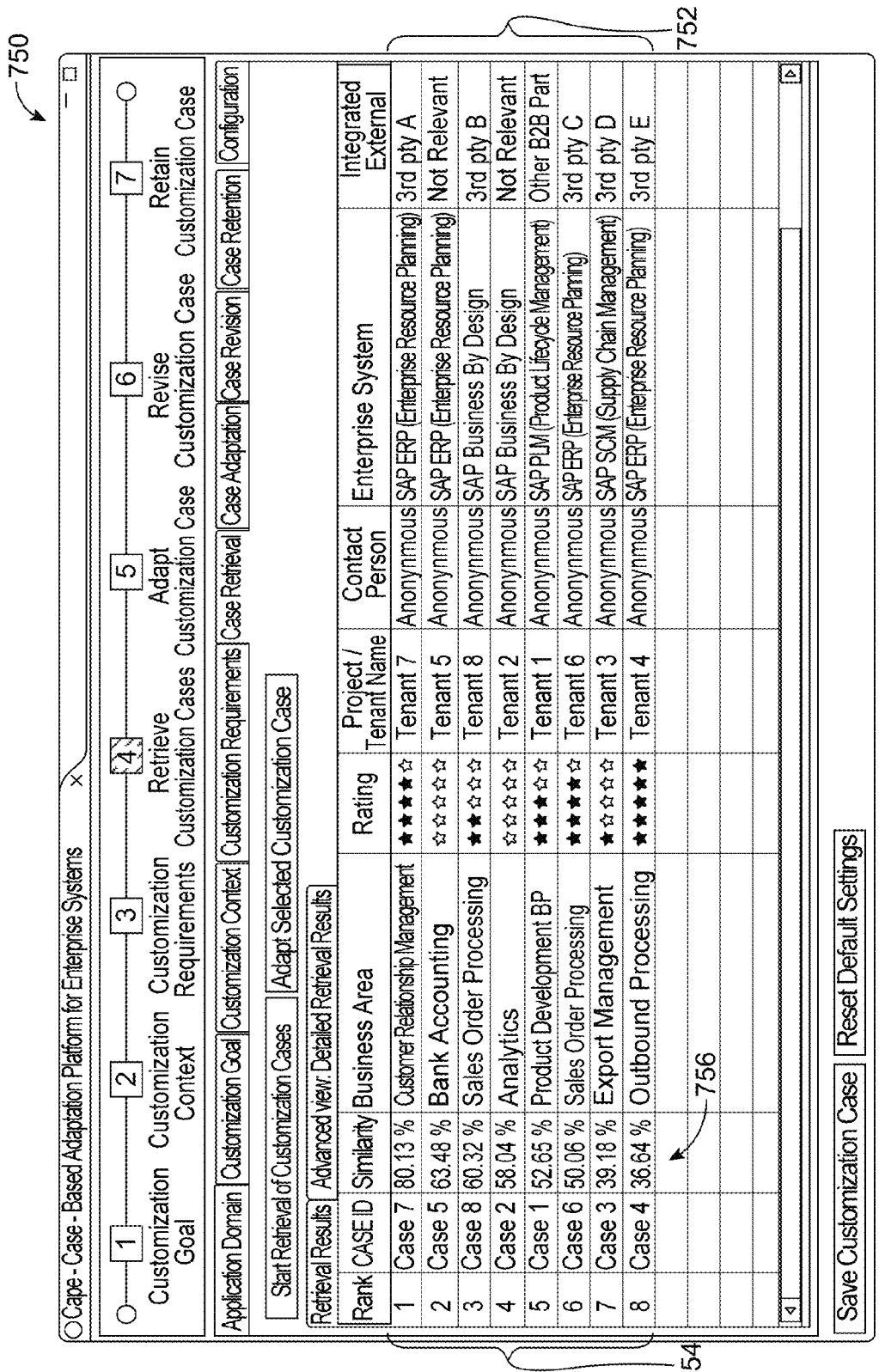

FIG. 7B (also further discussed below), shows a user interface view of a case retrieval result of similar customization cases. Among others, this view includes the community rating of customization cases, as well as the overall similarity.

The Case-Based Reasoning Engine 620 is a component in the CAPE Backend that coordinates CAPE activities and triggers the case adaptation engine 600 that performs activities within the case adaptation phase.

First, the case adaptation engine provides the functionality to create the initial version of the target customization case (as a copy of the retrieved customization case). For this purpose, the case adaptation engine has write access to the customization case base 624.

In order to provide the plan adaptation recommendations, the case adaptation engine reads the query-, retrieved- and target customization case from the knowledge base 626, and puts them as input facts on the rule engine 628.

The rule engine then starts to evaluate the differences between both cases and generates plan adaptation recommendations as defined by the adaptation rules. The rule engine may evaluate the adaptation rules using a forward chaining reasoning method and an underlying Rete algorithm. As an output, the rule adaptation engine generates plan adaptation recommendation objects as output facts. The case adaptation engine reads the computed recommendations from the working memory of the rule engine. They are afterwards displayed in the Customization Experience Management Frontend 630.

After the system has parameterized the plan adaptation patterns, the case adaptation engine provides a change API to physically change the customization process of the target customization case. The case adaptation engine itself triggers the change, and the change is physically implemented by the semantic management layer 644. The case adaptation engine also provides an overview cockpit on the processing status of the customization process in the target context.

To access the core application models (e.g. core process models) 642 or to query the customization process, the case adaptation engine uses the query services provided by the semantic management layer 644.

The adaptation rule base 646 can be configured and maintained through the maintenance/configuration tool 648.

Sharing Customization Knowledge

The above has focused on a case retrieval procedures and case adaptation procedures. Certain embodiments may enhance development efficiency of cloud-based customization solutions through systematic reuse of valuable knowledge of the completed customization projects of other tenants or partners within the cloud enterprise platform.

Accordingly, embodiments may embed customization experience management into an on-demand enterprise system environment, allowing retrieval, adaptation, sharing, and trading of customization knowledge between tenants and partners. Such a platform may explore Case-Based Reasoning (CBR) principles in the novel application domain of customization experience management in the context of SaaS/PaaS based enterprise software.

Figure 13:
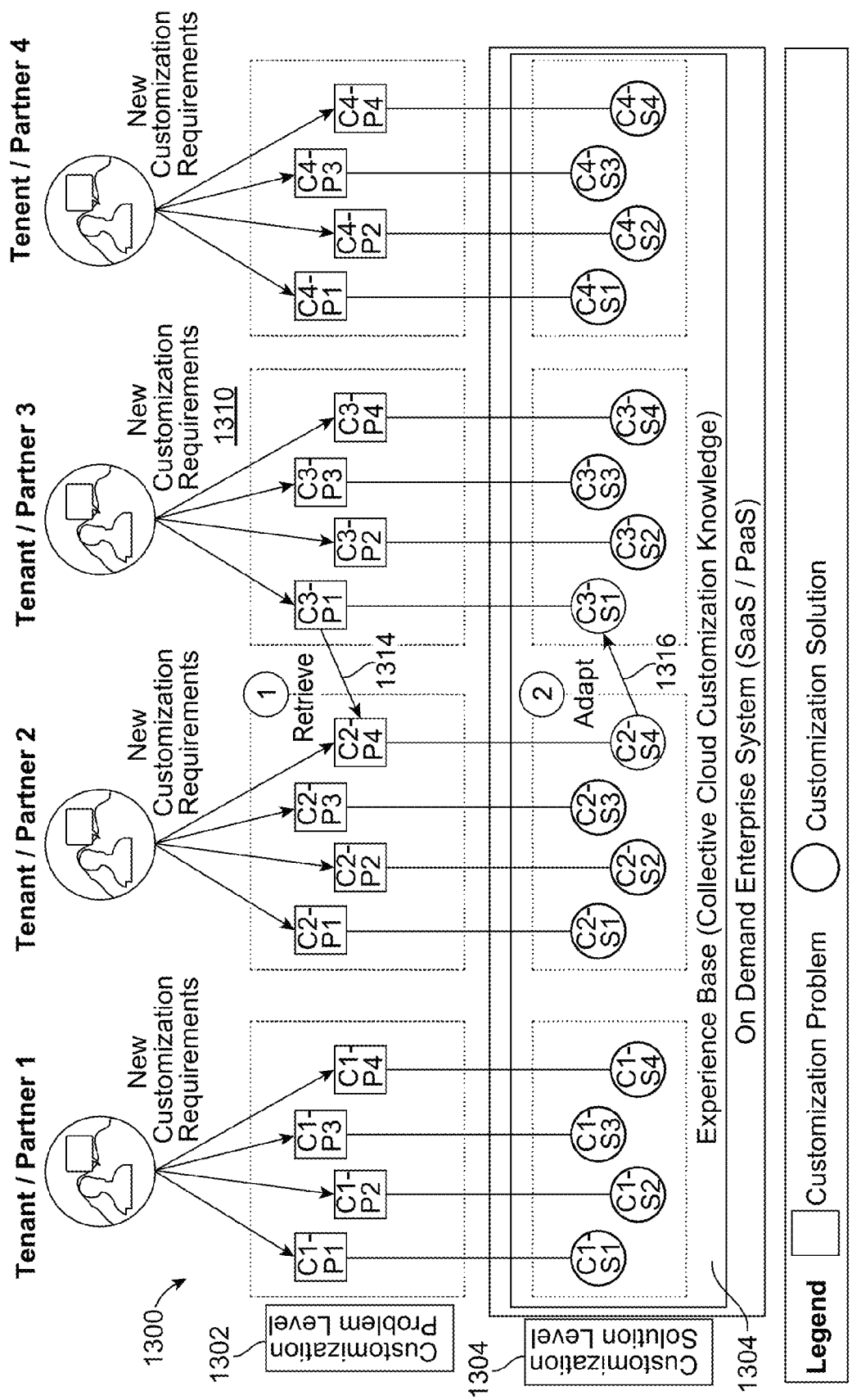
FIG. 13 shows a simplified view of an embodiment of a customization system according to an embodiment.

FIG. 13 shows a simplified view of an embodiment of a customization system according to an embodiment. In particular, customization system 1300 comprises a customization problem level 1302 and a customization solution level 1304.

The customization problem level 1302 comprises a plurality of customization problems (–P#) previously described by a tenant/partner (C#–). The customization solution level 1304 comprises an experience base 1306 in which corresponding solutions (–S#) for the problems are stored. This experience base represents collective cloud customization knowledge of an on demand enterprise system in SaaS or PaaS form.

When confronted with a new customization problem, the tenant (or partner) can first search in the experience base for previous customization problems similar to the new customization problem. For example as previously described in connection with FIG. 5A, the tenant/partner may wish to integrate an external payment service provider into a core sales order process for credit card validation prior to release of the sales order. Here, this new, so far unsolved, customization problem is designated as C3-P1.

Rather than developing a customization solution from scratch, according to particular embodiments the tenant/partner may search within the experience base for similar customization problems already solved in the past. In particular, the tenant 3 defines new customization requirements 1310, and in response customization case(s) that are in some degree similar to the new customization problem are retrieved 1314.

In FIG. 13, the customization problem C2-P4 previously encountered (by the Tenant/Partner 2) is deemed to be the most similar to the newly posed customization problem C3-P1. Specifically, in that prior customization problem C2-P4, a payment service provider was integrated into a service order process.

Accordingly, the Tenant/Partner 3 selects C2-P4 as the customization case to be reused. The customization solution C2-S4 is then extracted from the customization case, and next adapted 1316 in order to create the final solution C3-S1.

Figure 14:
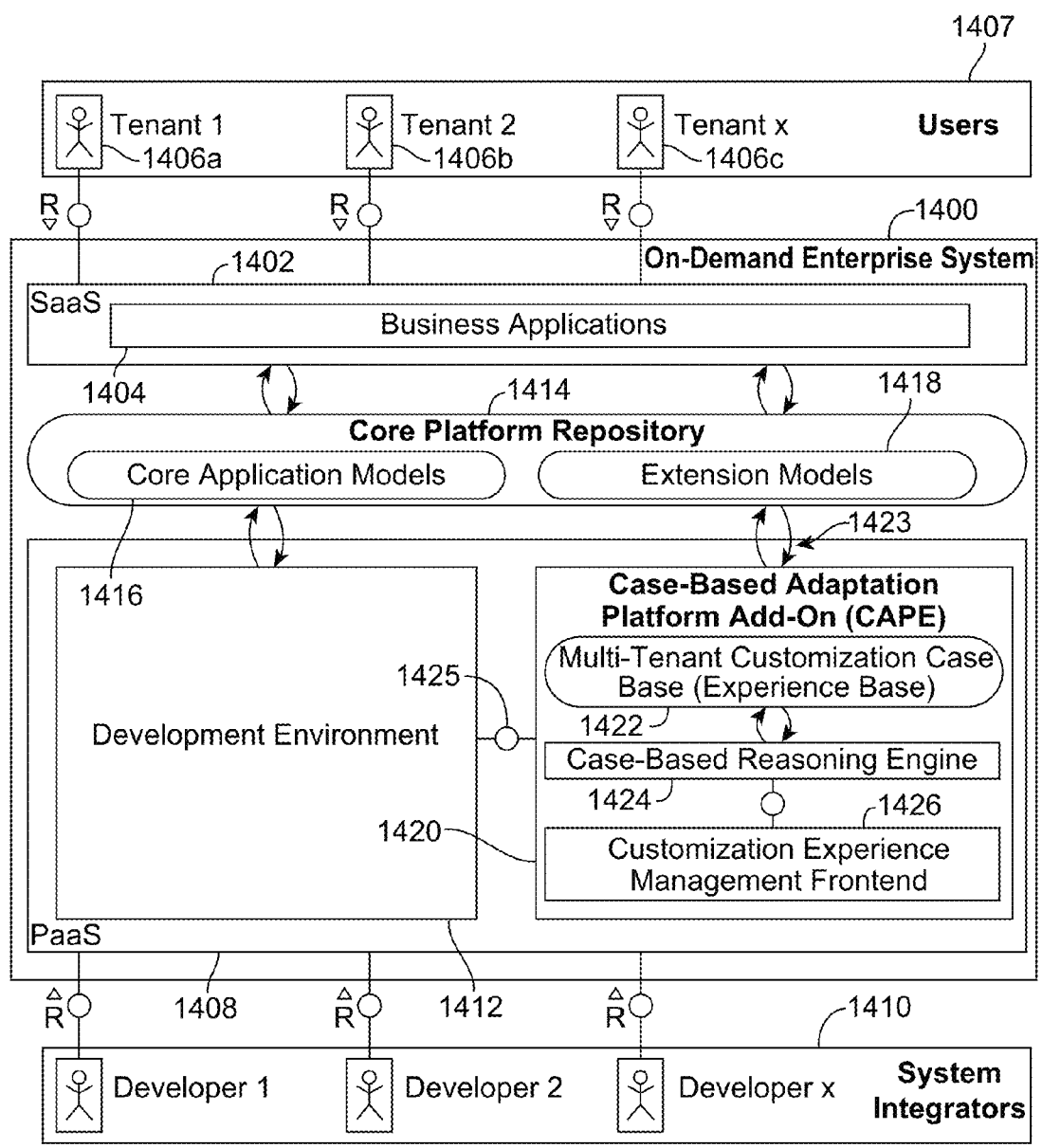
FIG. 14 shows the architecture of on-demand enterprise system with CAPE functionality that incorporates systematic customization experience management.

In certain embodiments, the functionality of an existing on-demand enterprise system may be enhanced to allow sharing of customization knowledge. FIG. 14 shows the architecture of on-demand enterprise system with CAPE functionality that incorporates systematic customization experience management.

In particular, on-demand enterprise system 1400 includes a Software as a Service (SaaS) component 1402 providing business applications 1404 for subscribed tenants 1406*a-c* (together defined as users 1407). These business applications include predefined business processes delivered by the enterprise system vendor.

In addition, a Platform as a Service (PaaS) component 1408 is provided by the on-demand enterprise system allowing tenants, system integrators 1410, or partners to adapt the core business applications provided by the SaaS vendor. Such adaptation (or customization) might include the configuration or extension of the core business applications.

Integration with other systems is another form of customization. For this purpose, the PaaS component includes a development environment 1412 that includes multiple tools and editors used in the customization of core business applications.

The SaaS and PaaS components share a common core model repository 1414 for storage of core application models (e.g. core process models) 1416 as well of extension models (e.g. process extensions) 1418.

The Case-Based Adaptation Platform Add-On component 1420 provides an experience base 1422 that includes customization cases previously developed by the various tenants, system integrators, or partners in the shared on-demand enterprise system. The Case-Based Adaptation Platform Add-On is integrated with the core platform repository, as well as with the development environment of the on-demand enterprise system, through respective interfaces 1423 and 1425.

The Case-Based Reasoning Engine 1424 provides functionality to retrieve, adapt, revise, and retain customization cases. This functionality is accessible via the Customization Experience Management Frontend 1426.

According to certain embodiments, a cloud customization case may cover a customization problem with its customization solution in the specific context of a shared on-demand platform. A meta-model for the case description may comprise one or more of the following pieces of information:

(A) information allowing restriction in visibility of a customization case within the shared experience base (e.g. intra-tenant visibility, inter-tenant visibility, intra-partner visibility, inter-partner visibility, etc.);

(B) information allowing the tenant and partner community to define ratings for customization cases;

(C) information capturing reuse frequency of customization cases;

(D) information rendering tenant specific information within the customization case anonymous;
(E) information allowing annotation of price information for trading customization cases.

An embodiment has been implemented as a prototype to instantiate and evaluate the proposed customization case meta-model. Two screenshots of the Customization Experience Management Frontend for this embodiment are shown in FIGS. 7A-7B.

Specifically, FIG. 7A is a screen-shot 700 showing the general configuration of the usage scenario in the CAPE platform. In this embodiment, the mode is set to SaaS/PaaS profile 702, indicating it as being an add-on to an existing on-demand enterprise system.

FIG. 7B shows another screen-shot of this embodiment, and in particular the CAPE Case Retrieval Result view 750 of similar customization cases 752 for a new customization problem. Among others, this view includes the community rating (ranking) 754 of customization cases, as well as further customization case attributes 756 (e.g. the overall similarity).

Figure 15:
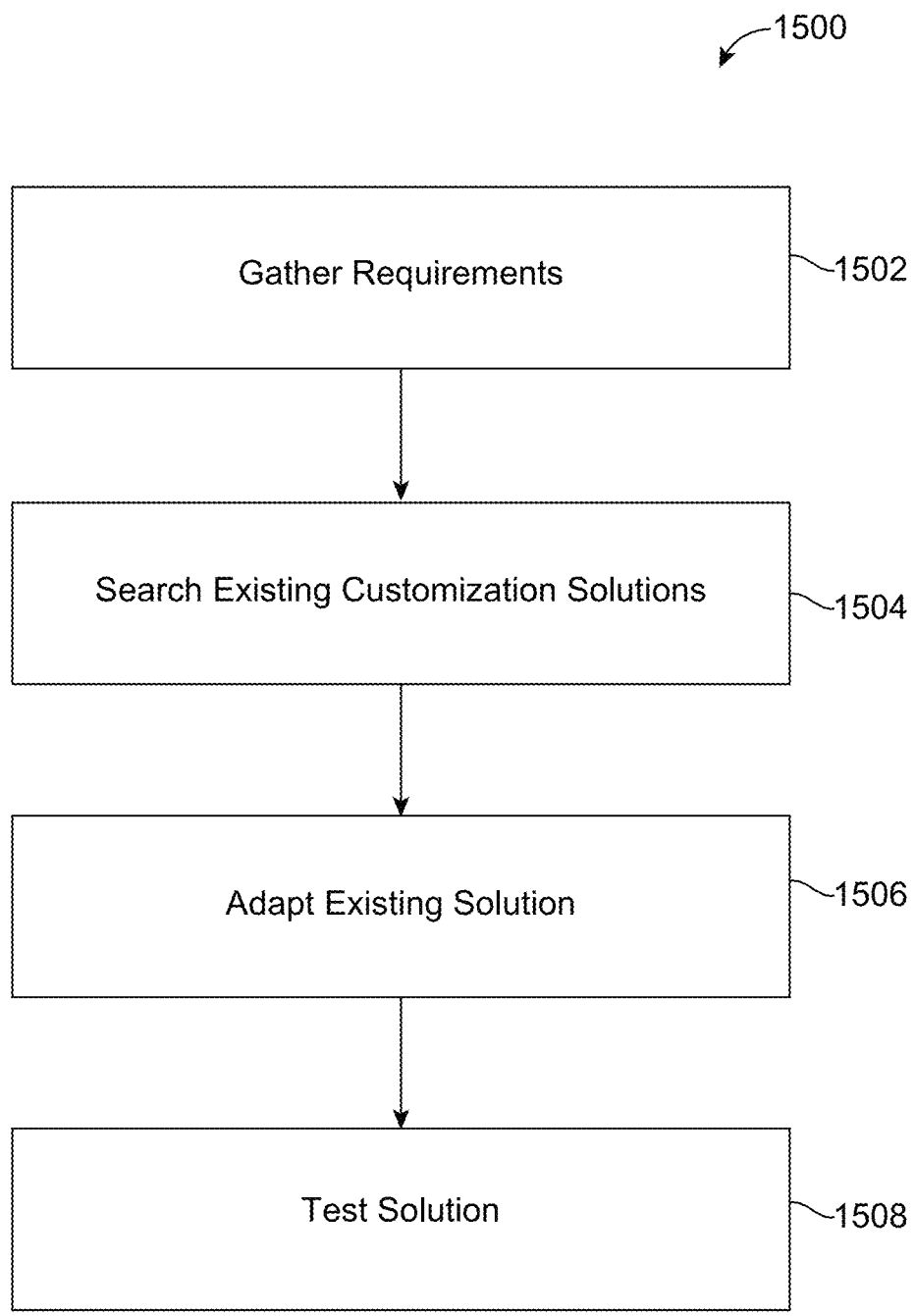
FIG. 15 is a simplified process flow summarizing cloud- and/or case-based customization according to various embodiments.

Cloud- and/or case-based customization according to various embodiments can be summarized with regard to the simplified process flow 1500 shown in FIG. 15.
1) Gather requirements from customer in step 1502;
2) In step 1504, search for existing customization solutions within the shared experience base that are (at least partially) similar to the new, so far unsolved customization problem.
3) In step 1506, adapt the existing solution (or parts thereof) to the new customization requirements.
4) In step 1508, test the customization solution.

Various embodiments may include one or more of the following aspects. One is the ability to explicitly and systematically share customization knowledge in a cloud platform between tenants, partners, and the platform vendor itself. This may be done using the concept of Case-Based Reasoning in the specific application context of cloud-based enterprise software customization.

A scheme allowing systematic management and reuse of adaptation knowledge from already successful implemented projects, may provide one or more of the following benefits.

Certain embodiments may allow leveraging of collective cloud knowledge resources (PaaS/SaaS). Customization experience may be exploited, shared, or even traded within a collaborative cloud environment. Accordingly, embodiments may serve as extensions of PaaS/SaaS with collective intelligence.

Particular embodiments may shorten problem solving time. Reuse of customization knowledge may lead to the reduction of the problem solving time, as problems do not need to be solved over and over again. This leads to reduced costs as well as to a reduced time-to-market (competitive advantage).

Sharing customization knowledge according various embodiments may improve solution quality. Reuse of customization knowledge allows building on top of already proofed solutions, and minimizes the risk of wrong or harmful solutions.

Some embodiments may lower the skill level required. In particular, training efforts for new consultants may be reduced, as well as the required skills of SaaS/PaaS subscribers.

Embodiments may promote retention and accessibility to valuable corporate knowledge. In particular, each successfully implemented customization scenario is stored in the experience base, and hence is available for the reuse of future customization scenarios.

Sharing customization knowledge according various embodiments may increase the attractiveness of the platform from the vendor perspective. That is, vendors may be afforded the opportunity to provide innovative extensions/contributions to the enterprise system.

Embodiments may also offer a foundation for enhanced platform analytics (PaaS/SaaS). That is, sharing customization knowledge allows for further platform analytics (e.g. pattern mining within the shared experience base).

Embodiments may allow customization experience management within SaaS/PaaS ecosystems. Customers of cloud-based enterprise software may choose the SaaS delivery model for rapid implementation without extensive on-site consulting effort. However, they still have the motivation to adapt the enterprise software to their specific needs with as little effort as possible.

In contrast to traditional on-premise enterprise software installations, multiple customers (or tenants) and partners may share a common infrastructure. This common infrastructure provides a source of collective customization knowledge. Systematic management and reuse of project experience within such a cloud-platform according to embodiments could allow customers and partners to share or even trade customization knowledge, increasing the attractiveness of the entire ecosystem.

Figure 12:
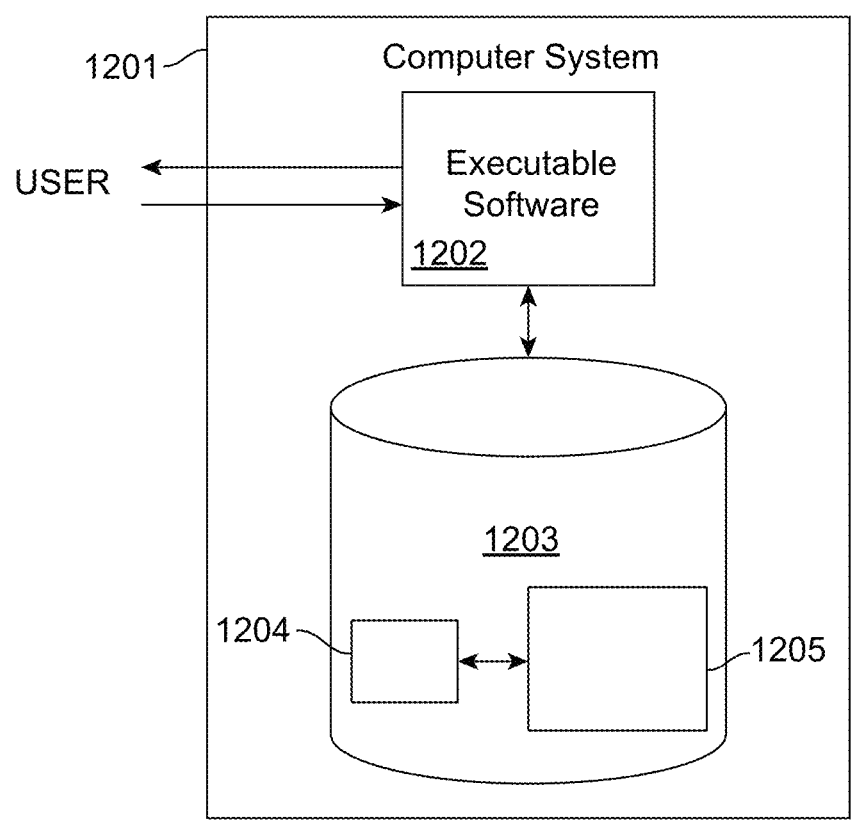
FIG. 12 illustrates hardware of a special purpose computing machine that may be configured to allow sharing of customization knowledge in accordance with particular embodiments.

FIG. 12 illustrates hardware of a special purpose computing machine that may be configured to perform sharing of customization knowledge in accordance with particular embodiments. In particular, computer system 1200 comprises a processor 1202 that is in electronic communication with a non-transitory computer-readable storage medium 1203. This computer-readable storage medium has stored thereon code 1205 corresponding to the case-based reasoning engine. Code 1204 corresponds to the experience base. Code may be configured to reference data stored in a database of a non-transitory computer-readable storage medium, for example as may be located in a remote database server or a file system.

Figure 4:
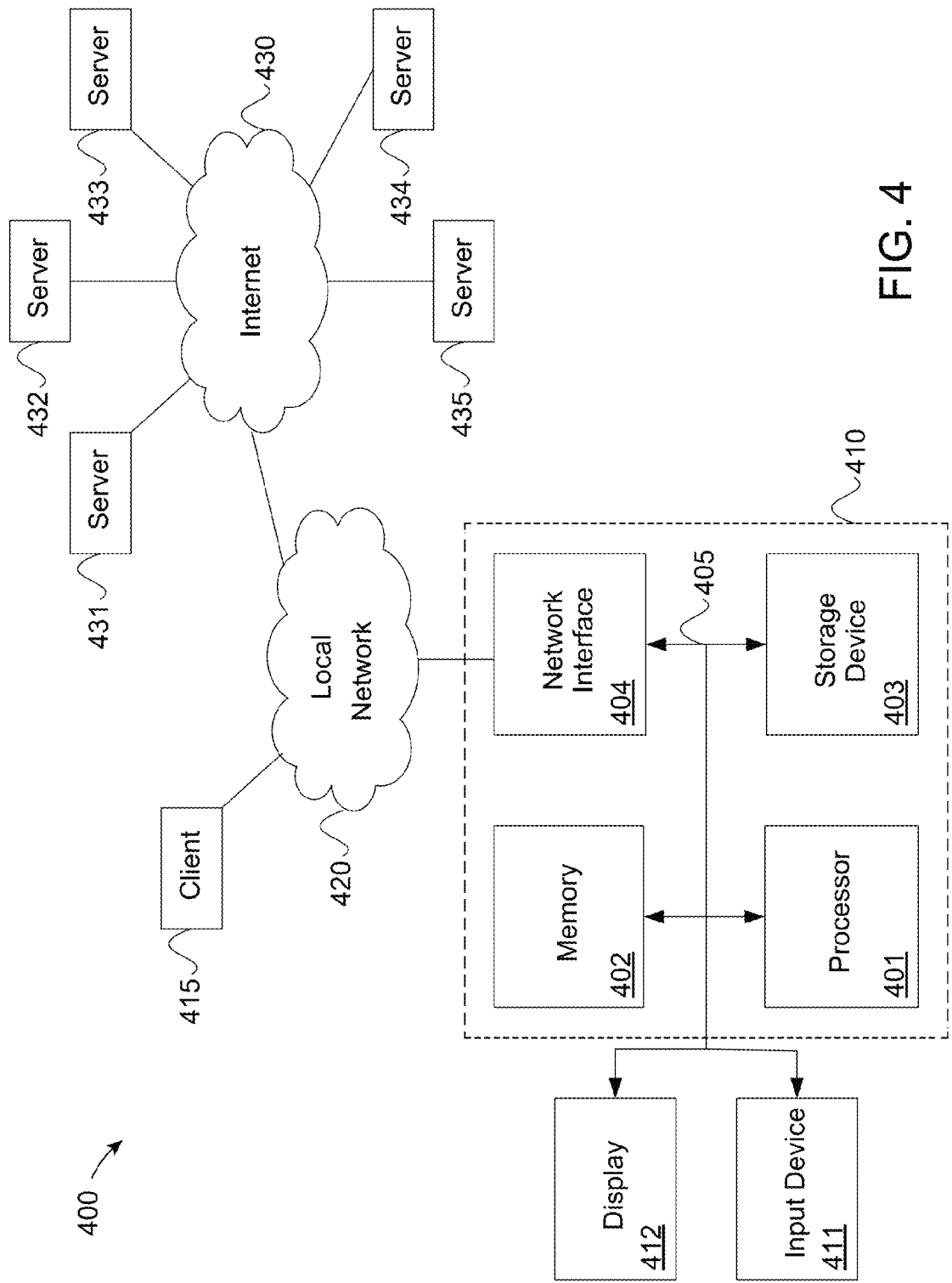
FIG. 4 illustrates an embodiment of a computer system.

FIG. 4 illustrates hardware of a computer system that may be configured to implement sharing of customization knowledge according to an embodiment. An example computer system 410 is illustrated in FIG. 4. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable storage mediums.

Computer system 410 may be coupled via bus 405 to a display 412, such as a cathode ray tube (CRT) or liquid crystal display (LCD), for displaying information to a computer service integrator. An input device 411 such as a keyboard and/or mouse is coupled to bus 405 for communicating information and command selections from the service integrator to processor 401. The combination of these components allows the service integrator to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 410 can send and receive information through the network interface 404 across a local network 420, an Intranet, or the Internet 430. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

Description of Standard Enterprise System

Figure 9:
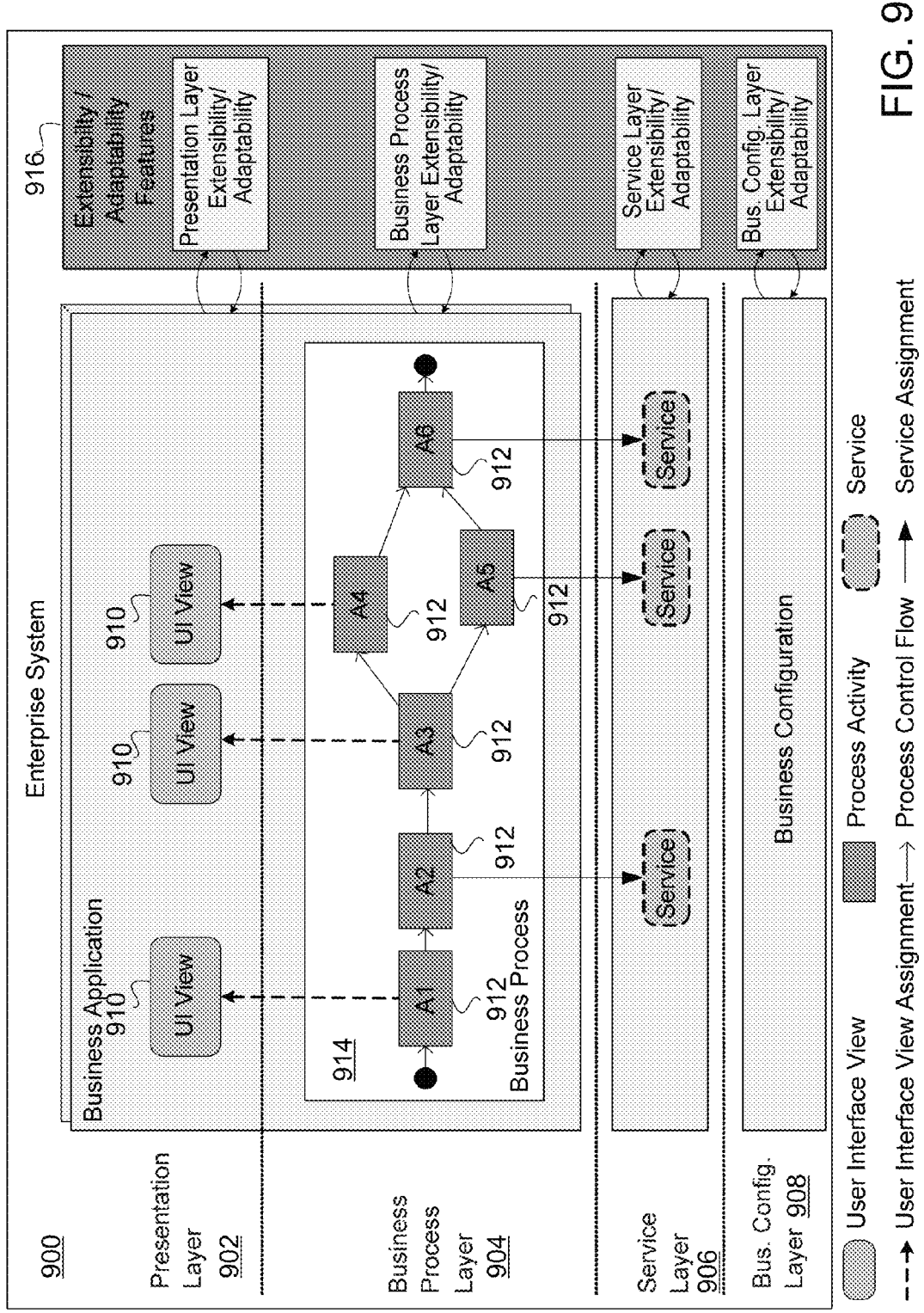
FIG. 9 shows an example of an enterprise system according to one embodiment.

The case-based adaptation method may be used in extending standard enterprise systems, including on-demand enterprise systems. Standard enterprise systems may be described with a single overall abstracted model that spans across four abstraction layers, such as the presentation layer, business process layer, service layer, and business configuration layer. An enterprise system includes multiple business applications or reference processes that leverage a common service and business configuration layer. FIG. 9 shows a more detailed example of an enterprise system 900 according to one embodiment. Enterprise system 900 may be described with a single overall abstracted model that spans across a number (e.g., four) of abstraction layers, such as a presentation layer 902, a business process layer 904, a service layer 906, and a business configuration layer 908. Enterprise system 900 includes multiple (service-based) business applications that leverage a common service layer 906 and business configuration layer 908.

Presentation layer 902 comprises all artifacts and components for a service integrator interface (UI) part of the business application. In one embodiment, UI components (UI views 910) for a dedicated UI platform with all interrelations are located within presentation layer 902. The service integrator interface will be described in more detailed below.

Business process layer 904 contains models 912 of business processes 914 that are realized within the business application. Modeling elements for business processes may contain references to elements on other layers. For example, a human activity in a business process can refer to a UI component 910 with the implementation of the human service integrator interface. An automated activity can refer to a service declared in the service layer 906 with the implementation of the needed business functionality.

Service layer 906 contains services offered by enterprise system 900. Core services provide access to business objects. Composite services represent compositions of core services into larger bundles to provide advanced higher-value business functionality or application logic.

Business configuration layer 908 contains the configuration data for business applications with available parameters and configuration options (also known as 'customizing') for business applications.

In order to adapt standard business applications to customer specific needs, enterprise systems 900 provide a large set of proprietary extensibility/adaptability features 916.

Figure 11:
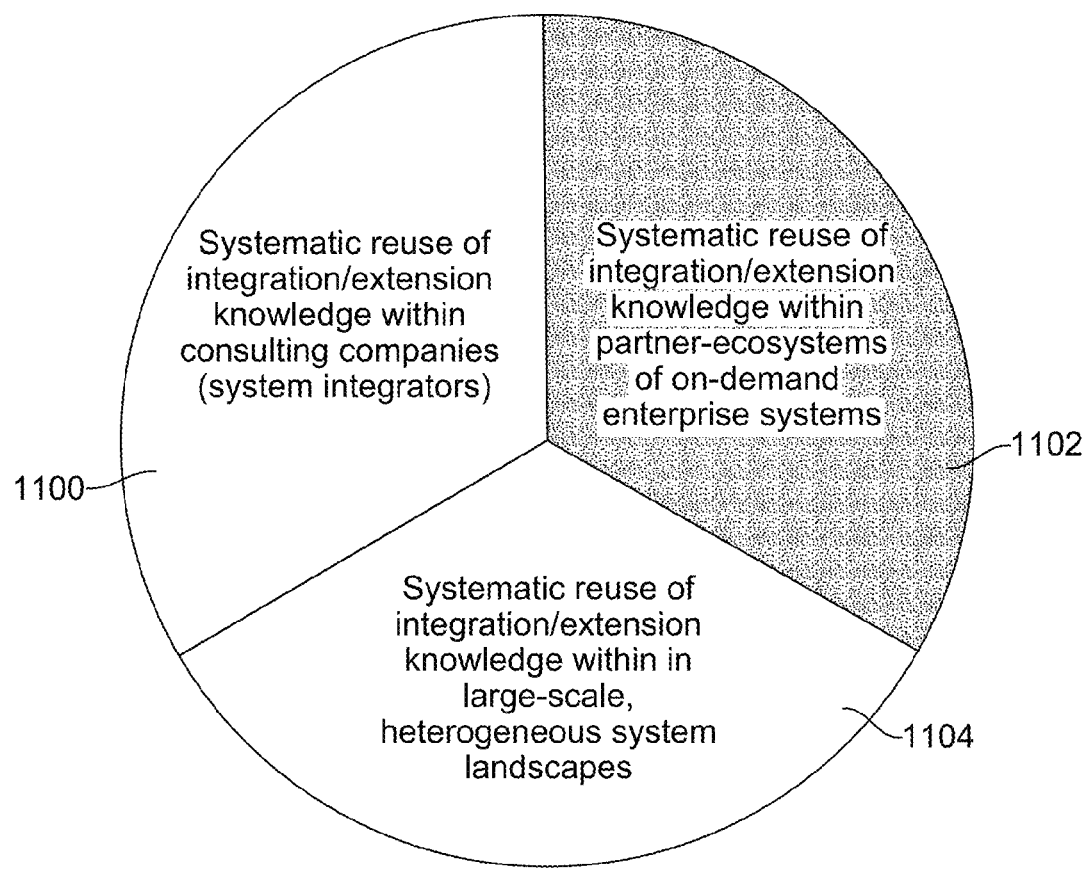
FIG. 11 is a graphical depiction of possible areas of application for various embodiments.

FIG. 11 is a graphical depiction of possible areas of application for various embodiments. In a first application area 1100, integration/extension knowledge may be systematically reused within consulting companies (such as system integrators).

Currently, consulting companies expend significant effort in the training and education of new consultants to become domain experts. Consulting companies also expend significant effort to allow consultants to exchange knowledge and share their best practices and experiences gained in on-premise or on-demand integration projects. Moreover, while integration experience may be found in consulting teams, such knowledge is not typically systematically leveraged.

Embodiments as described herein may thus allow response to marketplace pressures to deliver integration solutions in a shorter time with fewer costs to customers. Embodiments could also facilitate off-shore development approaches in the area of system integration in large-scale customer landscapes.

According to a second application Area 1102 of FIG. 11, integration/extension knowledge may be systematically reused within partner-ecosystems of on-demand enterprise systems. Specifically, on-demand standard enterprise software is finding increasing use. In contrast to on-premise solutions, such on-demand subscribers typically require less on-site consulting.

Subscribers of on-demand standard enterprise software request easier and faster integration of complementary services. This has led to the emergence of eco-systems in which service marketplaces and application stores provide complementary solutions (e.g. add-ons) to standard enterprise systems developed by ISVs/partners. Moreover, providers of on-demand standard enterprise software have begun to offer partner development environments (PaaS) facilitating the more rapid development of extensions/complementary solutions and third-party service integrations.

Thus according to various embodiments, multiple tenants and partners (=domain experts) may share a common infrastructure providing a valuable resource to systematically share integration/extension knowledge. In certain cases, such knowledge exchange might be possible between different tenants.

According to a third potential application area 1104 of FIG. 11, embodiments may allow systematic reuse of integration/extension knowledge within large-scale, heterogeneous system landscapes. Specifically, large organizations may be able to employ embodiments to reuse existing solutions, or to adapt existing solutions for reuse within the specialized knowledge spheres present within the context of a larger system environment.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

APPENDIX A

TABLE 1

Case Attributes - Integration Goal Specification

| Attribute/Feature | Attribute Type | Description and Values |
|---|---|---|
| TargetBusinessSystemType | Symbol | Defines the enterprise system that should be extended/adapted. Values: SAP CRM (Customer Relationship Management) SAP ERP (Enterprise Resource Planning) SAP PLM (Product Lifecycle Management) SAP SCM (Supply Chain Management) SAP SRM (Supplier Relationship Management SAP Business ByDesign Other |
| UsageScenario | Symbol | Defines the customizing or flexibility use case that should be implemented. Values: Third Party Service Integration Field Extensibility Custom Forms Others |
| IntegrationFlavor | Symbol | Defines the principle integration flavor of the service in the target consumption environment of the enterprise system. Values: UI Integration - extension of single UI component UI Integration - extension of multiple UI components Process Integration - extension of single process component Process Integration - extension of multiple process components UI and Process Integration - cross-layer extension |

TABLE 2

Case Attributes - Integration Context Specification

| Attribute/Feature | Attribute Type | Description and Values |
|---|---|---|
| Service Context (=Service Provider Context) | | |
| ServiceToBeIntegrated | Model | Defines the service (e.g. provided by an ISV or eco system partner) that should be integrated into the target enterprise system. Service is modeled in a service ontology based on USDL) |
| ServiceBusinessSemantics | Taxonomy | Defines the business semantics of the service to be integrated. Values of this attribute are provided by a business domain ontology. |
| Enterprise System Context (=Service Consumer Context) | | |
| TargetEnterpriseSystemFunctionalArea | Taxonomy | Defines the business semantics of the target components in the enterprise system that should be extended by the complementary service. Values of this attribute are provided by a business domain ontology. |
| TargetUIComponent(s) | Model | Defines the target UI component(s) of the enterprise system that should be extended/adapted (in case of UI components are involved in the selected integration flavor). UI components are described by an UI ontology that is based on Diamodl (abstract UI description language) and includes dedicated extension points. |
| TargetProcessComponent(s) | Model | Defines the target process component(s) of the enterprise system that should be extended/adapted (in case of process components are involved in the selected integration flavor). Process components are described by an BPMN Ontology that includes dedicated extension points. |

TABLE 3

Case Attributes - UI Extension Requirements

| Attribute/Feature | Attribute Type | Description and Values |
|---|---|---|
| TextualDescription Requirements | String | Textual description of the integration requirements. |
| ReqUITriggerOfService | Symbol | Defines how the service should be triggered within the core UI component.<br>Values (multiple selection):<br>Not Relevant<br>No trigger required<br>Trigger by an existing UI event<br>Trigger by adding a new button<br>Trigger by adding a new menu item<br>Required - adding multiple triggers |
| ReqUIExtensionService Input | Symbol | Defines whether the core UI component needs to be extended with additional UI controls in order to gather information that is required as input data to call the integrated service.<br>Values (multiple selection possible):<br>Not Relevant<br>Not Required<br>Required - adding a new tab control<br>Required - adding a new panel<br>Required - adding a new form item<br>Required - adding a new checkbox<br>Required - adding a new list box<br>Required - adding a new combo-box<br>Required - adding a new tree item<br>Required - adding multiple extensions |
| ReqUIExtensionService Output | Symbol | Defines whether the core UI component needs to be extended with additional UI controls in order to show/display result values of the service invocation.<br>Values (multiple selection possible):<br>Not Relevant<br>Not Required<br>Required - adding a new table column<br>Required - adding a new table<br>Required - adding a new tab control<br>Required - adding a new panel<br>Required - adding a new form item<br>Required - adding a new checkbox<br>Required - adding a new list box<br>Required - adding a new combo-box<br>Required - adding multiple extensions |

TABLE 4

Case Attributes - Process Extension Requirements

| Attribute/Feature | Attribute Type | Description and Values |
|---|---|---|
| ReqPETriggerOfInteraction | Symbol | Defines the initiator (triggering component) of a process extension scenario.<br>Values:<br>Not Relevant<br>Core Process triggers Extension<br>Extension triggers Core Process |
| ReqPEPluginPosition ExtensionProcess | Symbol | Defines the position in respect to the core process where an extension process should be plugged in.<br>Values:<br>Not Relevant<br>Plugin - Before Core Process<br>Plugin - Into Core Process<br>Plugin - After Core Process |
| ReqPEDataFlowCpToEx | Boolean | Defines whether data should flow from the core process to the extension process.<br>Values:<br>No/Yes |
| ReqPEDataFlowExToCp | Boolean | Defines whether data should flow from the extension process to the core process.<br>Values:<br>No/Yes |

TABLE 4-continued

Case Attributes - Process Extension Requirements

| Attribute/Feature | Attribute Type | Description and Values |
| --- | --- | --- |
| ReqPECommunication Mode | Symbol | Defines the communication mode between the core process and the extension process.<br>Values:<br>Not Relevant<br>Asynchronous<br>Synchronous |
| ReqPEMultiple InvolvedCP | Boolean | Defines whether multiple core processes are involved in the integration scenario.<br>Values:<br>No/Yes |
| ReqPEMultiple InvolvedEx | Boolean | Defines whether multiple extension processes are involved in the integration scenario.<br>Values:<br>No/Yes |

TABLE 5

Case Attributes - Business Logic Extension Requirements

| Attribute/Feature | Attribute Type | Description and Values |
| --- | --- | --- |
| ReqBLEDataPersistence | Symbol | Defines whether data returned from the service should be persisted in the target enterprise system environment.<br>Values:<br>Not Required<br>Required - data should be persisted in an existing table of the target system<br>Required - data should be persisted in an additional column of an existing table<br>Required - data should be persisted in a new table<br>Required - data should be persisted in an existing field of a business object<br>Required - data should be persisted in a new field of a business object |
| ReqBLEReadAccessTo EnterpriseSystem | Boolean | Defines whether the integration logic has to read data from the core enterprise system.<br>Values:<br>Not Required/Required |
| ReqBLEWriteAccessTo EnterpriseSystem | Boolean | Defines whether the integration logic has to write data into the core enterprise system.<br>Values:<br>Not Required/Required |
| ReqBLEAccessBusiness LogicOfEnterpriseSystem | Boolean | Defines whether the integration logic needs to access additional business logic on the core enterprise system.<br>Values:<br>Not Required/Required |
| ReqBLEInteractive Service integratorTask | Symbol | Defines whether an interactive service integrator task is required in the integration logic.<br>Values:<br>Not Required<br>Required - before a service operation is called<br>Required - after service operation is called |
| ReqBLEManualService integratorTask | Symbol | Defines whether a human service integrator task is required in the integration logic.<br>Values:<br>Not Required<br>Required - before a service operation is called<br>Required - after service operation is called |
| ReqBLEAdjustCustomizing Parameter | Symbol | Defines whether a customizing parameter has to be set/adjusted in the target enterprise system.<br>Values:<br>Not Required<br>Required - on single customizing parameter<br>Required - on multiple customizing parameters |

TABLE 5-continued

Case Attributes - Business Logic Extension Requirements

| Attribute/Feature | Attribute Type | Description and Values |
|---|---|---|
| ReqBLEAddCustomizing Parameter | Symbol | Defines whether a new customizing parameter has to added in the target enterprise system.<br>Values:<br>Not Required<br>Required - add single customizing parameter<br>Required - add multiple customizing parameters |
| ... | ... | ... |

TABLE 6

Case Attributes - External Service Integration Requirements

| Attribute/Feature | Attribute Type | Description and Values |
|---|---|---|
| ReqSIUsageOfB2BStandards | Symbol | Defines whether standard B2B protocols should be used for the communication with the external service.<br>Values:<br>No Standard Used<br>RosettaNet<br>CIDX<br>EDI/EDIFACT<br>Others |
| ReqSITechnicalProtocol | Symbol | Defines which technical communication protocol should be used for the communication with the external service.<br>Values:<br>SOAP<br>WS Reliable Messaging<br>REST<br>JMS<br>HTTP<br>ALE/IDOC<br>RFC<br>EDI<br>Others |
| ... | ... | ... |

TABLE 7

Case Attributes - Non-Functional Integration Requirements

| Attribute/Feature | Attribute Type | Description and Values |
|---|---|---|
| ReqNFRAuthentication | Boolean | Defines whether the integration logic needs to authenticate in the communication with the external service.<br>Values:<br>Not Required/Required |
| ReqNFRCaching | Boolean | Defines whether the communication is performance critical and if caching mechanisms are required.<br>Values:<br>Not Required/Required |
| ReqNFRLogging | Boolean | Defines whether the communication with the external service should be logged.<br>Values:<br>Not Required/Required |
| ReqNFREncryption | Boolean | Defines whether the messages sent to the service or received from the service should be encrypted.<br>Values:<br>Not Required/Required |
| ReqNFRDigitalSignature | Boolean | Defines whether the messages sent to the service or received from the service should be digitally signed (e.g. as required by legal).<br>Values:<br>Not Required/Required |
| ReqNFRTransactionHandling | Boolean | Defines whether some specific transaction handling is required.<br>Values:<br>Not Required/Required |
| ... | ... | ... |

What is claimed is:

1. A method comprising:
providing a non-transitory computer-readable storage medium containing an experience base comprising a stored customization case previously used by a first entity to customize an enterprise system for a first tenant, wherein the stored customization case is in a case representation model that includes a customization problem and a customization solution comprising an adaptation pattern category, the stored customization case further including,
information configured to restrict inter-tenant visibility of the stored customization case within the experience base distinct from any anonymization measure, and
receiving from a second entity, a first query comprising a first unsolved enterprise customization case for a second tenant, the first unsolved enterprise customization case having a first new customization problem and not having a customization solution;
causing a case-based reasoning engine contained within the non-transitory computer-readable storage medium to reference the experience base by executing a case retrieval algorithm upon the case representation model and generate a similarity measure between the first new customization problem and the stored customization case;
displaying the similarity measure to the second entity prior to adapting the customization solution for the first unsolved customization case;
receiving from the first entity, a second query comprising a second unsolved enterprise customization case for a third tenant; and
restricting visibility of the stored customization case to the third tenant based upon the information.

2. The method of claim 1 wherein the case-based reasoning engine comprises an add-on to a Platform-as-a-Service (PaaS) component of the enterprise system.

3. The method of claim 1 wherein the first entity and/or the second entity are system integrators.

4. The method of claim 1 wherein the first entity and/or the second entity are tenants of the enterprise system.

5. The method of claim 1 wherein the stored customization case includes information allowing annotation of price information for trading.

6. The method of claim 1 further comprising storing the new customization problem and an adapted customization solution, as a new customization case.

7. The method of claim 1 wherein the stored customization case further includes information configured to:
define a rating for the stored customization case within a community; and
capture a reuse frequency of the stored customization case.

8. A non-transitory computer readable storage medium embodying a computer program for performing a method, said method comprising:
providing a database containing an experience base comprising a stored customization case previously used by a first entity to customize an enterprise system for a first tenant, wherein the stored customization case is in a case representation model that includes a customization problem and a customization solution comprising an adaptation pattern category, the stored customization case further including;
information configured to restrict inter-tenant visibility of the stored customization case within the experience base distinct from any anonymization measure;
receiving from a second entity, a first query comprising a first unsolved enterprise customization case for a second tenant, the first unsolved enterprise customization case having a first new customization problem and not having a customization solution;
causing a case-based reasoning engine contained within the database to reference the experience base by executing a case retrieval algorithm upon the case representation model and generate a similarity measure between the first new customization problem and the stored customization case;
displaying the similarity measure to the second entity prior to adapting the customization solution for the first unsolved customization case;
receiving from the first entity, a second query comprising a second unsolved enterprise customization case for a third tenant; and
restricting visibility of the stored customization case to the third tenant based upon the information.

9. The non-transitory computer readable storage medium of claim 8 wherein the case-based reasoning engine comprises an add-on to a Platform-as-a-Service (PaaS) component of the enterprise system.

10. The non-transitory computer readable storage medium of claim 8 wherein the first entity and/or the second entity are system integrators.

11. The non-transitory computer readable storage medium of claim 8 wherein the first entity and/or the second entity are tenants of the enterprise system.

12. The non-transitory computer readable storage medium of claim 8 wherein the stored customization case includes information allowing annotation of price information for trading.

13. The non-transitory computer readable storage medium of claim 8 further comprising storing the new customization problem and an adapted customization solution, as a new customization case.

* * * * *